United States Patent
Otake et al.

(10) Patent No.: US 8,960,757 B2
(45) Date of Patent: Feb. 24, 2015

(54) SEAT FRAME AND STOWABLE VEHICLE SEAT WITH THE SAME

(75) Inventors: Shigekazu Otake, Shizuoka (JP);
Shingo Kimata, Shizuoka (JP);
Yoshinobu Kimpara, Shizuoka (JP);
Takahiro Mitsui, Shizuoka (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 13/977,146

(22) PCT Filed: Dec. 26, 2011

(86) PCT No.: PCT/JP2011/080127
§ 371 (c)(1),
(2), (4) Date: Jun. 28, 2013

(87) PCT Pub. No.: WO2012/090963
PCT Pub. Date: Jul. 5, 2012

(65) Prior Publication Data
US 2013/0300145 A1 Nov. 14, 2013

(30) Foreign Application Priority Data

Dec. 28, 2010 (JP) ................. 2010-293589
Dec. 28, 2010 (JP) ................. 2010-293590
Dec. 28, 2010 (JP) ................. 2010-293591
Dec. 28, 2010 (JP) ................. 2010-293592

(51) Int. Cl.
*B60N 2/06* (2006.01)
*B60N 2/30* (2006.01)
*B60N 2/44* (2006.01)

(52) U.S. Cl.
CPC .............. *B60N 2/3075* (2013.01); *B60N 2/065* (2013.01); *B60N 2/3011* (2013.01); *B60N 2/3065* (2013.01); *B60N 2002/446* (2013.01); *B60N 2002/4465* (2013.01)
USPC ....................................................... 296/65.13

(58) Field of Classification Search
CPC .............. B60N 2/30; B60N 2/07; B60N 2/20; B60N 2/36
USPC ........... 296/65.01, 65.05, 65.09, 65.13, 65.16
See application file for complete search history.

(56) References Cited

FOREIGN PATENT DOCUMENTS

JP   63-142140 U   9/1988
JP   08-142777 A   6/1996

(Continued)

OTHER PUBLICATIONS

Written opinion translation for PCT/JP2011/080127.*

(Continued)

*Primary Examiner* — H Gutman
(74) *Attorney, Agent, or Firm* — Drinker Biddle & Reath LLP

(57) ABSTRACT

Provided are a seat frame and a stowable vehicle seat which enables high assembling work efficiency and easy stowing operation. There are provided a reclining mechanism, a seat slide mechanism which slides a seat bottom frame, a slide lock mechanism which prohibits or allows the operation of the seat slide mechanism in cooperation with the reclining mechanism, a striker lock mechanism, and an assist mechanism which assists an operation of stowing and returning a stowable vehicle seat. The seat slide mechanism includes a lower rail, an upper rail, and a slide biasing member which automatically slides the upper rail in cooperation with a tilting movement of a seat back frame to a predetermined angle upon stowage of the stowable vehicle seat. The seat slide mechanism and the slide lock mechanism are mounted to the seat bottom frame.

20 Claims, 34 Drawing Sheets

(56) References Cited

FOREIGN PATENT DOCUMENTS

| | | |
|---|---|---|
| JP | 10-099157 A | 4/1998 |
| JP | 11-099859 A | 4/1999 |
| JP | 11-245692 A | 9/1999 |
| JP | 2003-182416 A | 7/2003 |
| JP | 2003-312375 A | 11/2003 |
| JP | 2004-130888 A | 4/2004 |
| JP | 2005-053246 A | 3/2005 |
| JP | 2005-112099 A | 4/2005 |
| JP | 2005-193841 A | 7/2005 |
| JP | 2008-260325 A | 10/2008 |
| JP | 2009-196422 A | 9/2009 |
| JP | 2009-248678 A | 10/2009 |
| JP | 2009-292266 A | 12/2009 |
| JP | 2010-058636 A | 3/2010 |

OTHER PUBLICATIONS

Office Action issued for JP 2010-293590 (Oct. 7, 2014).
Office Action issued for JP 2010-293592 (Oct. 7, 2014).

* cited by examiner

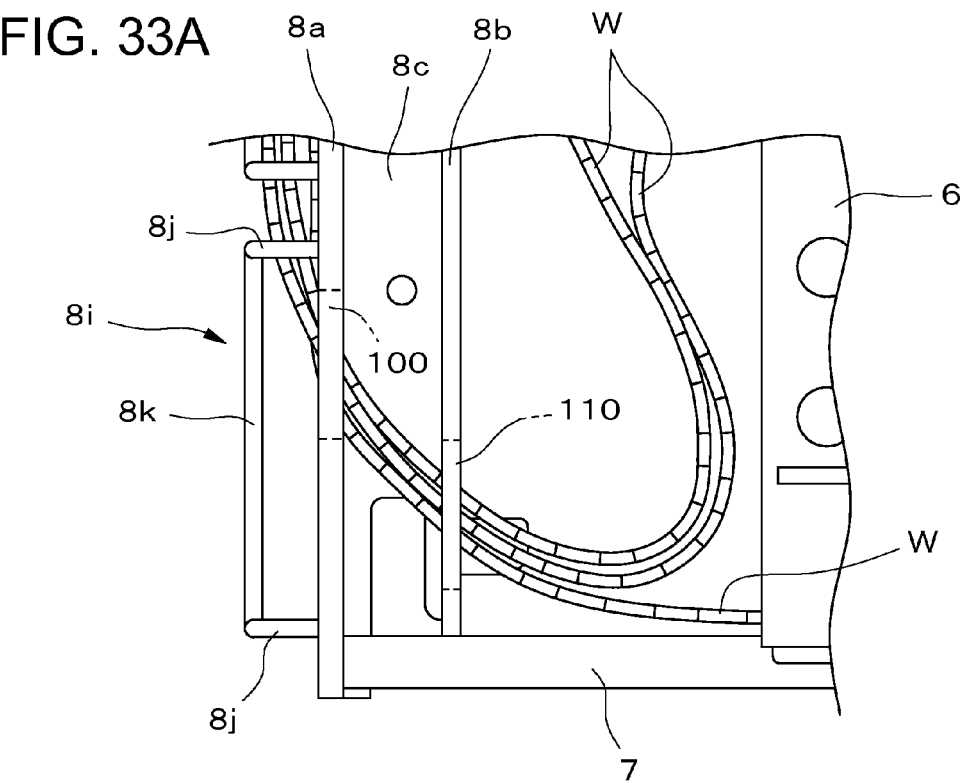
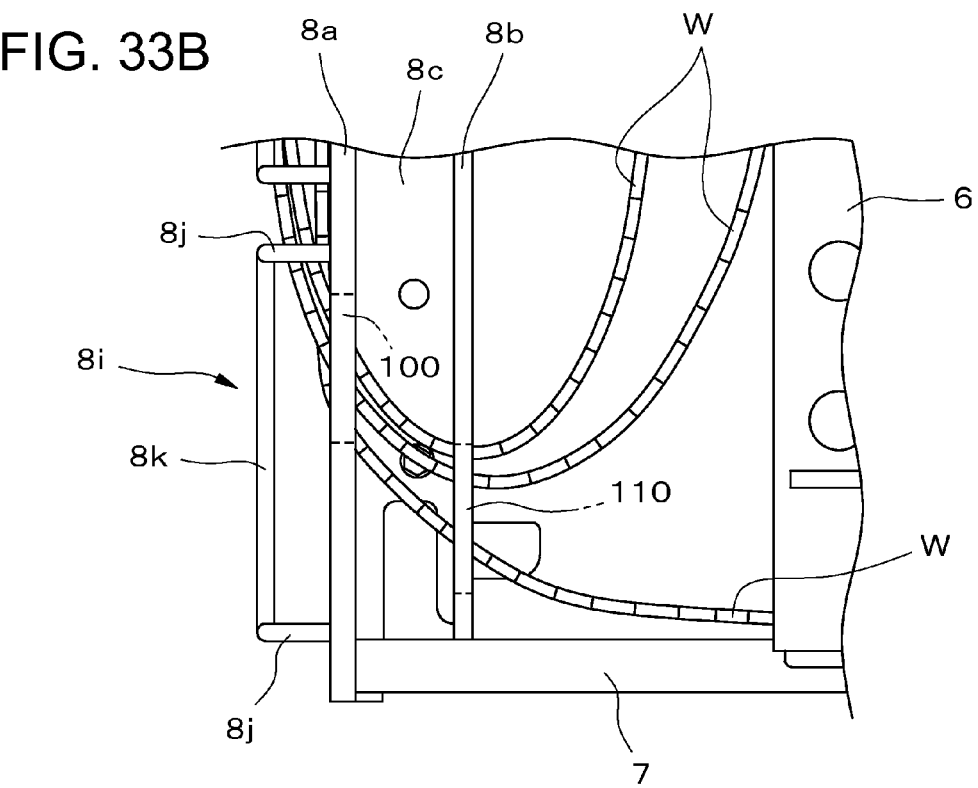

SEAT FRAME AND STOWABLE VEHICLE SEAT WITH THE SAME

CROSS REFERENCE TO RELATED APPLICATIONS

This application is the U.S. national phase of the International Patent Application No. PCT/JP2011/080127, filed Dec. 26, 2011, which claims the benefit of the following Japanese Patent Applications: Application No. 2010-293589, filed Dec. 28, 2010, Application No. 2010-293590, filed Dec. 28, 2010, Application No. 2010-293591, filed Dec. 28, 2010, Application No. 2010-293592, filed Dec. 28, 2010, the entire content of all being incorporated herein by reference.

BACKGROUND

Disclosed herein is a seat frame and a stowable vehicle seat with the seat frame, and particularly, a foldable seat frame for stowage from a normal use state with a high assembly workability and satisfactory operability during stowing operation, including a seat bottom frame into which a cable is pulled from the side portion thereof, and a stowable vehicle seat with the seat frame.

Hitherto, there is known a stowable vehicle seat that is switchable between a normal use state and a state where a seat back is stowed in a stowing recess portion of a vehicle floor while being inclined forward. With regard to the portion for stowing the stowable vehicle seat, the stowing recess portion may be provided in the vehicle floor at the front side of the stowable vehicle seat (that is, the lower front portion of the stowable vehicle seat) due to a design of a vehicle or a demand for a reliable luggage accommodation space.

In such a case, in order to smoothly stow the stowable vehicle seat in the stowing recess portion without any interference of the stowable vehicle seat with respect to the other component or member (for example, the seat disposed at the front row, the side wall of the stowing recess portion, or the like), there is known a technique in which the seat is slidable in the front to back direction by assembling the upper rail and the lower rail, the seat is slid rearward before stowing operation, and the seat is stowed by tipping-up (for example, Japanese Patent Document No. 2009-196422 A ("the '422 Document")). In this way, according to the technique disclosed in the '422 Document, the seat back provided in the stowable vehicle seat is gradually inclined and is slid in the front to back direction so that the seat back and the seat bottom frame may be stowed while being appropriately folded in the stowed state.

Further, in such a stowable vehicle seat adapted to be slidable, when the seat is in the front-most state (the state where the seat is present at the front-most position), the seat interferes with the front seat so that the seat may not be stowed. In order to avoid such an occasion, there is proposed a seat equipped with a canceling mechanism that prevents canceling of a lock of a lock mechanism when a seat is not in the rearmost state (the state where the seat is present at the rearmost position) (for example, Japanese Patent Document No. 2008-260325 A ("the 325 Document")).

As an example of the canceling mechanism, there is known a configuration in which the upper rail of the seat slide mechanism is provided with a lever that may engage with or separate from the lock canceling member of the lock mechanism provided in the lower rail. Further, as for the lever, a technique is also known in which the lever may not engage with the lock canceling member of the lock mechanism when the upper rail is not in the rearmost state and the lock of the lock mechanism is canceled by the lever when the upper rail becomes the rearmost state.

In such a canceling mechanism, there is a need to ensure the precision in which the upper rail stops at the rearmost position and the precision in which the lever engages with the lock canceling member. That is, in the seat slide mechanism, there is a need to ensure the mounting precision and the component precision of the stopper that stops the upper rail at the rearmost position. Further, there is a need to ensure the mounting precision and the component precision of the lever and the lock mechanism.

In order to solve the error of the component precision and the mounting precision, the size of the lever or the lock canceling member of the lock mechanism needs to be increased, and hence a problem arises in that the size of the canceling mechanism is increased. For this reason, the '325 Document proposes a technique in which the size of the canceling mechanism is decreased.

Further, there is also proposed a technique in which the seat reliably tips up from the rear portion while folding the seat back, without causing an occasion that the tipping-up is not completely performed, by mechanically urging a procedure in which the seat is slid to the rearmost position and the striker lock is unlocked (for example, Japanese Patent Document No. 2005-53246 A ("the '246 Document")).

The cushion material of the vehicle seat is generally supported by the seat bottom frame. In many cases, the vehicle seat includes a slide mechanism which slides the vehicle seat in a predetermined direction or a reclining mechanism which adjusts the inclination of the seat back. Further, in some cases, the vehicle seat further includes a folding mechanism which folds the vehicle seat as described above. In such a mechanism, a cable may be used as a component (particularly, a power transmission component) thereof (for example, see Japanese Patent Document No. 2009-292266 A ("the '266 Document")).

In the vehicle seat disclosed in the '266 Document, a cable is used as the reclining mechanism or the mechanism for canceling the lock of the sliding of the vehicle seat.

SUMMARY

The stowable vehicle seat of the '422 Document is equipped with a seat slide device, and the slide device has a configuration in which the slide lock mechanism is appropriately canceled in cooperation with the movement of the seat slide mechanism. Thus, it is possible to easily perform an operation in which the seat is slid rearward upon seat stowage.

However, since the configuration for the slide operation is obtained by the combination of a plurality of components, there are problems in which the configuration becomes complex and the assembly operation becomes complicated. Further, when the configuration for sliding the stowable vehicle seat to the stowable position is configured with the members separately assembled to the vehicle floor and the seat, the mounting work efficiency is degraded. For this reason, it was desirable to devise a technique with high mounting work efficiency. Furthermore, the seat stowing operation needs to be manually performed in many cases. Accordingly, it was desirable to devise a technique capable of more easily performing the operation of sliding the stowable vehicle seat to the stowable position (that is, the rearmost position).

Further, there is a need to stow the stowable vehicle seat after the seat is slid to an appropriate position when stowing the stowable vehicle seat by pivoting. However, when the seat is manually slid, the seat may not be slid to an appropriate position, and the stowing operation may not be performed smoothly in some cases. Thus, it was desirable to devise a technique capable of smoothly performing the stowing operation by simply and reliably sliding the stowable vehicle seat to the stowable position.

Further, the stowable vehicle seat of the '422 Document includes the reclining mechanism that inclines the seat back and further includes a structure that inclines the seat back toward the seat bottom frame to stow the seat. Thus, it is possible to easily perform an operation of inclining the seat back to the seat base upon seat stowage.

Further, the stowable vehicle seat of the '422 Document has a configuration in which an operation of folding the seat back toward the seat base is gradually performed and the seat is slid to a position where the tipping-up may be performed in accordance with the folding operation, a configuration of locking the slide of the seat, or a configuration of releasing the lock of the seat.

In this way, according to the technique of the '422 Document, since the operation of folding the seat back is gradually performed, the stowable vehicle seat slides to a position appropriate for the stowing operation and the seat may be easily stowed in an appropriate folded state. However, in a series of operations according to the stowing operation, it has been desirable to derive a technique capable of more simply performing the stowing operation by automatically performing a part of the operations. Then, it has been desirable to derive a technique capable of automatically performing a part of the folding operation and stably performing the folding operation without abruptly inclining the seat back.

Further, the seat back of the stowable vehicle seat is folded toward the seat base and is stowed by the tipping-up. For this reason, when the folding operation is abruptly performed, the seat is rattled so that the stowing operation may not be appropriately performed, and the seat may not be stowed. Thus, it has been desirable to derive a technique capable of stowing the seat in an appropriate folded state by stably performing the folding operation without causing the rattling of the seat when folding the seat in the stowing operation.

Further, the techniques disclosed in the '325 Document and the '246 Document both have a configuration in which the lever is operated by the wire connected to the lever. Then, the canceling mechanism is used in the technique of the '325 Document, and the converting mechanism is needed in the technique of the '246 Document. Thus, as in the '325 Document and the '246 Document, there are problems in which the configuration is complex and it takes time for mounting operation. Then, in consideration of such circumstances, it has been desirable to derive a technique capable of regulating the tipping-up other than a stowing preparation position with a simple configuration.

The cable is generally wired in the periphery of the seat bottom frame. For example, a case may be supposed in which the wire is pulled around the side portion of the seat bottom frame and is disposed on the upper surface of the seat bottom frame. In such a case, the cable is nipped between the seat bottom frame and the cushion material disposed thereabove. Accordingly, a load is directly applied to the cable when a person sits on the seat which makes it possible that the cable may be damaged or deformed by the pressure.

In order to solve such a circumstance, a configuration may be supposed in which a cushion material that reduces the load applied to the cable is disposed in the periphery of the cable, but the number of components increases and the manufacturing cost increases. Thus, it has been desirable to derive a technique capable of appropriately wiring the cable so that no load is applied to the cable wired in the periphery of the seat bottom frame when a person seats himself/herself on the seat.

Therefore, the various embodiments of the invention are made in view of the above-described problems, and it is an object to provide a seat frame with a high assembly work efficiency and simplified stowing operation, and a stowable vehicle seat with the seat frame. Further, it is another object to provide a seat frame that enables simple and reliable sliding of a stowable vehicle seat to a stowable position, and a stowable vehicle seat with the seat frame.

Further, it is still another object to provide a seat frame that enables simplified stowing operation and stable folding operation, and a stowable vehicle seat with the seat frame. Furthermore, it is still another object to provide a seat frame that enables reliable stowing operation through stable folding operation, and a stowable vehicle seat with the seat frame.

Further, it is still another object to provide a seat frame that enables regulation of tipping-up at a position other than a stowing preparation position with a simple configuration, and a stowable vehicle seat with the seat frame.

Furthermore, it is still another object to provide a seat frame that enables reduction of the number of components and weight decrease with a simple configuration, reliable detection of a stowing preparation position, precision improvement of mounting operation, or cost reduction, and a stowable vehicle seat with the seat frame.

Further, it is still another object to appropriately wire a cable so that no load is applied to the cable while an occupant seats himself/herself, in the case where the cable is pulled from a side portion of a cushion frame.

According to a seat frame of an embodiment of the invention, the above-described problems are solved by a seat frame provided in a stowable vehicle seat which is tipped up to be stowed in a vehicle floor in a state where a seat bottom frame and a seat back frame are folded, the seat frame including: a reclining mechanism which supports the seat back frame tiltably with respect to the seat bottom frame, a seat slide mechanism which slides the seat bottom frame in the front to back direction, a slide lock mechanism which prohibits or allows an operation of the seat slide mechanism in cooperation with the reclining mechanism, a striker lock mechanism which locks a rear portion of the seat bottom frame to the vehicle floor and regulates a pivoting of the stowable vehicle seat, and an assist mechanism which assists an operation of stowing and returning the stowable vehicle seat; in which the seat slide mechanism includes: a lower rail which extends in the front to back direction of the vehicle body, an upper rail which slidably engages with the lower rail, and a slide biasing member which automatically slides the upper rail in cooperation with a movement in which the seat back frame is inclined to a predetermined angle by the reclining mechanism when stowing the stowable vehicle seat, and the seat slide mechanism and the slide lock mechanism are mounted to the seat bottom frame.

In this way, in the seat frame provided in the stowable vehicle seat which is stowed while folding the seat bottom frame and the seat back frame, the seat slide mechanism is provided with the slide biasing member so that the seat bottom frame may be automatically slid with respect to the lower rail. Thus, the stowing operation may be more simply performed. Further, since a slide change amount is determined by the slide biasing member, the seat bottom frame may be reliably slid to a position appropriate for the stowing operation.

Then, since the seat slide mechanism and the slide lock mechanism for controlling the operation of the seat slide mechanism are mounted to the seat bottom frame, the assembly operation of the seat slide mechanism does not become complex when mounting the seat frame to the vehicle body (the vehicle floor). Since the seat frame with the above-described configuration is integrally formed with the lower rail, the seat frame may be easily assembled to the vehicle floor just by locking the lower rail to the vehicle floor. Thus, it is possible to perform the mounting operation with high work efficiency when mounting the stowable vehicle seat that may automatically slid to the stowable position to the vehicle floor.

At this time, as in an embodiment of the invention, it is preferable that the seat frame further include an interlock mechanism which is provided separately from the striker lock mechanism to regulate the tipping-up of the seat frame, in which one end of the slide biasing member is locked to the interlock mechanism.

In this way, since the slide biasing member is mounted to a part of the interlock mechanism, there is no need to separately provide a member mounted with the slide biasing member. Further, since it is possible to perform the mounting operation of the slide biasing member in cooperation with the assembly operation of the member forming the interlock mechanism, it is possible to further improve the assembly work efficiency of the stowable vehicle seat.

Further, the interlock mechanism is disposed at a position which becomes a base point of the tipping-up when the stowable vehicle seat is stowed by the tipping-up. Then, in order to prevent the interference of the stowable vehicle seat with the other members disposed inside the vehicle, the seat is slid to the installation position of the interlock and is stowed in many cases. Thus, since one end of the slide biasing member is locked to particularly the interlock mechanism among the other members, the stowable vehicle seat may be slid while being biased toward the installation position of the interlock mechanism. As a result, the seat bottom frame may be reliably slid at the stowing position and the stowing operation may be more simply performed.

Further, at this time, as in an embodiment of the invention, it is further preferable that the seat frame further include a link mechanism which adjusts the angles of the seat bottom frame and the seat back frame, in which the link mechanism maintains the inclination angle of the seat back frame while the upper rail slides.

With such a configuration, the seat back frame is maintained without any inclination in the upper rail, that is, the slide of the seat bottom frame. In this way, since the seat bottom frame slides while maintaining the inclination angle of the seat back frame at the slide starting time point, the stowable vehicle seat may stably slide to the stowing position without any rattling. Thus, the stowable vehicle seat may be further reliably slid to a position appropriate for the stowing operation.

Further, at this time, as in an embodiment, it is preferable that: the seat back frame is pivotably mounted to the seat bottom frame; when the folding direction toward the seat bottom frame in the pivoting direction of the seat back frame is assumed to be a first direction and a direction opposite to the first direction is assumed to be a second direction, the seat back frame includes: a first biasing member that biases the seat back frame in the first direction, a first engagement member that is mounted to the seat back frame through an engagement when the first biasing member biases the seat back frame, a second biasing member that biases the seat back frame in the second direction, and a second engagement member that is mounted to the seat back frame through an engagement when the second biasing member biases the seat back frame; the first biasing member biases the seat back frame in the first direction while engaging with the first engagement member until the seat back frame pivots in the first direction and reaches a manual operation range; and when the seat back frame reaches the manual operation range, the engagement state between the first biasing member and the first engagement member is canceled.

When the direction in which the seat back frame is folded toward the seat bottom frame in the pivoting direction of the seat back frame is set as the first direction and the direction opposite to the first direction is set as the second direction, the seat frame with the above-described configuration includes the first biasing member that biases the seat back frame in the first direction and the second biasing member that biases the seat back frame in the second direction. Then, since the first biasing member engages with the first engagement member in the operation of folding the seat back frame, the seat back frame is biased in the first direction so that the seat back frame is automatically inclined and reaches the manual operation range. In this way, when the manual operation range of the seat back frame is set and the seat back frame is biased by the first biasing member in the first direction, the operation until the seat back frame reaches the range may be automatically performed.

Then, when the seat back frame reaches the manual operation range, the engagement state between the first biasing member and the first engagement member is canceled.

In this way, in a state where the seat back frame reaches the manual operation range, the seat back frame is not biased by the first biasing member in the first direction. Thus, in a state where the seat back frame reaches the manual operation range, it is possible to prevent the seat back frame from being abruptly folded in the first direction. As a result, the seat back frame may be stably folded without causing an occasion in which the seat back frame is abruptly folded and contact the seat bottom frame, and hence the stowing operation may be reliably performed.

Further, since the biasing range using the first biasing member is controlled by the folding angle of the seat back frame, the seat back frame may be stably maintained at a predetermined position with respect to the seat bottom frame when the seat back frame pivots, instead of being completely folded toward the seat bottom frame. Thus, the seat frame may stably perform the folding operation without causing an occasion in which the seat back frame is abruptly folded and contacts the seat bottom frame.

At this time, as in an embodiment of the invention, it is preferable that, in a state where the seat back frame is in the manual operation range, the second biasing member biases the seat back frame in the second direction while engaging with the second engagement member.

In this way, in a state where the seat back frame pivots forward and exists in the manual operation range, the second biasing member engages with the second engagement member so that the seat back frame is biased in the second direction. Thus, since the biasing force caused by the second biasing member is exerted when folding the seat back frame, the rattling of the seat is prevented without an occasion in which the seat back frame is abruptly folded.

At this time, as in an embodiment of the invention, it is preferable that the second biasing member engages with the second engagement member before the engagement state between the first biasing member and the first engagement member is canceled.

Immediately after the seat back frame reaches the manual operation range and the biasing state in the first direction is canceled, the biasing force in the first direction is applied to the seat back frame by the inertia force. However, in a configuration in which the seat back frame receives the biasing force in the second direction before the biasing of the first biasing member with respect to the seat back frame in the first direction is canceled, it is possible to reduce an influence of the inertia force in the first direction. As a result, the seat back frame is stably inclined to a predetermined position within the manual operation range, and may be maintained at the predetermined position.

At this time, as in an embodiment of the invention, it is preferable that the second biasing member engages with a lock portion provided in the seat bottom frame until the seat back frame reaches the manual operation range so that a state where the seat back frame is biased in the second direction is released, and the first biasing member engages with a stopper portion provided in the seat bottom frame while the seat back frame is in the manual operation range so that a state where the seat back frame is biased in the first direction is released.

In this way, the engagement state between the second biasing member and the seat back frame is released in a manner such that the second biasing member is locked to the seat bottom frame until the seat back frame pivots in the first direction and reaches the manual operation range so that the biasing force of the second biasing member in the second direction is not transmitted to the seat back frame. As a result, since the seat back frame is biased in the first direction by the first biasing member, the seat back frame may be easily pivoted.

Further, the biasing force of the first biasing member in the first direction is not transmitted to the seat back frame any more, since the first biasing member is locked to the seat bottom frame in a state where the seat back frame pivots within the manual operation range. As a result, when the seat back frame reaches a predetermined position, the seat back frame may be stably maintained at the position without being abruptly inclined toward the seat bottom frame.

Further, at this time, as in an embodiment, it is preferable that the first biasing member and the second biasing member are each formed by a spring wound in a spiral shape, the winding direction of the spring forming the first biasing member is made opposite to the winding direction of the spring forming the second biasing member, the diameter of the spring forming the first biasing member is larger than the diameter of the spring forming the second biasing member, and the number of winding of the spring forming the first biasing member is greater than the number of winding of the spring forming the second biasing member.

In this way, the winding direction of the spring forming the first biasing member is opposite to the winding direction of the spring forming the second biasing member, and the biasing force of the spring forming the first biasing member is stronger than the biasing force of the spring forming the second biasing member so that the pivoting direction and the pivoting speed of the seat back frame may be appropriately controlled.

Further, at this time, as in an embodiment of the invention, it is further preferable that the first engagement member moves in cooperation with the slide lock mechanism.

With such a configuration, in the stowable vehicle seat which is slid to an appropriate position and is stowed upon seat stowage, it is possible to control whether to perform the sliding of the seat in accordance with the inclination of the seat back frame. In this way, since it is possible to control whether to perform the sliding of the seat in cooperation with the inclination of the seat back frame, the stowing operation may be further easily performed.

Further, at this time, since the seat frame with the first biasing member and the second biasing member may stably incline the seat back frame, the seat may be stably slid to the stowing position without causing the rattling of the seat. Thus, the seat stowing operation may be further stably and reliably performed.

Further, at this time, as in an embodiment of the invention, it is preferable that the second biasing member is disposed inside the seat bottom frame.

In this way, since the second biasing member is disposed inside the seat bottom frame, that is, the side occupant seating himself/herself, the size of the seat back frame may be decreased compared to the case where the second biasing member is disposed outside the seat bottom frame.

Further, as in an embodiment, it is preferable that the seat frame further include an interlock mechanism which is provided separately from the striker lock mechanism to regulate the tipping-up of the seat frame, in which: the slide lock mechanism sets or cancels a slide lock for locking the movement of the upper rail movably provided in the lower rail by the seat slide mechanism, the striker lock mechanism locks a rear portion of the lower rail of the seat slide mechanism to the vehicle floor and regulates a pivoting of the seat frame, and the interlock mechanism includes a mechanism which fixes the seat frame to the vehicle body and is operated when the seat frame is positioned at a stowing preparation position to release the seat frame from the vehicle body.

In this way, the interlock mechanism is provided separately from the striker lock mechanism to regulate the tipping-up of the seat frame, and the interlock mechanism fixes the seat frame to the vehicle body which operates when the seat frame is at the stowing preparation position to release the seat frame from the vehicle body. Accordingly, even when the locking of the rear portion of the lower rail with respect to the floor by the striker lock mechanism is canceled and the regulation of the pivoting of the seat frame is canceled, the tipping-up of the seat frame may be regulated until the seat frame reaches the stowing preparation position.

More specifically, as in an embodiment, it is preferable that the interlock mechanism which fixes the seat frame to the vehicle body and is operated when the seat frame is positioned at the stowing preparation position to release the seat frame from the vehicle body includes an interlock which is pivotably provided in the seat frame, an interlock biasing member that biases the interlock toward a striker provided in the vehicle body, and a biasing member that biases the interlock; and that the interlock is configured to be capable of engaging with or separating from the striker provided in the vehicle body at the stowing preparation position.

With such a configuration, the striker lock mechanism and the interlock mechanism may share the striker with each other, and hence the vehicle-body-side striker with the same configuration as the case without the interlock mechanism may be used. Accordingly, there is no need to particularly change the configuration.

At this time, as in an embodiment, the interlock may be biased by the biasing member against the interlock biasing member to be separated from the striker at the stowing preparation position of the seat frame.

Further, as in an embodiment, it is preferable that the interlock mechanism is provided between the seat frame and the striker lock mechanism. In this way, since the interlock mechanism is provided between the seat frame and the striker lock mechanism, a compact size may be realized by saving the installation space.

Further, as in an embodiment, it is preferable that the seat bottom frame comprises, at a side portion thereof, a cushion material placement portion for placing a cushion material on the upper surface of the cushion material placement portion and an intersection portion which is provided in the lower portion of the cushion material placement portion to intersect with the cushion material placement portion; and that, on the intersection portion, a hole is formed through which a cable pulled thereinto from the side portion of the seat bottom frame passes.

With such a configuration, since the cable pulled from the side portion of the seat bottom frame passes through the hole, it is possible to prevent the cable from being nipped between the cushion material placement portion and the cushion material. As a result, no load is directly applied to the cable upon seating or the like, and the damage or deformation of the cable may be prevented.

Further, as in an embodiment, it is preferable that a bottom portion is provided adjacent to the lower portion of the intersection portion to intersect with the intersection portion; a second intersection portion is provided to be adjacent to the bottom portion, opposite to the position of the intersection portion; on the second intersection portion, a second hole is formed through which the cable pulled thereinto from the side portion of the seat bottom frame passes; and the hole and the second hole are both elongated holes.

With such a configuration, the cables may appropriately be wired in an arranged state.

Specifically, as in an embodiment, it is further preferable that, when the stowable vehicle seat is movable in the movement direction, the intersection portion and the second intersection portion extend in the movement direction, and the formation position of the hole in the extension direction of the intersection portion and the formation position of the second hole in the extension direction of the second intersection portion are different from each other in the movement direction.

With such a configuration, it is possible to sufficiently ensure the cable movable range when the stowable vehicle seat is moved, and hence to smoothly move the cable without interfering with operation of the stowable vehicle seat.

Further, as in an embodiment, it is preferable that, on the hole and the second hole, a circular hole portion which is positioned at the end of the elongated hole in the longitudinal direction and has an inner diameter larger than the outer diameter of the cable and a slit portion which is adjacent to the circular hole portion and extends in the longitudinal direction are formed respectively, and the width of the slit portion in the intersection direction intersecting with the longitudinal direction is smaller than the inner diameter of the circular hole portion and is larger than the outer diameter of the cable.

With such a configuration, the cable passing through the circular hole portion may be easily inserted through the hole or the second hole. Further, the cable passing through the circular hole portion is shifted to pass through the slit portion. Accordingly, the fluttering of the cable may be suppressed through the slit portion when the stowable vehicle seat is moved.

Further, as in an embodiment, it is preferable that a plurality of the cables pulled from the side portion of the seat bottom frame pass through the hole.

With such a configuration, the respective cables may be appropriately wired by arranging the plurality of cables pulled from the side portion of the seat bottom frame.

Further, as in an embodiment, it is preferable that the seat back frame is pivotable with respect to the seat bottom frame when the stowable vehicle seat is folded, the stowable vehicle seat is foldable by pivoting of the seat back frame, and the seat bottom frame supports the cushion material.

Such a configuration makes the effects more significant by forming the hole through which the cable passes on the intersection portion. That is, a person or luggage is loaded on the folded stowable vehicle seat (specifically, the rear surface of the seat back). In such a circumstance, when the cable is nipped between the cushion material placement portion and the cushion material, a load is more frequently applied to the cable. Accordingly, the effects of the invention are made significant in that the nipping of the cable between the cushion material placement portion and the cushion material is prevented by inserting the cable through the hole.

Further, according to a stowable vehicle seat of an embodiment of the invention, the above-described problems are solved by a stowable vehicle seat including at least: a seat frame, a cushion material which is placed on the seat frame, and a surface material which covers the seat frame and the cushion material; in which the seat frame according to any one of the embodiments is used as the seat frame.

In this way, in the stowable vehicle seat including the seat frame with the above-described configuration, the seat slide mechanism and the slide lock mechanism are integrally provided in the seat frame. Accordingly, the work efficiency is satisfactory when the seat is assembled to the vehicle floor. Further, since the seat slide mechanism is provided with the slide biasing member that slides the seat bottom frame, the stowable vehicle seat may be automatically slid to the appropriate position.

Further, the seat frame with the first biasing member and the second biasing member is used as stowable vehicle seat including the seat frame with the above-described configuration. Thus, since the first biasing member engages with the first engagement member when the seat back frame is folded, the seat back frame is biased in the first direction and automatically reaches the manual operation range.

Due to the seat frame with the above-described configuration, it is possible to prevent the rattling of the seat without abruptly inclining the seat back in the stowable vehicle seat. As a result, the seat back is stably inclined to a predetermined position, and may be maintained at the predetermined position.

In this way, since the biasing directions of the first biasing member and the second biasing member are controlled by the folding angle of the seat back, the seat back may be maintained at a predetermined position with respect to the seat base instead of a configuration in which the seat back is inclined to be completely folded toward the seat base. Thus, the stowable vehicle seat enables stable folding operation without causing an occasion where the seat back is abruptly folded and the seat back contacts the seat base.

As a result, the stowable vehicle seat of the invention enables further stable folding operation during the stowing operation, and hence reliable stowing operation.

Further, the stowable vehicle seat including the seat frame with the above-described configuration enables regulation of tipping-up of the seat frame until the seat frame reaches the stowing preparation position, even when locking of the rear portion of the lower rail with respect to the floor by the striker lock mechanism is canceled and the regulation of pivoting of the seat frame is canceled.

Further, in the stowable vehicle seat including the seat frame with the above-described configuration, since the cable pulled from the side portion of the seat bottom frame is inserted through the hole formed in the intersection portion as described above, the cables may be appropriately wired without nipping the cables between the cushion material placement portion and the cushion material.

According to the seat frame of an embodiment, since the slide biasing member is provided, the seat bottom frame may be simply and reliably guided to the appropriate stowing position. As a result, the stowing operation may be smoothly performed. Further, since the seat slide mechanism and the slide lock mechanism are integrally provided, it is possible to provide the seat frame with high work efficiency in the assembly operation with respect to the vehicle floor.

According to the seat frame of an embodiment, the slide biasing member is mounted to the interlock mechanism and the assembly is performed at an intensive area when assembling the stowable vehicle seat. Accordingly, the assembly operation may be performed with higher efficiency. Further, it is possible to provide the seat frame capable of further simply and reliably performing the stowing operation.

According to the seat frame of an embodiment, since the stowable vehicle seat stably slides, it is possible to provide the seat frame which may reliably slide to the stowing position.

According to the seat frame of an embodiment, it is possible to provide the seat frame capable of automatically inclining the seat back frame at an appropriate speed and stably performing the folding operation. Further, since the biasing direction may be controlled in accordance with the folding angle of the seat back frame, the folding operation may be stably performed, and hence it is possible to provide the seat frame capable of reliably performing the stowing operation.

According to the seat frame of an embodiment, since the biasing force in the second direction is applied when the seat back frame is in the manual operation range, it is possible to provide the seat frame capable of stably performing the folding operation without abruptly pivoting the seat back frame toward the seat bottom frame.

According to the seat frame of an embodiment, it is possible to prevent the abrupt pivoting of the seat back frame due to the inertia force in the first direction, and hence stably pivot the seat back frame to the manual operation range.

According to the seat frame of an embodiment, when inclining the seat back frame to a predetermined position within the manual operation range, the seat back frame may be simply inclined by the first biasing member. When the seat back frame is maintained at a predetermined position, the biasing force is appropriately controlled, and hence the seat back frame may be stably inclined.

According to the seat frame of an embodiment, since the biasing force of the first biasing member is set to be greater than the biasing force of the second biasing member, the seat back frame may be stably tilted by appropriately controlling the pivoting direction and the pivoting speed of the seat back frame.

According to the seat frame of an embodiment, since the seat slide operation may be controlled when folding the seat back frame, it is possible to provide the seat frame which may be further stably folded.

According to the seat frame of an embodiment, the seat frame may be compact in size.

According to the seat frame of an embodiment, it is possible to regulate the tipping-up other than the stowing preparation position with a simple configuration.

According to the seat frame of an embodiment, it is possible to reduce the number of components and the weight with a simple configuration.

According to the seat frame of an embodiment, it is possible to reliably detect the stowing preparation position.

According to the seat frame of an embodiment, it is possible to improve the precision of the mounting operation or to decrease the cost thereof.

According to the seat bottom frame of an embodiment, it is possible to appropriately wire the cables pulled from the side portion of the seat bottom frame without nipping the cables between the cushion material placement portion and the cushion material.

According to the seat bottom frame of an embodiment, it is possible to appropriately wire the cables in an arranged state.

According to the seat bottom frame of an embodiment, since it is possible to sufficiently ensure the cable movable range when moving the stowable vehicle seat, the movement of the stowable vehicle seat is not disturbed, and the cable may be moved without being entangled.

According to the seat bottom frame of an embodiment, the cable may be easily inserted through the hole or the second hole and the fluttering of the cable may be suppressed when moving the stowable vehicle seat.

According to the seat bottom frame of an embodiment, the respective cables may be appropriately wired by arranging the plurality of cables pulled from the side portion of the seat bottom frame.

According to the seat bottom frame of an embodiment, since a person or a luggage is loaded on the folded stowable vehicle seat, in many cases, a load is applied to the cable when the cable is nipped between the cushion material placement portion and the cushion material, and hence the effects are further significant.

According to the stowable vehicle seat of an embodiment, as described above, it is possible to provide the stowable vehicle seat capable of smoothly performing the stowing operation and having satisfactory work efficiency in the assembly operation to the vehicle floor. Further, the folding operation may be easily performed. At this time, the folding operation may be stably performed without abruptly inclining the seat back. Then, since the folding operation is performed without causing the rattling of the seat, it is possible to provide the stowable vehicle seat capable of reliably performing the stowing operation.

Further, it is possible to regulate the tipping-up other than the stowing preparation position with a simple configuration. Further, it is possible to reduce the number of components and decrease the weight with a simple configuration and to reliably detect the stowing preparation position. Accordingly, it is possible to improve the precision of the mounting operation and decrease the cost thereof. Further, it is possible to provide the stowable vehicle seat capable of appropriately wiring the cables without nipping the cables pulled from the side portion of the seat bottom frame between the cushion material placement portion and the cushion material.

BRIEF DESCRIPTION OF THE DRAWINGS

Various embodiments of the invention are illustrated in the following drawing figures, in which:

FIG. 33A is a schematic perspective view illustrating the periphery of the hole through which a cable is inserted according to an embodiment of the invention;

FIG. 33B is a schematic perspective view illustrating the periphery of the hole through which a cable is inserted according to an embodiment of the invention.

DETAILED DESCRIPTION

Hereinafter, an embodiment of the invention will be described with reference to FIGS. 1 to 11. Here, the member, the arrangement, and the like described below do not limit the invention, and may be modified into various forms within the spirit of the invention. The equivalents thereof are included in the invention.

Furthermore, in the description below, a specific example of a seat in the second row divided at the right and left sides of the vehicle will be described, but the invention is not limited thereto. The same configuration may be applied to an elongated single bench type seat that is integrally formed, a front passenger seat, and the other rear seats.

FIGS. 1 to 26 illustrate an embodiment according to the invention. Further, FIGS. 27 to 34 illustrate another embodiment according to the invention.

Furthermore, in the description below, the front side of the vehicle is referred to as the front side and the rear side thereof is referred to as the rear side.

Outline of a Stowable Vehicle Seat of an Embodiment of the Invention

First, a stowable vehicle seat (hereinafter, referred to as a seat S) according to an embodiment of the invention will be described with reference to FIGS. 1 to 8B.

The vehicle mounted with the seat S is provided with two rows of seats provided at the front and rear sides, and the second (rear part side) seat is adapted to be stowable. The seat S is adapted to be movable in a slidable manner in the movement direction (a direction indicated by the arrow in FIG. 1) along the vehicle advancing direction.

Further, the seat S may be folded by pivoting a seat back 2 with respect to a seat base 1, and the seat is adapted to be stowed on a vehicle floor D of a front lower portion while pivoting in the front direction with respect to the vehicle advancing direction in a folded state. Furthermore, the vehicle floor D is provided with a step, and a position (a normal use state) where the seat S is disposed is higher than a stowing position by one level. For this reason, since the seat S is stowed forward, a luggage room may be ensured in which the rear surface of the seat back 2 is flat with respect to the arrangement position of the seat S.

Figure 1:
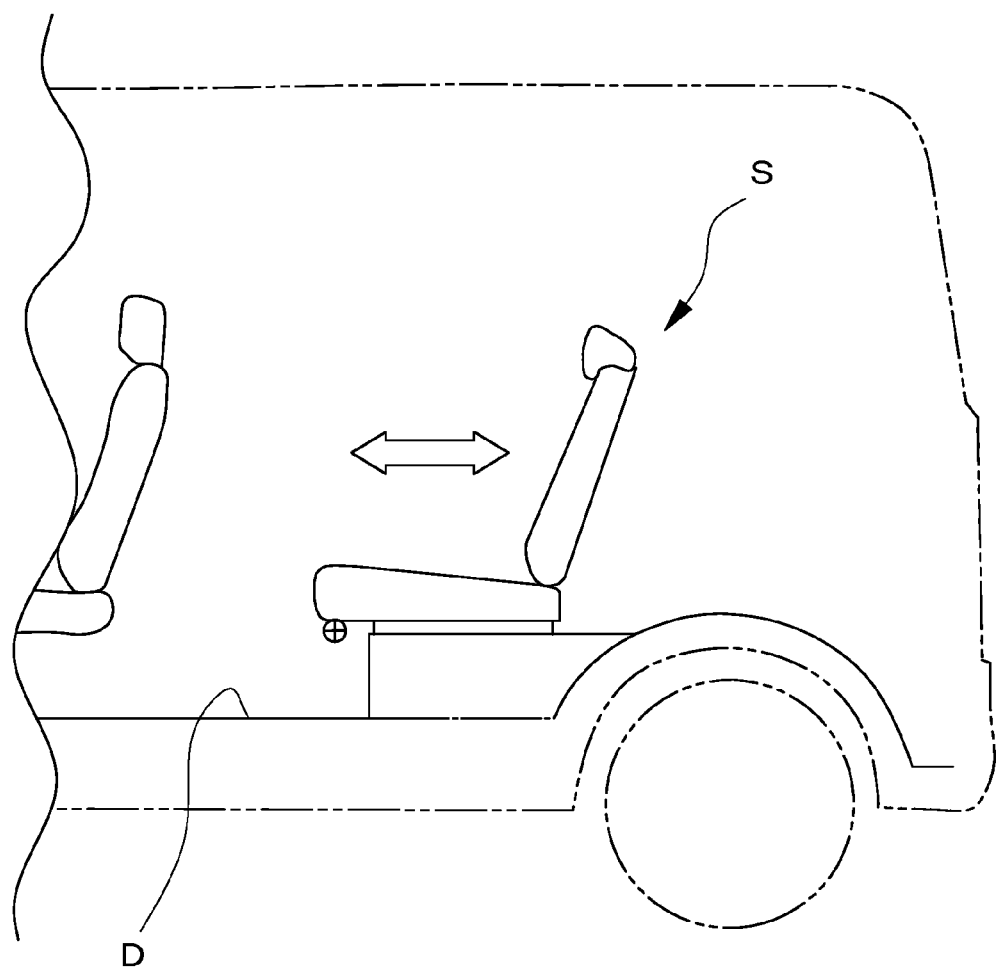
FIG. 1 is a schematic side view of a rear part of a vehicle mounted with a stowable vehicle seat according to an embodiment of the invention.
Figure 2:
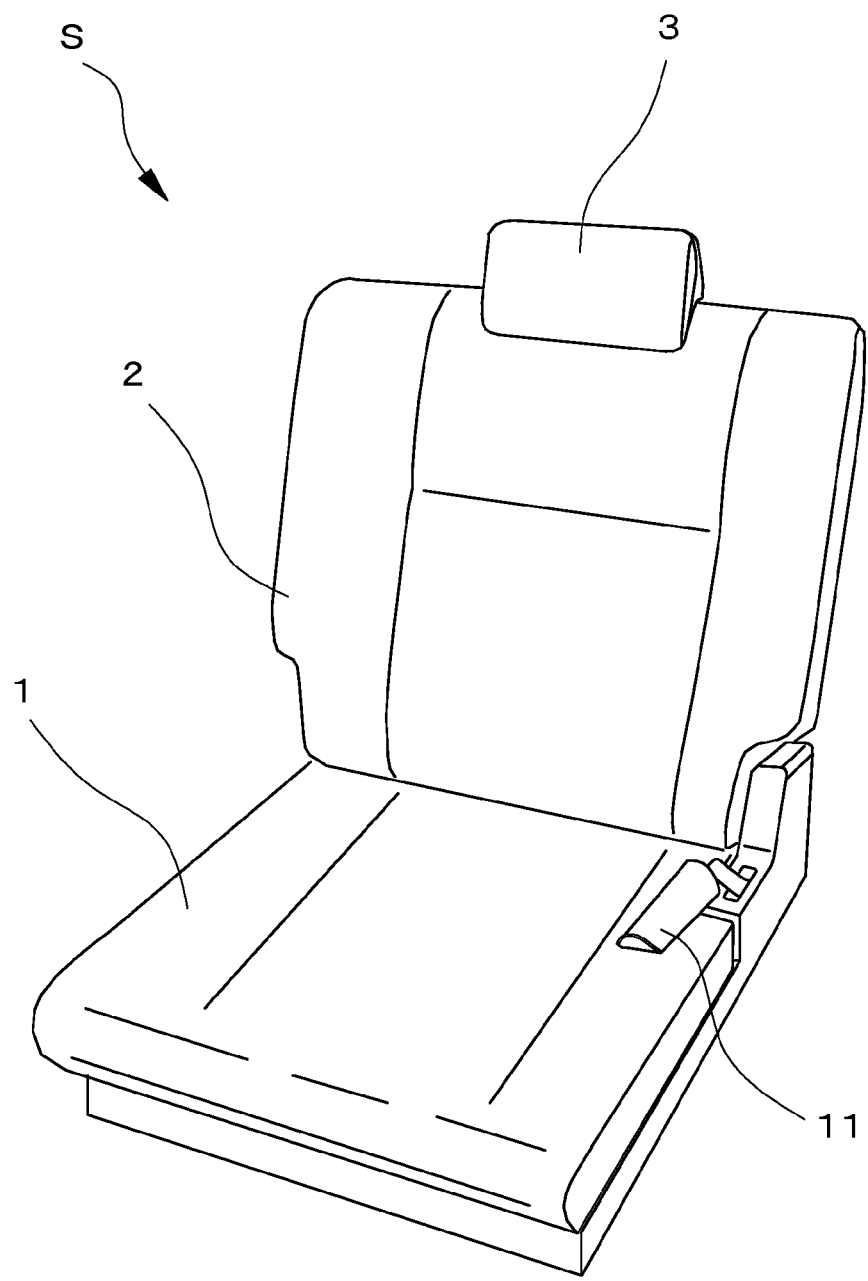
FIG. 2 is a front perspective view of the stowable vehicle seat according to an embodiment of the invention.

As illustrated in FIGS. 1 and 2, the seat S is disposed on the vehicle floor D, and includes the seat base 1, the seat back 2, and a headrest 3. Further, a reclining canceling lever 11 which cancels a reclining operation of the seat S is disposed at the lower side of the seat back 2 (in other words, the rear side of the seat base 1). Furthermore, as a reclining canceling element, a string or strap shaped element may be provided other than the lever shaped element illustrated in the embodiment. The seat S has a configuration in which a cushion material is disposed (placed) on a seat frame to be described later and the surface thereof is covered with a surface skin.

Figure 3:
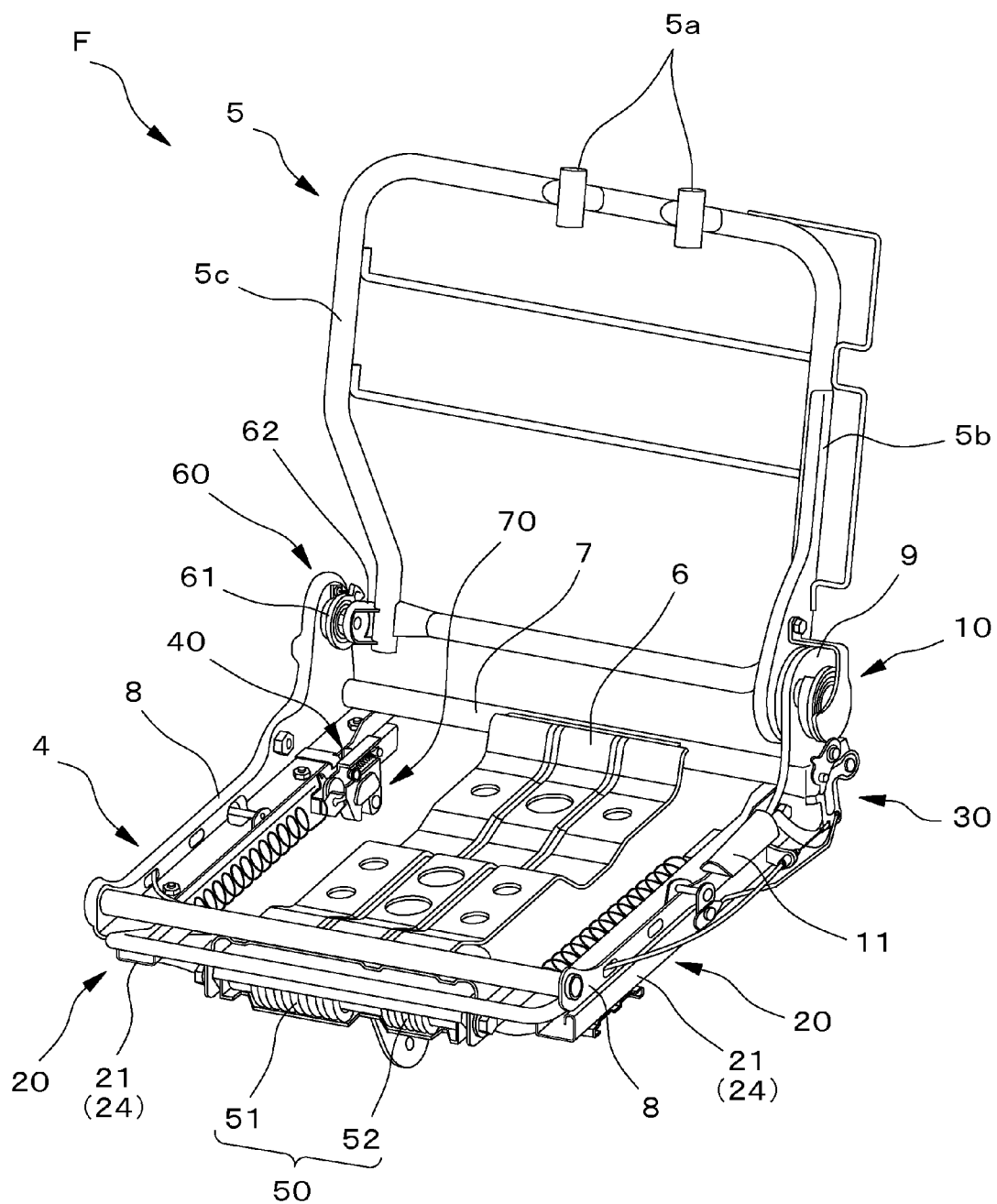
FIG. 3 is a schematic perspective view of a seat frame according to an embodiment of the invention.

A seat frame F of the seat S illustrated in FIG. 3 includes a seat bottom frame 4 forming the seat base 1 and a seat back frame 5 forming the seat back 2. Further, the upper portion of the seat back frame 5 is provided with a pillar support portion 5a into which a pillar supporting a headrest (not illustrated) is insertable.

Since the seat bottom frame 4 constitutes the seat base 1, a cushion pad P as a cushion material is disposed at the upper portion of the seat bottom frame 4, and is covered with a surface material, thereby supporting an occupant from the lower portion thereof.

The front side of the seat bottom frame 4 is supported to be pivotable in the front to back direction of the vehicle with respect to the vehicle floor D. An interlock mechanism 40 and a striker lock mechanism 70 are provided at the rear side of the seat bottom frame 4. The seat bottom frame 4 is locked to a striker 41 (see FIG. 15) near the vehicle floor D through the striker lock mechanism 70 with a striker lock (latch 72), and the striker lock mechanism 70 is adapted so that the striker lock (latch 72) and the striker 41 may be canceled by an operation lever.

Further, the interlock mechanism 40 is a mechanism which prevents the tipping-up of the seat unless the seat reaches the rearmost position even when the seat lock is canceled by the striker lock mechanism 70.

Further, the seat bottom frame 4 includes a bottom plate 6 which defines the bottom portion of the seat bottom frame 4 and side brackets 8 and 8 being separated in the right and left to face each other. Furthermore, connection members 7 are provided in the seat bottom frame 4 to connect the side brackets 8 and 8 to each other, and a bridge plate 9 is disposed between one side bracket 8 and a side plate 5b of the seat back frame 5 to connect these to each other. The respective bottom portions of the side brackets 8 and 8 are provided with the seat slide mechanisms 20 and 20, and the side brackets are adapted to be movable in the front to back direction in cooperation with the operation of the seat back 2 through the reclining mechanism 10 and the seat slide mechanism 20 to be described later. Furthermore, the configuration of the seat slide mechanism 20 will be described later in detail.

The seat back frame 5 is covered by the cushion pad P, the surface material, and the like, and constitutes the seat back 2 which supports the occupant's back from the rear side. The seat back frame 5 is connected to the seat bottom frame 4 through the reclining mechanism 10.

Then, the seat back 2 is pivotable with respect to the seat base 1 by the reclining mechanism 10. Furthermore, in the embodiment, an existing mechanism which cancels the lock of pivoting of the seat back 2 through the operation of the reclining canceling lever 11 is used as the reclining mechanism 10.

Each Mechanism Provided in Seat S

The seat S is provided with the reclining mechanism 10, the seat slide mechanism 20, a slide lock mechanism 30, the interlock mechanism 40, an assist mechanism 50, a link mechanism 60, and the striker lock mechanism 70.

The reclining mechanism 10 is a mechanism which supports the seat back frame 5 of the seat S tiltably with respect to the seat bottom frame 4.

The seat slide mechanism 20 is a mechanism which moves an upper rail 22 with respect to a lower rail 21 so that the seat S slides in the front to back direction of the vehicle (that is, along a slide rail 24).

The slide lock mechanism 30 moves in cooperation with the reclining mechanism 10 to prohibit or allow the operation of the seat slide mechanism 20, and cancels the slide lock of the seat slide mechanism 20 in accordance with the timing in which the seat back frame 5 of the seat S is inclined.

Further, the interlock mechanism 40 locks the seat S to the striker 41 of the vehicle floor D, to prevent an operation in which the seat S is separated from the vehicle floor D and pivots forward.

Further, the assist mechanism 50 is a mechanism which assists the operation of returning and stowing the seat S.

The link mechanism 60 is a mechanism which is provided at a position facing the reclining mechanism 10, and appropriately adjusts an angle between the seat bottom frame 4 and the seat back frame 5 in cooperation with the operation of the reclining mechanism 10. The striker lock mechanism 70 is a mechanism which locks the seat S to the striker 41 of the vehicle floor D and locks the rear portion of the lower rail 21 of the seat slide mechanism 20 to the vehicle floor D. By the striker lock mechanism 70, the forward pivoting of the seat S is regulated.

Hereinafter, referring to FIGS. 4A to 7B, the reclining mechanism 10 and the link mechanism 60 will be described in detail.

Reclining Mechanism 10

The reclining mechanism 10 has a function of connecting the rear side of the vehicle body of the seat bottom frame 4 (more specifically, the bridge plate 9 fixed to the side bracket 8 of the seat bottom frame 4) to the lower side of the seat back frame 5 so that the seat back frame 5 is tiltable with respect to the seat bottom frame 4. The reclining mechanism 10 includes the reclining canceling lever 11 and a spiral spring 12 which serves as a first biasing member that biases the seat back frame 5 in the forward inclining direction, that is, the "first direction". Further, a cooperating plate 32 provided in the slide lock mechanism 30 to be described later corresponds to the first engagement member.

In the reclining canceling lever 11, one end thereof is journaled to the bridge plate 9 of the seat frame F, and when the other end thereof pivots upward, the lock of the reclining mechanism 10 is canceled so that the seat back frame 5 may be tilted. Furthermore, an existing configuration may be used as a configuration in which the lock of the reclining mechanism 10 is canceled by operating the reclining canceling lever 11 in this way.

Then, the spiral spring 12 which serves as the first biasing member provided in the reclining mechanism 10 is locked to the bridge plate 9 of the seat bottom frame 4, and biases the seat back frame 5 in the first direction in a normal state (that is, an state where an occupant seats himself/herself). The configuration of the reclining mechanism 10 in the normal state will be described with reference to FIG. 4A.

The spiral spring 12 is mounted to the outer surface of the bridge plate 9 (the outer surface in relation to the occupant sitting position), and in the embodiment, is wound in a spiral shape in which the spring winds rightward from the inside (the right winding when viewed from the outside of the seat back frame 5). The spiral spring 12 is formed by a metallic wire member, and the inner end thereof is curved in a substantially U-shape to be locked to the bridge plate 9. The outer end of the spiral spring 12 is provided with a curved portion 12*a* which is curved in a substantially U-shape, and engages with the cooperating plate 32 as the first engagement member in the normal state.

The cooperating plate 32 as a first engagement member is a member that is mounted to the side plate 5*b* of the seat back frame 5, and is a member that moves in cooperation with the seat back frame 5. The cooperating plate 32 is formed to have a hook shaped cross section, and includes a first surface 32*a* which is bonded to the side plate 5*b* of the seat back frame 5, a second surface 32*b* which is formed to be substantially upright from the first surface 32*a*, and a third surface 32*c* which extends downward from the second surface 32*b* in the substantially perpendicular direction. Furthermore, for the description in FIGS. 4A to 7A, the third surface 32*c* is indicated by the dotted line.

In the normal state, the curved portion 12*a* of the spiral spring 12 is disposed above the upper end of the bridge plate 9 to be positioned at the rear side of the vehicle body, and is disposed to protrude from the upper end of the bridge plate 9.

Figure 4A:
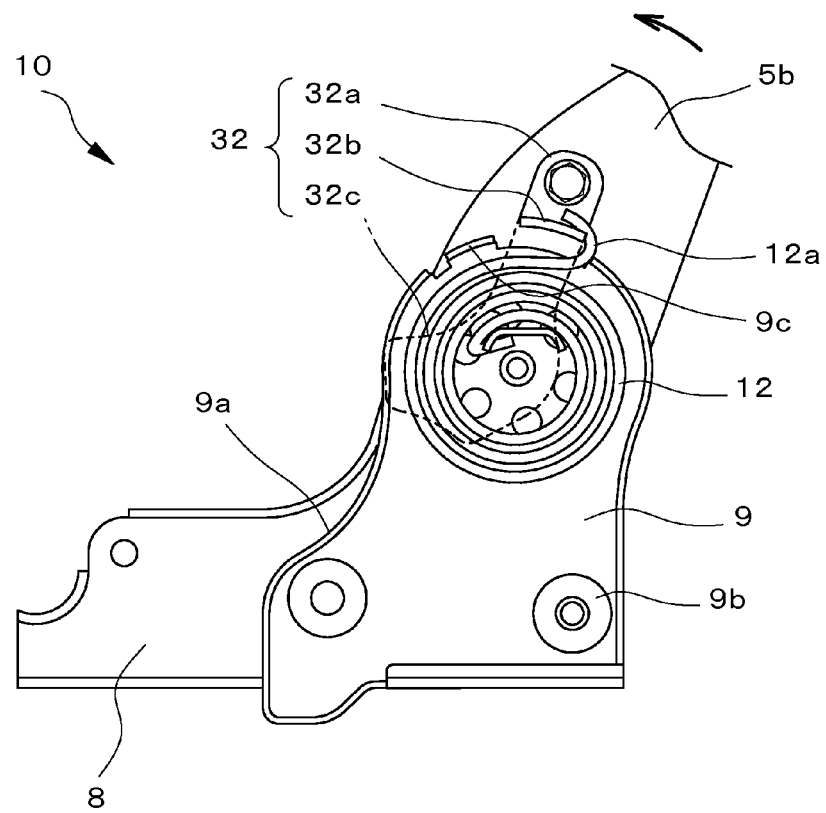
FIG. 4A is an illustrative side-view diagram illustrating a reclining mechanism in a normal seating state according to an embodiment of the invention.

Then, as illustrated in FIG. 4A, the side plate 5*b* of the seat back frame 5 is inclined toward the rear side of the vehicle body and the cooperating plate 32 is bonded to the side plate 5*b* so that the inclination and the position of the first surface 32*a* of the cooperating plate 32 are determined by the inclination of the side plate 5*b*. At this time, the curved portion 12*a* of the spiral spring 12 is biased and stopped by the second surface 32*b*. Thus, in the normal state, the seat back frame 5 is biased in the first direction by the spiral spring 12.

Further, the upper end (in the embodiment, the circular-arc-shaped portion) of the bridge plate 9 is provided with a stopper portion 9*c* which is curved in a direction (a direction rising toward the front side in FIG. 4A) to be substantially upright from the plane of the side plate 5*b* of the seat back frame 5.

Figure 7A:
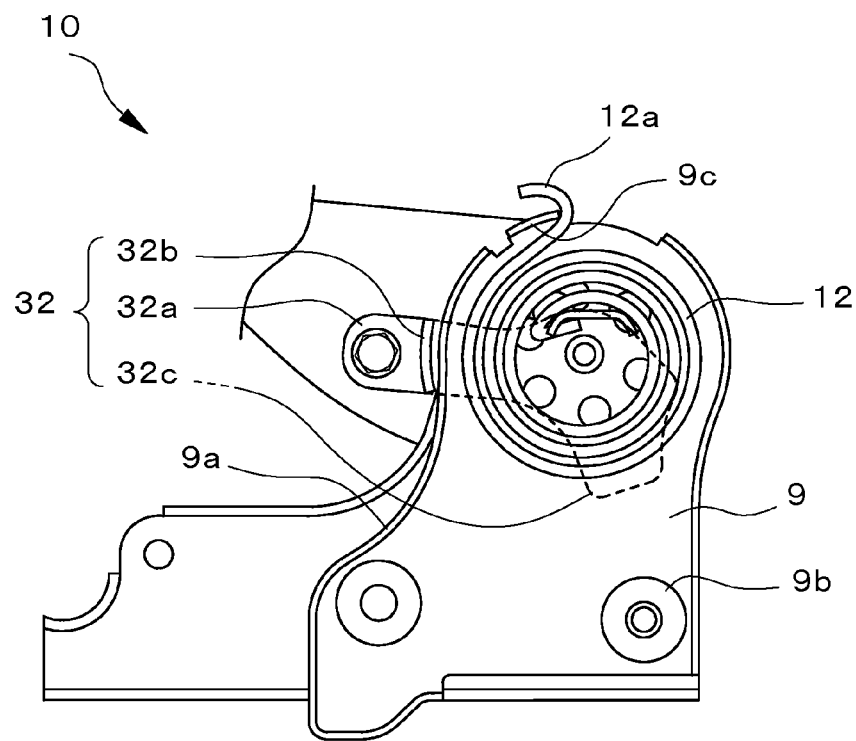
FIG. 7A is an illustrative side-view diagram illustrating the reclining mechanism in a folded state according to an embodiment of the invention.

The stopper portion 9*c* engages with the curved portion 12*a* when the seat back frame 5 is inclined forward to be substantially folded (the state of FIG. 7A). Since the curved portion 12*a* engages with the stopper portion 9*c*, the curved portion 12*a* does not slide toward the front side in relation to the stopper portion 9*c*.

Furthermore, the movement of the seat back frame 5 and the spiral spring 12 will be described later in cooperation with the movement of the link mechanism 60.

Seat Slide Mechanism 20

Figure 11:
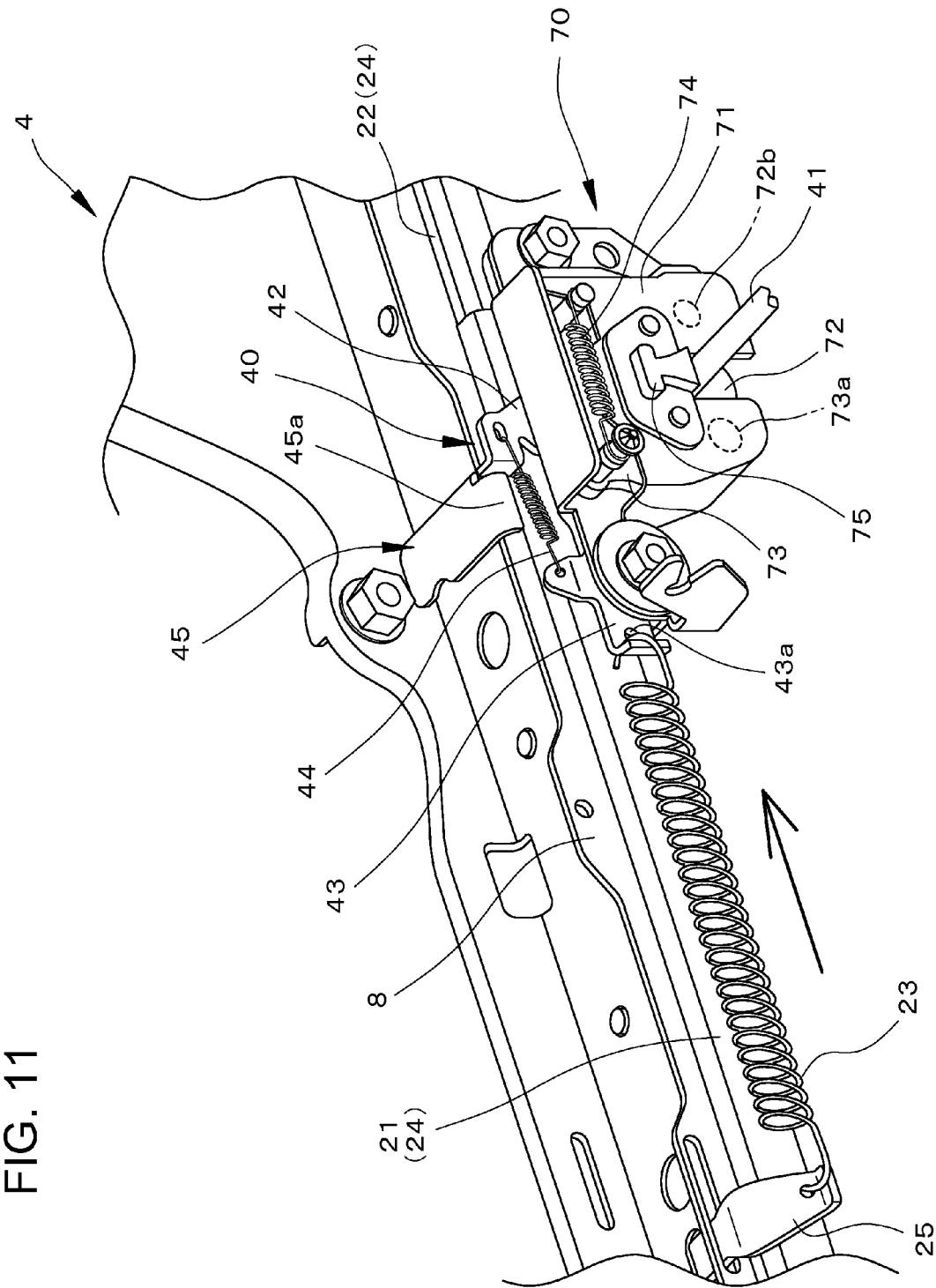
FIG. 11 is a schematic perspective view illustrating the periphery of a slide biasing member according to an embodiment of the invention.

The seat slide mechanism 20 includes the slide rail 24 (the lower rail 21 and the upper rail 22 engaging with the lower rail 21 in a slidable manner) which extends in the front to back direction of the vehicle body and a slide biasing member 23 which causes the upper rail 22 to automatically slide rearward, and is mounted to the lower side of the seat bottom frame 4 (see FIGS. 3 and 11). Then, the seat bottom frame 4 (more specifically, the upper rail 22) is automatically slid rearward in cooperation with the movement in which the seat back frame 5 is inclined by a predetermined angle using the reclining mechanism 10 upon seat stowage S. The main member of the seat slide mechanism 20 includes the lower rail 21 which extends in the front to back direction of the vehicle body, the upper rail 22 which engages with the lower rail 21 in a slidable manner, and the slide biasing member 23 which automatically slides the upper rail 22 rearward. An existing configuration may be used as a configuration in which the lower rail 21 and the upper rail 22 slide on each other. Further, since the seat slide mechanism 20 has the same configuration in the right and left side brackets 8 and 8, the seat mechanism which is mounted to any of both sides (the attachment side of the reclining canceling lever 11) will be described.

The lower rail 21 is disposed on the vehicle floor D, is fixed to the striker 41 of the vehicle floor D by the striker lock mechanism 70, and is mounted with the upper rail 22 which moves thereon in a slidable manner. As illustrated in FIG. 8B and the like, the upper rail 22 is fixed to a bottom wall 8*c* of the side bracket 8 on the upper surface 22*a* which is formed to be substantially horizontal. Thus, when the upper rail 22 slides on the lower rail 21, the seat bottom frame 4 and the seat back frame 5 which are provided thereabove slide in the same direction as that of the upper rail 22. Furthermore, the side bracket 8 is formed in a substantially U-shape with an outer wall 8*a* and an inner wall 8*b* other than the shape of the bottom wall 8*c* which is formed to be substantially horizontal. Further, a flange portion 8*d* extends from the upper end of the outer wall 8*a*.

The slide biasing member 23 corresponds to the slide biasing member provided in the seat slide mechanism 20 and automatically slides the upper rail 22. Then, the slide biasing member is disposed at an inside position of the side bracket 8 along the front to back direction of the seat bottom frame 4. One end of the slide biasing member 23 is locked (fixed) to the frame-side bracket 25 mounted to the front end of the side bracket 8 bonded with the upper rail 22, and the other end thereof is locked to a part of the member forming the interlock mechanism 40 to be described later while the slide biasing member 23 is extended by a fixed length when the seat S is in a normal use state (that is, when an occupant seats himself/herself). The interlock mechanism 40 is a mechanism which regulates the tipping-up of the seat S, and is mounted to the rear end of the lower rail 21. In the embodiment, the interlock mechanism is disposed between the striker lock mechanism 70 and the lower rail 21.

As the slide biasing member 23, a member such as a spring and a rubber element may be used. Further, electric equipment such as a motor may be used. Then, since the slide biasing member 23 is locked along the extension direction of the lower rail 21 and the upper rail 22 to be extended while the seat S is in the normal use state, the slide biasing member biases the frame-side bracket 25 so that the frame-side bracket slides rearward. That is, the slide biasing member 23 biases the seat bottom frame 4 of the seat S so that the seat bottom frame slides rearward.

However, since the sliding of the lower rail 21 and the upper rail 22 is prohibited by the slide lock mechanism 30 to be described later in the normal use state where the occupant sits on the seat, the seat S is maintained at an appropriate position without any sliding. Then, when the lock of the seat slide mechanism 20 is canceled by the operation of canceling the prohibition of the sliding of the slide lock mechanism 30, the slide biasing member 23 shrinks toward the rear side of the seat S. As a result, the upper rail 22 is pulled rearward so that an upper portion of the seat S in relation to the seat bottom frame 4 slides rearward.

Furthermore, the slide biasing member 23 may be mounted to both side brackets 8 and 8 at the right and left seat bottom frames 4 or may be mounted to one of the side brackets 8 and 8. The number of the slide biasing members 23 is appropriately determined depending on the weight of the seat S.

Slide Lock Mechanism 30

The slide lock mechanism 30 of the embodiment appropriately cancels the slide lock of the seat slide mechanism 20. The member that drives the slide lock mechanism 30 moves in cooperation with the above-described reclining mechanism 10, and is divided into a portion disposed on the seat back frame 5 and a portion engaging with the lower rail 21 and the upper rail 22. Then, such mechanisms are connected by a rod member 31.

Then, when the rod member 31 is pulled toward the rear side of the vehicle body depending on the operation in which the seat back frame 5 is inclined, a portion of the slide lock mechanism 30 which engages with the lower rail 21 and the upper rail 22 cancels the lock of the seat slide mechanism 20 by the movement of the rod member 31.

When the rod member 31 is biased toward the front side of the vehicle body depending on the operation in which the seat back frame 5 is inclined, a portion of the slide lock mechanism 30 which engages with the lower rail 21 and the upper rail 22 locks the seat slide mechanism 20 by the movement of the rod member 31.

Hereinafter, a specific description is set forth.

Figure 8A:
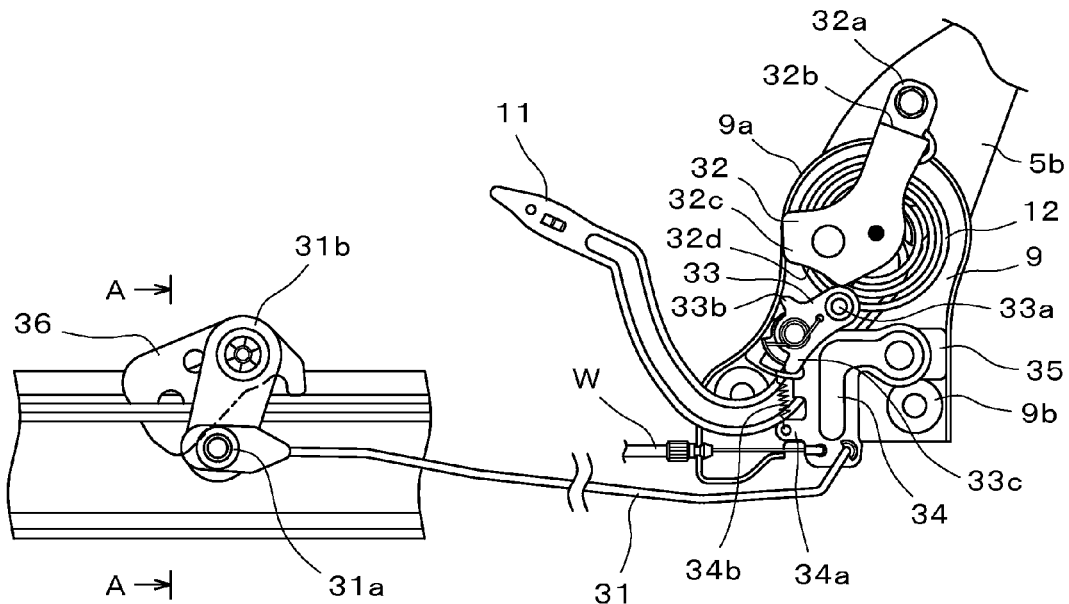
FIG. 8A is an illustrative side-view diagram illustrating a slide lock mechanism in a lock state according to an embodiment of the invention.
Figure 8B:
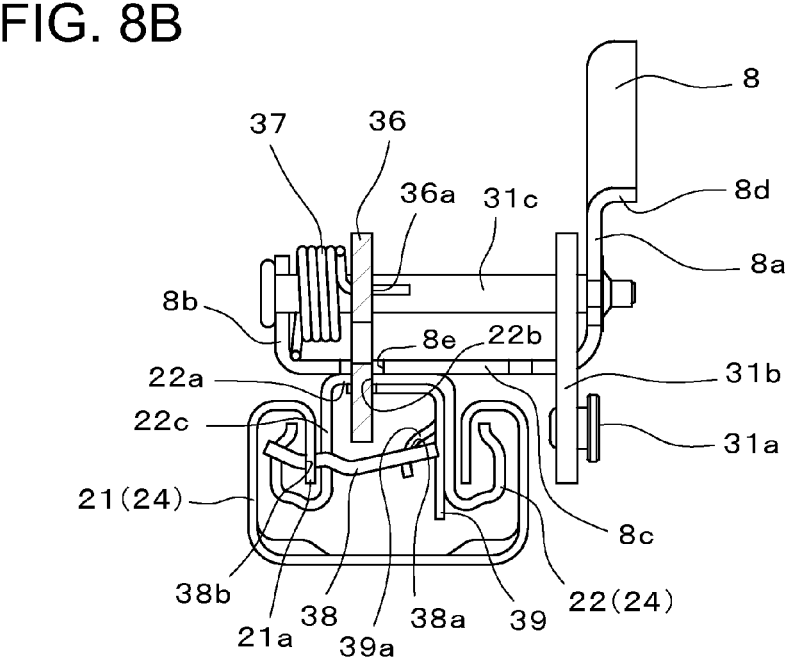
FIG. 8B is a schematic cross-sectional view corresponding to the line A-A of FIG. 8A.

FIGS. 8A, 8B illustrate a state before the seat back frame 5 is inclined (that is, the state where an occupant seats himself/ herself). In the seat S, one end of the cooperating plate 32 is locked to the seat back frame 5, and the cooperating plate 32 is locked to the side plate 5b of the seat back frame 5 to be substantially horizontal. The cooperating plate 32 is a plate shaped member which is formed in a substantially hook shape, and transmits the movement of the seat back frame 5 to the lock canceling plate 36 to be described later.

As a configuration in which the cooperating plate 32 transmits the movement thereof to the lock canceling plate 36, an existing configuration may be appropriately used, but an example thereof will be described with reference to FIGS. 8A, 8B.

The first surface 32a provided at the upper end of the cooperating plate 32 is bonded to the seat back frame 5, and the lower end of the cooperating plate 32 (the third surface 32c) is provided with an appropriate uneven portion.

Further, the second surface 32b is provided between the first surface 32a and the third surface 32c to be substantially perpendicular to the first surface 32a and the third surface 32c. A concave portion 32d of the cooperating plate 32 is a portion which engages with a collar 33a protruding from a cancel lever 33 disposed at the lower side thereof (see FIG. 8A), and transmits the movement of the seat back frame 5 to the cancel lever 33.

The cancel lever 33 is a small piece which includes protrusions 33b and 33c, and the lower end thereof is locked to a rail canceling lever 34 by a lock member (not illustrated). The protrusion 33b abuts against a flange portion 9a which is curved from the edge of the bridge plate 9 so that the position is adjusted.

The rail canceling lever 34 which is locked to the cancel lever 33 is a sheet piece which is formed in a substantially hook shape, and one end of the biasing member 34b is mounted to a protrusion 34a which protrudes forward. The other end of the biasing member 34b is mounted to a bracket 35 laterally provided in the bridge plate 9.

Then, one end side (the end disposed at the upper side) of the rail canceling lever 34 is formed in a substantially circular shape, and engages with a projection portion 9b which is formed in a substantially circular shape at a part of the bridge plate 9 so that the movement of the rail canceling lever 34 is regulated. One end of each of the rod member 31 and a wire cable W is locked to the lower end of the rail canceling lever 34.

Hereinafter, the slide lock mechanism 30 provided in the lower rail 21 and the upper rail 22 will be described. In the rod member 31 of which one end is locked to the rail canceling lever 34, the other end thereof is journaled to a connection plate 31b by a shaft member 31a. In the connection plate 31b, the rod member 31 is journaled to one end thereof, and the connection shaft 31c passes through the other end thereof to be locked.

The connection shaft 31c is disposed to pass through the outer wall 8a of the side bracket 8, the connection plate 31b, the lock canceling plate 36, the canceling plate biasing member 37, and the inner wall 8b of the side bracket 8. The lock canceling plate 36 is disposed so that the connection shaft 31c passes through the upper end thereof and the lower end thereof passes through a canceling plate through hole 8e formed in the bottom wall 8c of the side bracket 8 and a canceling plate through hole 22b formed in the upper surface 22a of the upper rail 22.

Further, the lock canceling plate 36 is provided with a hole 36a which is formed in the vicinity of a portion through which the connection shaft 31c is inserted so that one end of the canceling plate biasing member 37 is inserted through the hole. As the canceling plate biasing member 37, a coil spring or the like may be used, and the end of the canceling plate biasing member 37 that is not inserted through the lock canceling plate 36 is disposed to abut against the bottom wall 8c of the side bracket 8.

The canceling plate biasing member 37 is provided to change the relative position between the bottom wall 8c of the side bracket 8 and the lock canceling plate 36 with the movement of the connection shaft 31c. In the canceling plate biasing member 37, one end thereof abuts against the bottom wall 8c of the side bracket 8, and the other end thereof engages with the lock canceling plate 36. For this reason, the position of the lock canceling plate 36 may be controlled by the biasing force.

The lower end of the lock canceling plate 36 is disposed above the lock member 38.

The lock member 38 is a plate shaped member that is mounted to inside the upper rail 22 through a mounting bracket 39. One end of the lock member 38 is provided with a lock hole 38a, and the lock hole 38a is locked to a claw portion 39a formed in the mounting bracket 39. Furthermore, the mounting bracket 39 is a member that is formed along the inner surface of the upper rail 22 to have a hook shaped cross-section, and the claw portion 39a is formed to protrude toward inside the upper rail 22 (a portion surrounded by the upper surface 22a and the side surface 22c).

A protrusion 21a formed in the lower rail 21 is a protrusion which is formed to be continuous to the end of the rolled portion of the lower rail 21, and is locked to the lock hole 38b to lock the sliding of the upper rail 22. Furthermore, since the lock member 38 is biased by a biasing spring (not illustrated) in the upward biasing direction, the protrusion 21a and the lock hole 38b are maintained in a meshed state while the lock member is not biased by the lower end of the lock canceling plate 36.

Figure 9A:
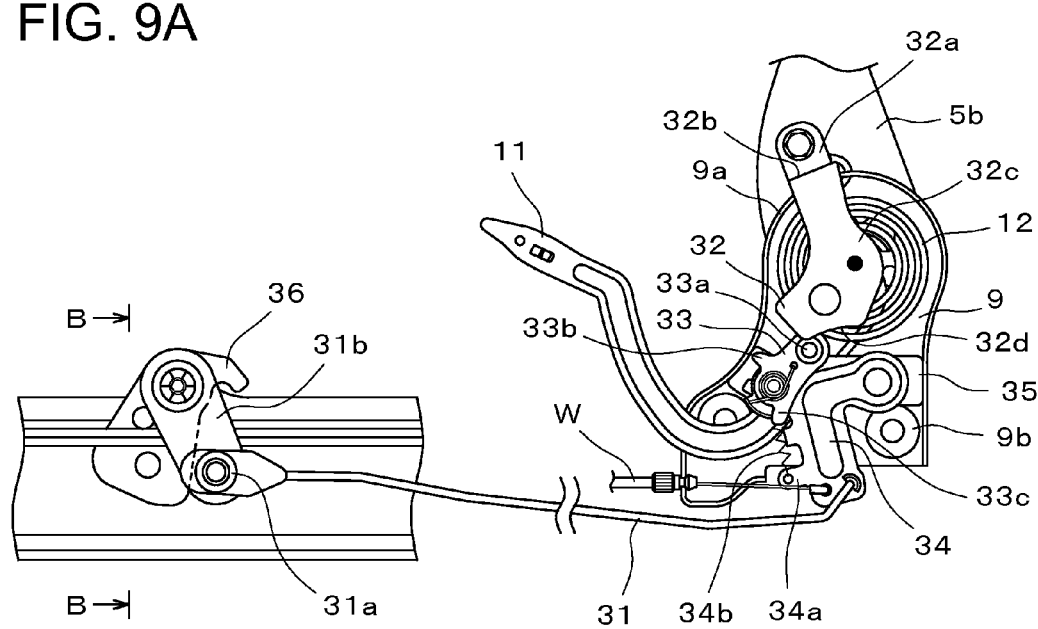
FIG. 9A is an illustrative side-view diagram illustrating the slide lock mechanism in a lock cancel state according to an embodiment of the invention.
Figure 9B:
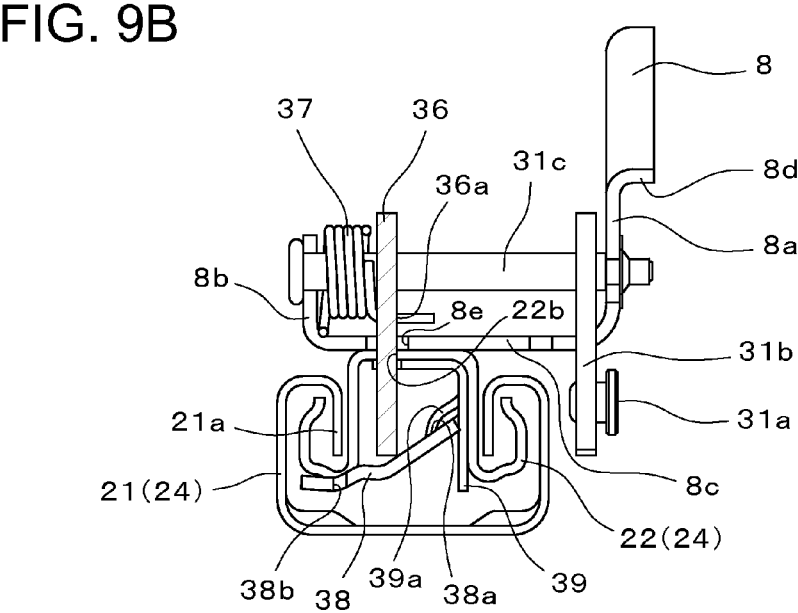
FIG. 9B is a schematic cross-sectional view corresponding to the line B-B of FIG. 9A.

Then, when the lock canceling plate 36 is biased down with respect to the upper surface 22a of the lock member 38, the intermediate portion of the lock member 38 is biased down as illustrated in FIG. 9B so that the lock state of the lower rail 21 and the upper rail 22 is canceled.

Hereinafter, an operation of the slide lock mechanism 30 will be described based on FIGS. 8A to 10B.

FIGS. 8A, 8B illustrate a state where the lower rail 21 and the upper rail 22 are locked, where FIG. 8A is a diagram illustrating a state where the lower rail 21 and the upper rail 22 are locked and FIG. 8B is a schematic cross-sectional view corresponding to the line A-A in a state where the lower rail 21 and the upper rail 22 are locked.

Since the rod member 31 is not pulled while the lower rail 21 and the upper rail 22 are locked, the lock canceling plate 36 does not abut against the upper side of the lock member 38. For this reason, the protrusion 21a of the lower rail 21 and the lock hole 38b of the lock member 38 are maintained in a meshed state, and the lower rail 21 and the upper rail 22 may not slide on each other.

Then, FIGS. 9A, 9B illustrate a state where the lock of the seat slide mechanism 20 is canceled, where FIG. 9A is a diagram illustrating a state where the lock of the lower rail 21 and the upper rail 22 is canceled and FIG. 9B is a schematic cross-sectional view corresponding to the line B-B in a state where the lock of the lower rail 21 and the upper rail 22 is canceled.

When the seat back frame 5 is inclined by the reclining mechanism 10 through the operation of the reclining canceling lever 11 as illustrated in FIGS. 9A, 9B, the upper end of the cooperating plate 32 is inclined forward with the movement of the seat back frame 5. Then, the cancel lever 33 and the rail canceling lever 34 are further inclined, and the rod member 31 locked to the lower end of the rail canceling lever 34 is pulled rearward.

As illustrated in FIG. 3, a spiral spring 61 as a part of the link mechanism 60 is mounted to the side bracket 8 to which the reclining canceling lever 11 is not mounted. Then, when the reclining canceling lever 11 is operated, the inclination speed of the seat back frame 5 is decreased by the reaction force of the spiral spring 61.

When the rod member 31 is pulled rearward, the movement thereof is sequentially transmitted to the connection plate 31b and the connection shaft 31c disposed in the lower rail 21 and the upper rail 22, and hence the lock canceling plate 36 is biased downward by the force of the canceling plate biasing member 37.

That is, since the rod member 31 is pulled while the lock of the lower rail 21 and the upper rail 22 is canceled, the lock canceling plate 36 pivots so that the lower end of the lock canceling plate 36 is biased downward. For this reason, the meshing between the protrusion 21a of the lower rail 21 and the lock hole 38b of the lock member 38 is canceled so that the sliding of the seat S is enabled.

Since the upper rail 22 may freely slide on the lower rail 21 when the sliding of the seat S is enabled, the shrinking of the slide biasing member 23 provided in the above-described slide mechanism 20 is allowed. One end of the slide biasing member 23 is mounted to the front end of the upper rail 22 and the other end thereof is locked to a part of the interlock mechanism 40 disposed at the rear side of the seat S. For this reason, when the lock of the slide mechanism 20 is canceled, the seat bottom frame 4 automatically moves rearward by the biasing force of the slide biasing member 23.

Subsequently, when the seat back frame 5 is further inclined so that the interlock mechanism 40 disposed at the rear side of the seat S is canceled, the seat S tips up from the rear side to be stowed in the vehicle floor D as described below.

Thus, when the reclining canceling lever 11 is raised, the seat back frame 5 is inclined by a predetermined angle so that the seat bottom frame 4 automatically moves rearward by the slide biasing member 23. Then, at this time, the seat back frame 5 is not inclined by the link mechanism 60, and the angle which is formed with respect to the seat bottom frame 4 is fixed. In this way, when the seat bottom frame 4 slides while the angle of the seat back frame 5 is fixed, the seat bottom frame 4 may be reliably moved to the rearmost side by the further stable operation.

Further, since the lower rail 21 is fixed to the striker 41 of the vehicle floor D by the striker lock mechanism 70, the seat S does not tip up even when the locking is canceled. Since the seat bottom frame 4 is reliably moved to a position where the interlock mechanism 40 is canceled, that is, a position (the rearmost position) optimal for the stowing operation by the slide biasing member 23, the seat S may effectively perform the stowing operation.

Further, in the seat S, all mechanisms (the reclining mechanism 10, the seat slide mechanism 20, the slide lock mechanism 30, the interlock mechanism 40, and the striker lock mechanism 70) for automatically sliding the seat are provided in near the seat, and hence the work efficiency is improved without complicating the assembly operation.

Figure 10A:
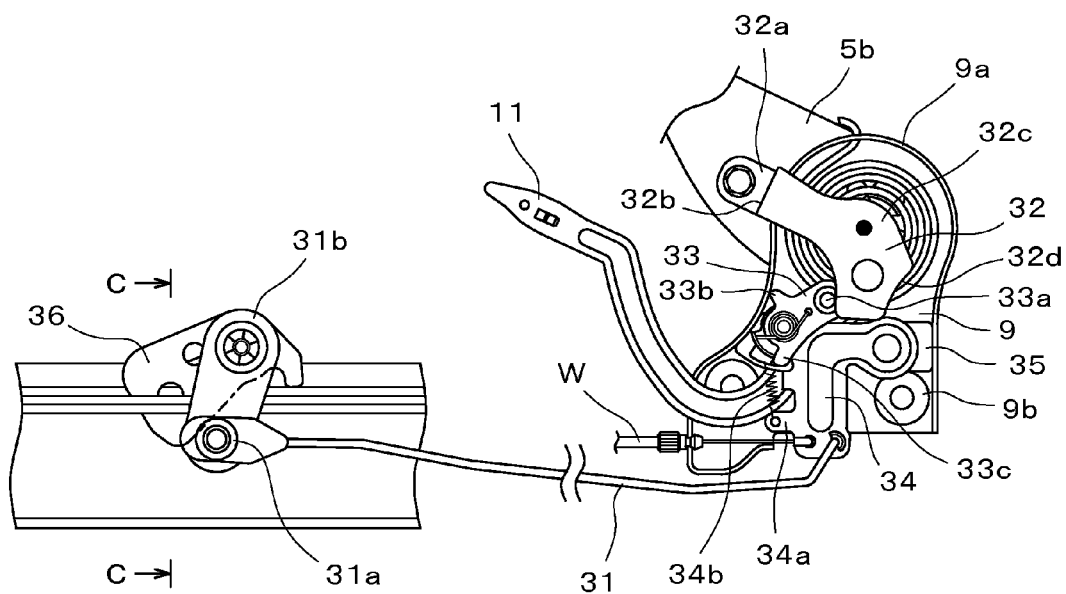
FIG. 10A is an illustrative side-view diagram illustrating the slide lock mechanism in a relock state according to an embodiment of the invention.
Figure 10B:
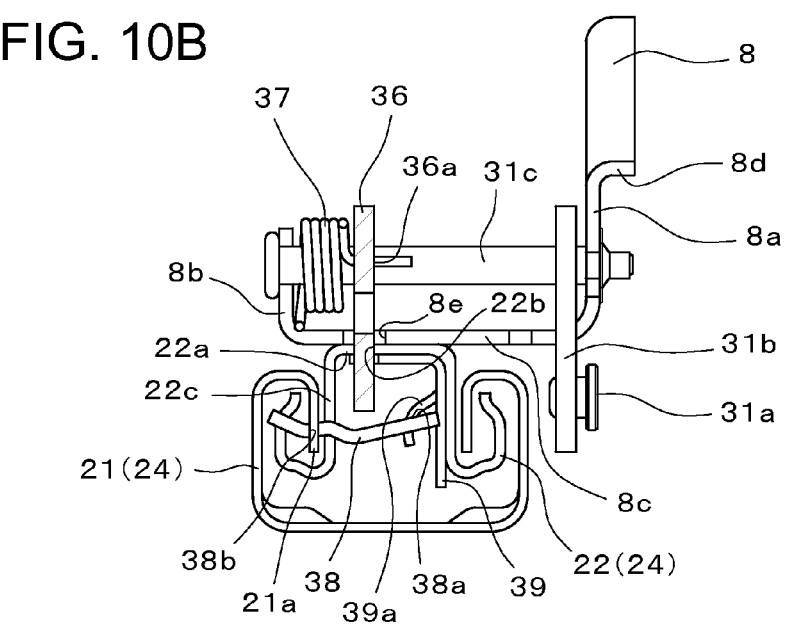
FIG. 10B is a schematic cross-sectional view corresponding to the line C-C of FIG. 10A.

Further, FIGS. 10A, 10B illustrates a state where the seat back frame 5 is further inclined and the seat slide mechanism 20 is relocked, where FIG. 10A is a diagram illustrating a state where the lower rail 21 and the upper rail 22 are relocked, and FIG. 10B is a schematic cross-sectional view corresponding to the line C-C in a state where the lower rail 21 and the upper rail 22 are relocked.

When the seat back frame 5 is further inclined from the state (lock state) of FIGS. 9A, 9B as illustrated in FIGS. 10A, 10B, the upper end of the cooperating plate 32 is further inclined forward with the movement of the seat back frame 5. As a result, the cancel lever 33 is biased back to the normal state (the state where an occupant seats himself/herself) as illustrated in FIGS. 8A, 8B, and the lower end of the cancel lever 33 is raised so that the protrusion 33b is biased against the flange portion 9a of the bridge plate 9. Accordingly, the rail canceling lever 34 is also lifted to the normal state, and the rod member 31 locked to the lower end of the rail canceling lever 34 is biased back forward from the state (lock state) of FIGS. 9A, 9B to be returned to the normal state (the state where the rearward pulling is not performed).

When the rod member 31 is biased forward compared to the lock state, the movement is sequentially transmitted to the connection plate 31b and the connection shaft 31c sequentially disposed in the lower rail 21 and the upper rail 22 so that the lock canceling plate 36 is raised upward by the force of the canceling plate biasing member 37.

That is, in a state where the lower rail 21 and the upper rail 22 are relocked, the lower end of the lock canceling plate 36 is raised toward the upper side of the lock member 38. For this reason, the protrusion 21a of the lower rail 21 meshes with the lock hole 38b of the lock member 38 again so that the sliding of the seat S is locked.

Hereinafter, the striker lock mechanism 70, the interlock mechanism 40, the assist mechanism 50, and the link mechanism 60 among the mechanisms provided in the seat S will be described.

Striker Lock Mechanism 70

Figure 12:
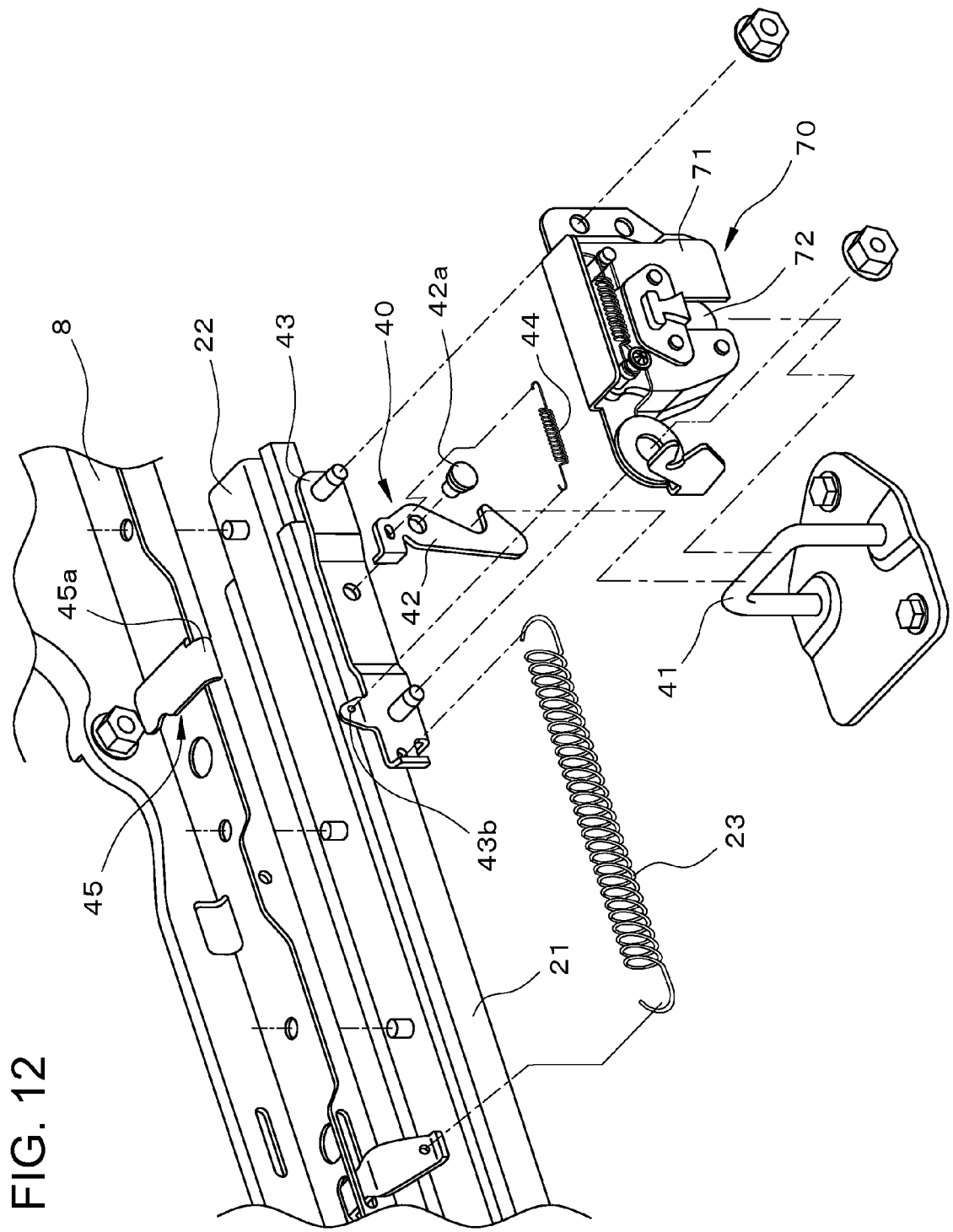
FIG. 12 is a schematic exploded diagram illustrating an interlock mechanism according to an embodiment of the invention.
Figure 13:
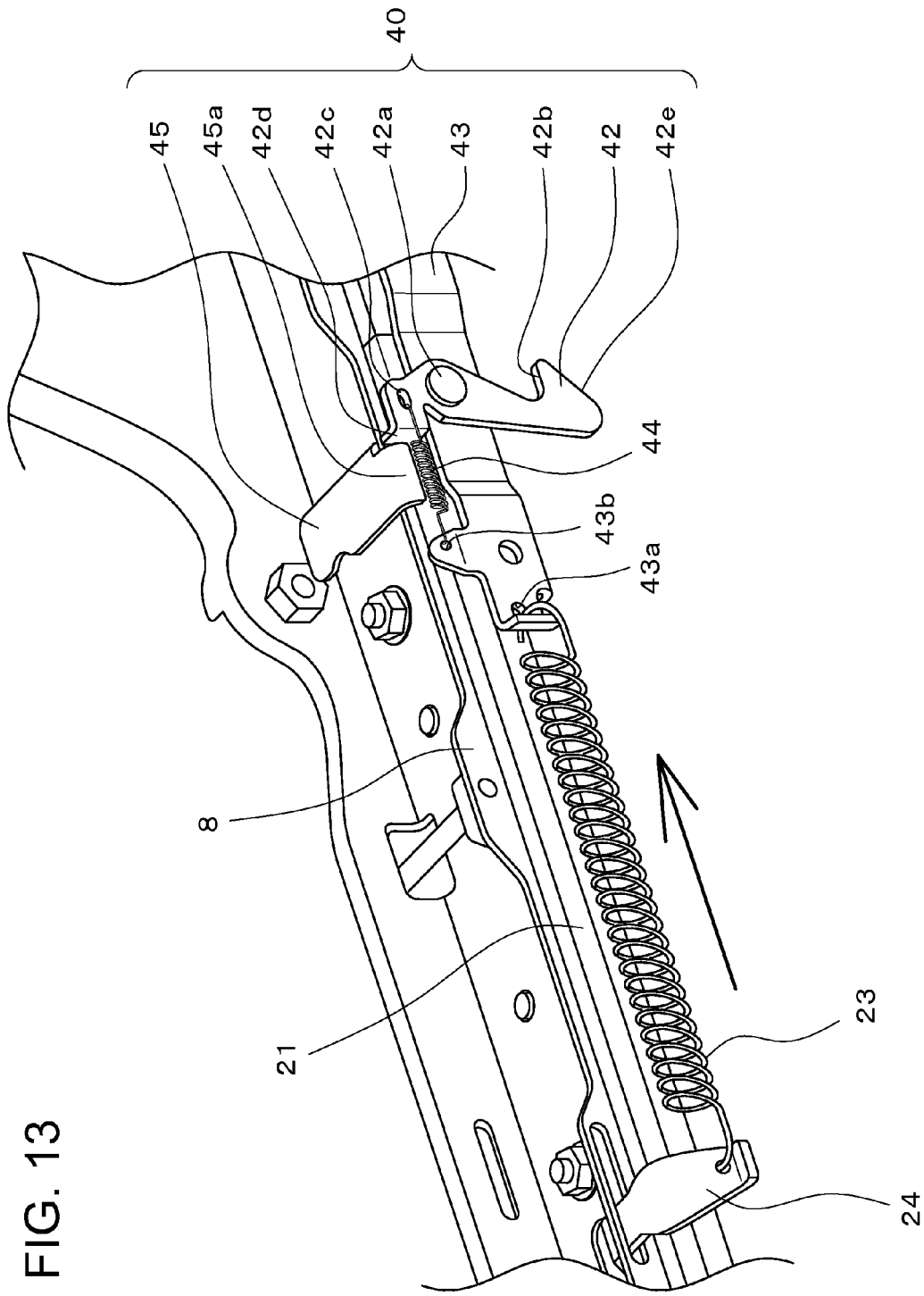
FIG. 13 is a schematic perspective view of the interlock mechanism according to an embodiment of the invention.
Figure 14:
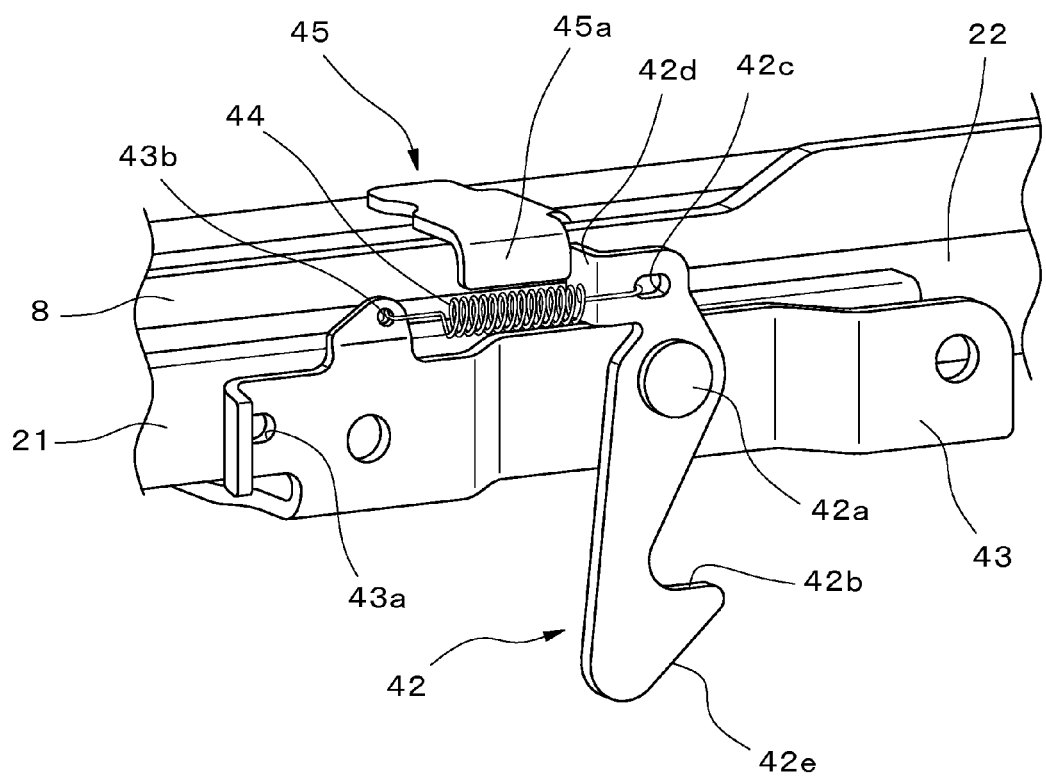
FIG. 14 is a partially enlarged view of FIG. 13.

As illustrated in FIG. 11, in the striker lock mechanism 70 of the embodiment, two facing side plates 71 provided with downward U-shaped receiving ports for receiving the striker 41 are provided as a base. Then, as illustrated in FIGS. 11 and 12, the hook shaped latch 72 with a receiving jaw for biting the striker 41 and a cam shaped ratchet 73 for locking the latch 72 are journaled and pivoted by spindles 72b and 73a within the gap between the side plates 71. In this way, the striker lock mechanism is assembled. In the striker lock mechanism 70, the latch 72 is provided with a retainer protrusion (not illustrated), and the ratchet 73 is provided with a receiving protrusion (not illustrated). Accordingly, when the protrusions engage with each other or separate from each other, the locking and unlocking operation may be performed by the striker 41.

The latch 72 biases the striker 41 in both the biting direction and the separating direction by a twisting coil spring (not illustrated). The ratchet 73 is pulled in a direction to engage with the latch 72 by a coil spring 74 laid between the latch 72 and the ratchet. In addition, a shock absorbing pad 75 is mounted and fixed to the outside of the side plate 71 at inside the receiving port when the striker 41 is bitten. Further, the oscillation pieces connecting the wire ends of the pulling wire are mounted to be coaxial with the spindle 73a which journals the ratchet 73.

As illustrated in FIG. 11, in the striker lock mechanism 70, when the ratchet 73 is pulled against the coil spring 74 by a wire (not illustrated) through an operation of a lever (not illustrated), the ratchet 73 oscillates about the spindle 73a, and the receiving protrusion of the ratchet 73 is separated from the retainer protrusion of the latch 72. Then, the latch 72 oscillates about the spindle 72b by the twisting coil spring in the separating direction in relation to the striker 41 so that the unlocking operation is performed. Since such a configuration is known, the detailed description thereof will not be made.

Accordingly, the seat S may tip up from the rear portion side while the seat back 2 is folded, but in the embodiment, the tipping-up is regulated by the interlock mechanism 40 to be described later until the position becomes the rearmost position. Furthermore, when the position becomes the rearmost position, the interlock mechanism 40 is also simultaneously separated from the striker 41 so that the seat tips up.

Interlock Mechanism 40

The interlock mechanism 40 is a mechanism which regulates a state where the seat S tips up at a position other than a stowing preparation position (the rearmost position), and the interlock mechanism 40 of the embodiment is provided between the seat frame (the lower rail 21) and the striker lock mechanism 70. The interlock mechanism 40 mainly includes a lock bracket 43 which is mounted to the seat bottom frame 4 (more specifically, the lower rail 21), an interlock 42 which is journaled to the lock bracket 43, an interlock biasing member 44 that biases the interlock 42 toward the striker 41, and a biasing member 45 that biases the interlock 42 (see FIGS. 12 to 15).

As illustrated in FIGS. 12 to 15, the lock bracket 43 is formed as an elongated plate member, and is fixed to the side portion of the lower rail 21 through a bolt and a nut. The lock bracket 43 at the front side of the vehicle body is provided with a lock hole 43a, a protrusion is formed at the upper side of the center in relation to the lock hole 43a, and the protrusion is provided with a lock hole 43b. Further, a spindle (a pivot shaft 42a) which journals the interlock 42 is formed at the center side (the right side of FIG. 15) in relation to the lock hole 43b. Then, one end of the slide biasing member 23 of the seat slide mechanism 20 to be described later is mounted to the lock hole 43a, and one end of a coil spring as the interlock biasing member 44 is locked to the lock hole 43b.

In the biasing member 45, a plate member is curved in an L shape and is fixed to the upper rail 22. A curved portion (curved part) 45a is disposed above the lock bracket 43 near the lock bracket 43 in relation to the upper rail 22, and is provided to butt the abutment portion 42d of the interlock 42.

The interlock 42 is a plate member, and includes a pivoting (revolving) shaft 42a which is pivotably journaled to the lock bracket 43, a hook portion 42b of which one end side from the pivoting (revolving) shaft 42a is formed in a hook shape, a lock hole 42c which is formed at the other end side opposite to the hook portion 42b, and an abutment portion 42d which protrudes to be curved toward the upper rail 22 in relation to the lock hole 42c.

The pivot shaft 42a and the striker 41 are positioned on a line (preferably, a perpendicular line) in an engagement state. Further, the end opposite to the hook portion 42b of the interlock 42 is formed as an inclined surface portion 42e. Then, as described below, when the inclined surface portion 42e abuts against the striker 41, the interlock 42 pivots about the pivot shaft 42a along the inclined surface portion 42e against the interlock biasing member 44, and the striker 41 meshes with the hook portion 42b.

One end of the coil spring as the interlock biasing member 44 is locked to the lock hole 42c, and the other end of the interlock biasing member 44 is locked to the lock hole 43b of the lock bracket 43 as described above.

With this configuration, the upper side of the interlock 42 is biased toward the front side of the vehicle body (the left side of FIG. 15), and the interlock 42 engages with the striker 41 at the hook portion 42b as the portion which is formed at the lower side in a hook shape.

Figure 15:
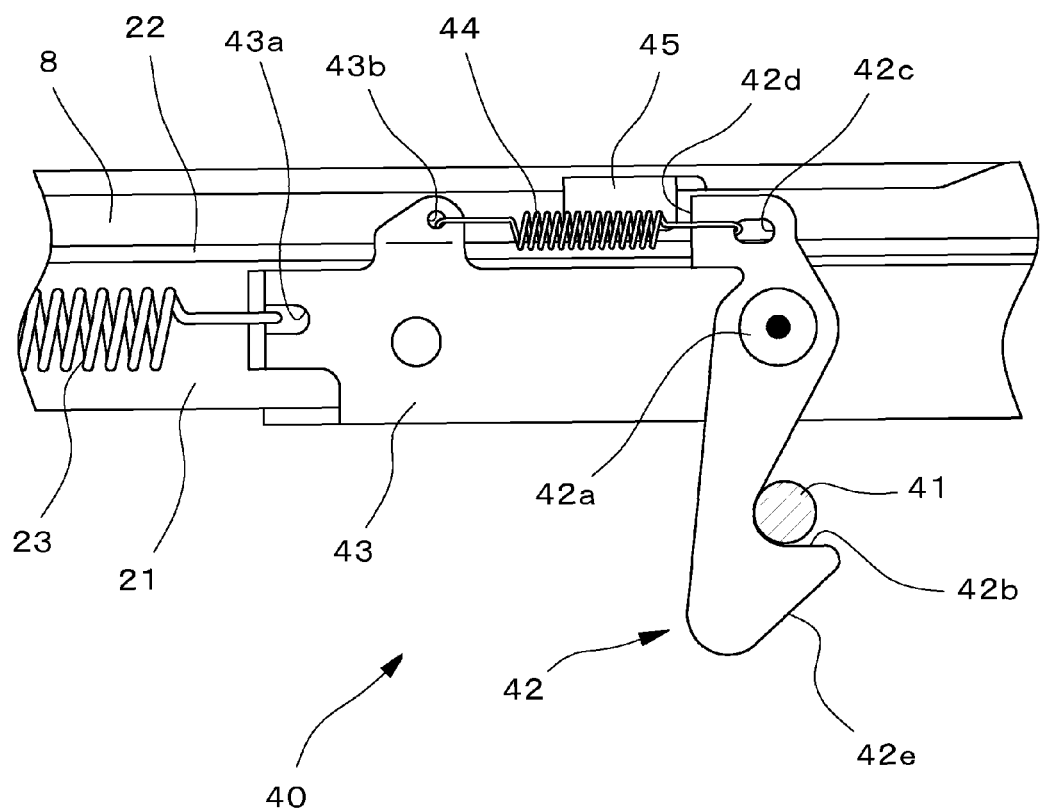
FIG. 15 is a schematic side-view diagram illustrating the interlock mechanism according to an embodiment of the invention.

Then, when the seat slide mechanism 20 of the seat S is operated, the side bracket 8 of the seat bottom frame 4 slides toward the rear side of the vehicle body (the right side of FIG. 15). For this reason, the curved portion of the biasing member 45 mounted to the side bracket 8 biases the abutment portion 42d at the upper side of the interlock 42 toward the rear side of the vehicle body so that the locking state with respect to the striker 41 is canceled.

Furthermore, when the locking state of the interlock 42 and the striker 41 is canceled, the seat base 1 becomes pivotable in the front to back direction since the seat base is only supported by the assist mechanism 50.

Assisting Mechanism 50

The assist mechanism 50 of the embodiment assists the operation of stowing or returning the seat S. Specifically, the assist mechanism 50 includes a plurality of assist springs 51 and 52, and the plurality of assist springs 51 and 52 include a spring which biases the seat S in the returning direction in returning operation of the seat S and a spring which biases the seat S in the folding direction (the stowing direction) upon seat stowage.

The seat S is provided with a portion subject to be biased (not illustrated) which is provided at a position contacting the assist springs 51 and 52 to receive the biasing forces of the assist springs 51 and 52. The contact surface of the portion subject to be biased with respect to the assist springs 51 and 52 changes in response to the state (the stowed state or the installed state) of the seat S. Accordingly, in the plurality of assist springs 51 and 52, the assist springs 51 and 52 which press the portion subject to be biased change in response to the state of the seat S.

In the assist mechanism 50 with the above-described configuration, the assist springs 51 and 52 which press the seat S in the returning direction when the seat S is in the stowed state press the portion subject to be biased. As a result, when a state where the pivoting of the seat S is locked by a lock mechanism (not illustrated) is canceled, the biasing forces of the assist springs 51 and 52 which pivot the seat S in the returning direction are exerted. Accordingly, since the seat S tips up in the returning direction, the seat S may be returned by a small force.

When the seat S is in the installed state, the assist springs 51 and 52 which press the seat S in the folding direction press the portion subject to be biased. As a result, when a state where the seat S is locked to the vehicle floor D is canceled by the interlock mechanism 40, the biasing forces of the assist springs 51 and 52 which pivot the seat S in the folding direction are exerted. Accordingly, since the seat S tips up in the folding direction, the seat S may be stowed by a small force.

Link Mechanism 60

As illustrated in FIG. 3, the link mechanism 60 connects the rear side of the vehicle body of the seat bottom frame 4 (more specifically, the side bracket 8 of the seat bottom frame 4) to the lower side of the seat back frame 5 so that the seat back frame 5 may be tilted with respect to the seat bottom frame 4. The link mechanism 60 is disposed at a position facing the side bracket 8 provided with the reclining mechanism 10.

As illustrated in FIG. 3, the link mechanism 60 mainly includes the spiral spring 61 which is mounted to inside the side bracket 8, that is, the installation side of the tubular member 5c of the seat back frame 5 and an cooperating lever 62 which is fixed to the seat back frame 5 and moves in cooperation with the movement of the seat back frame 5. Further, the link mechanism 60 further includes a stopper member 63 that is mounted to inside the side bracket 8 and locks the spiral spring 61. Then, the spiral spring 61 is a second biasing member that biases the seat back frame 5 in the rearward inclining direction, that is, a "second direction". Further, the cooperating lever 62 corresponds to the second engagement member.

Then, the end of the spiral spring 61 as the second biasing member provided in the link mechanism 60 is curved in a substantially U-shape, and the curved portion abuts against the cooperating lever 62 so that the forward tilting of the seat back frame 5 is prevented. Thus, when the upper rail 22 (the seat bottom frame 4) slides by the seat slide mechanism 20, the seat back frame 5 is tilted forward. However, since the spiral spring 61 and the cooperating lever 62 of the link mechanism 60 engage with each other, a predetermined inclination angle may be maintained without inclining the seat back frame 5 anymore.

Thus, since the seat bottom frame 4 slides by maintaining the inclination angle of the seat back frame 5, the seat S may reliably and automatically slide the seat bottom frame 4 rearward.

The spiral spring 61 as the second biasing member provided in the link mechanism 60 is locked inside the side bracket 8 of the seat bottom frame 4, and when the seat back frame 5 is inclined toward the seat bottom frame 4, the seat back frame 5 is biased in the second direction.

First, a configuration of the link mechanism 60 in the normal state (that is, the state where an occupant seats himself/herself) will be described with reference to FIG. 4B. Furthermore, in FIGS. 4B to 7B, the standing direction of the tubular member 5c of the seat back frame 5 is indicated by the bold line.

The spiral spring 61 is mounted to the inner surface of the side bracket 8, and in the embodiment, is wound in a spiral shape in the counterclockwise direction from the inside (the counterclockwise direction when viewed from the inside of the seat back frame 5). That is, the spiral spring 12 as the first biasing member has a reverse spiral structure. Further, the diameter of the spiral spring 61 is smaller than the diameter of the spiral spring 12, and the number of winding is smaller than that of the spiral spring 12. Thus, the biasing force obtained by the spiral spring 61 is smaller than that of the spiral spring 12.

Further, the stopper member 63 is a plate shaped member that is disposed between the spiral spring 61 and the side bracket 8, and is fixed to the inner surface of the side bracket 8. Then, the stopper member 63 includes a lock portion 63a which is curved in a direction to protrude from the fixed surface (a direction to protrude toward the front side of FIG. 4B).

The lock portion 63a is disposed at the rear side of the seat bottom frame 4 in relation to the pivot shaft 5d about which the seat back frame 5 pivots.

The spiral spring 61 is formed by a metallic wire member, and the inner end thereof is curved in a substantially U-shape to be locked to the side bracket 8 of the seat bottom frame 4. The outer end of the spiral spring 61 includes a curved portion 61a which is curved in a substantially U-shape, and engages with the lock portion 63a of the stopper member 63 in the normal state.

The cooperating lever 62 of the second engagement member is a member that is fixed to the tubular member 5c of the seat back frame 5, and is a member that moves in cooperation with the seat back frame 5. In the cooperating lever 62, one end thereof is formed as a circular-arc plate piece and extends from the pivot shaft 5d toward the rear side of the vehicle body while the pivot shaft 5d of the seat back frame 5 inserted therethrough. Then, the end of the cooperating lever 62 at the rear side of the vehicle body is provided with a locking concave portion 62a.

In the normal state, the curved portion 61a of the spiral spring 61 is disposed to engage with the lock portion 63a of the stopper member 63.

Figure 4B:
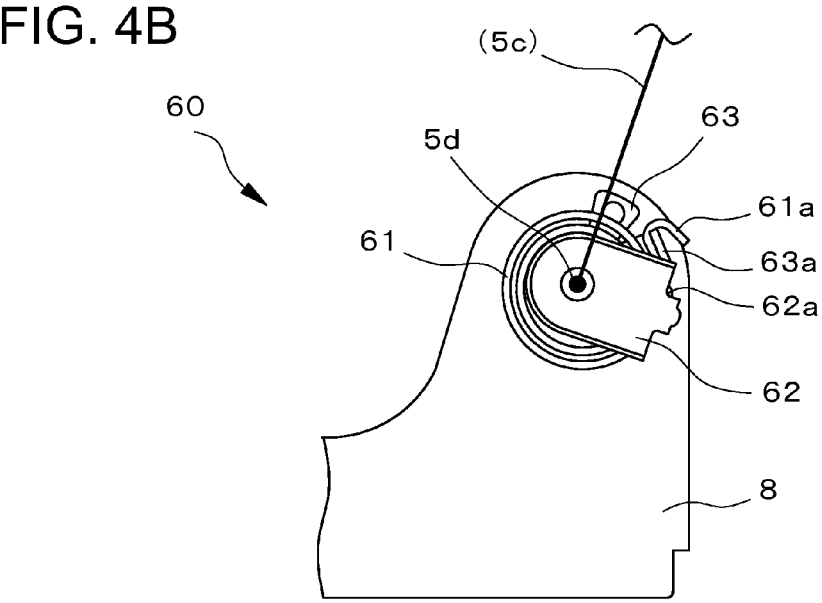
FIG. 4B is an illustrative side view diagram illustrating a link mechanism in a normal seating state according to an embodiment of the invention.

Then, as illustrated in FIG. 4B, the tubular member 5c of the seat back frame 5 is inclined toward the rear side of the vehicle body and the cooperating lever 62 is bonded to the tubular member 5c so that the inclination (in the extension direction) of the cooperating lever 62 is determined by the inclination of the tubular member 5c. At this time, the curved portion 61a of the spiral spring 61 engages with the lock portion 63a, and in the normal state, the spiral spring 61 does not give a biasing force to the seat back frame 5.

When the seat back frame 5 is inclined forward to be folded (the state of FIG. 7B), the locking concave portion 62a of the cooperating lever 62 faces the upper side of the side bracket 8. Then, at this time, the curved portion 61a of the spiral spring 61 engages with the locking concave portion 62a instead of the stopper member 63 provided in the side bracket 8. In this way, since the curved portion 61a engages with the locking concave portion 62a, the seat back frame 5 is biased by the spiral spring 61 in the second direction, that is, the rearward inclining direction.

Relation Between Reclining Mechanism 10 and Link Mechanism 60

Next, a mechanism will be described which controls the tilting of the seat back frame 5 by the interlocking movement of the reclining mechanism 10 and the link mechanism 60.

First, a relation between the reclining mechanism 10 and the link mechanism 60 in the normal state (the state where an occupant seats himself/herself), that is, a state where the seat back frame 5 pivots in the first direction and does not reach a predetermined position yet will be described with reference to FIGS. 4A, 4B.

In a state where the seat back frame 5 pivots in the first direction and does not reach a predetermined position yet, the spiral spring 12 as the first biasing member biases the seat back frame 5 in the first direction while engaging with the cooperating plate 32 as the first engagement member.

In the reclining mechanism 10 illustrated in FIG. 4A, the spiral spring 12 is maintained while the curved portion 12a engages with the second surface 32b of the cooperating plate 32. At this time, since the cooperating plate 32 is also inclined rearward by the rearward inclined seat back frame 5, the curved portion 12a is pulled rearward. Thus, the seat back frame 5 is biased by the spiral spring 12 in the first direction (the forward inclining direction).

In other words, in the normal state, that is, a state where the seat back frame 5 pivots in the first direction and does not reach a predetermined position yet, the curved portion 12a of the spiral spring 12 is locked to the cooperating plate 32 provided behind the stopper portion 9c of the bridge plate 9 provided in the seat bottom frame 4 so that a biasing force is applied to the seat back frame 5 in the first direction.

With this configuration, the seat back frame 5 is automatically tilted to a predetermined position (manual operation range).

In a state where the seat back frame 5 pivots in the first direction and does not reach a predetermined position yet, the spiral spring 61 as the second biasing member engages with the seat bottom frame 4 (more specifically, the lock portion 63a of the stopper member 63 provided in the seat bottom frame 4).

In the link mechanism 60 of FIG. 4B, the spiral spring 61 as the second biasing member is maintained while the curved portion 61a engages with the lock portion 63a of the stopper member 63. At this time, in the spiral spring 61 mounted to the inner end of the side bracket 8, the curved portion 61a engages with the stopper member 63 mounted to the side bracket 8, and no biasing force is applied to the seat back frame 5.

That is, the curved portion 61a of the spiral spring 61 is locked to the lock portion 63a of the stopper member 63 provided in the seat bottom frame 4 below the locking concave portion 62a of the cooperating lever 62, and no biasing force is applied to the seat back frame 5.

Next, a relation between the reclining mechanism 10 and the link mechanism 60 in the inclined state of the seat back frame 5 will be described with reference to FIGS. 5A, 5B.

The lock is canceled when the reclining canceling lever 11 of the reclining mechanism 10 is operated. In this state, as described above, the seat back frame 5 is inclined in the first direction by the biasing force of the spiral spring 12 and reaches a predetermined position (that is, the manual operation range).

Figure 5A:
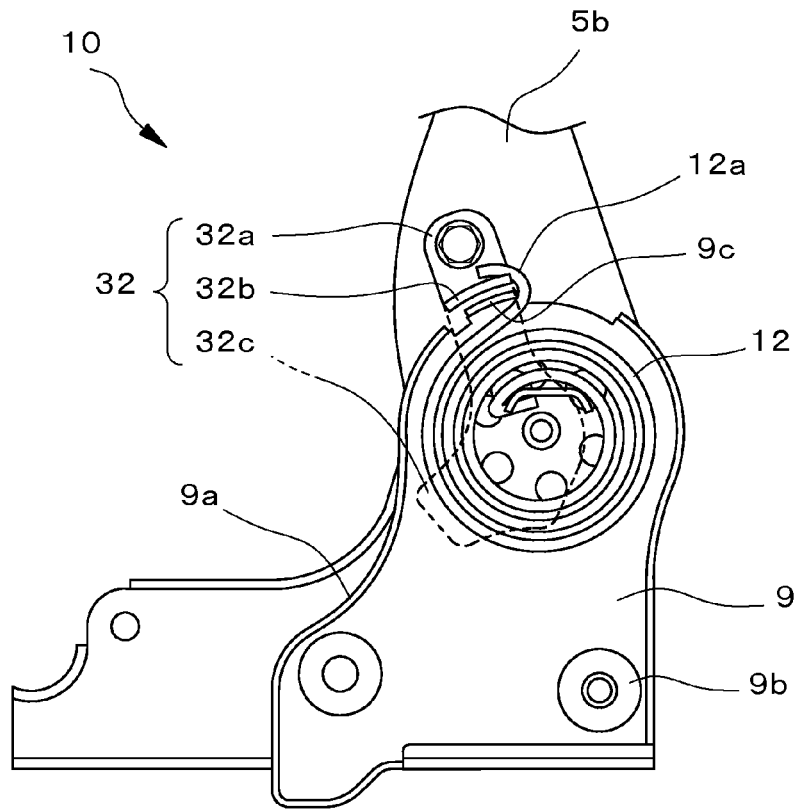
FIG. 5A is an illustrative side-view diagram illustrating the reclining mechanism in an inclined state according to an embodiment of the invention.

In the reclining mechanism 10 of FIG. 5A, the curved portion 12a of the spiral spring 12 as the first biasing member engages with the second surface 32b of the cooperating plate 32 as the first engagement member. Then, since the curved portion 12a biases the cooperating plate 32 in the first direction in this state, the biasing force of the spiral spring 12 is exerted so that the seat back frame 5 is inclined in the first direction (the forward inclining direction).

Figure 5B:
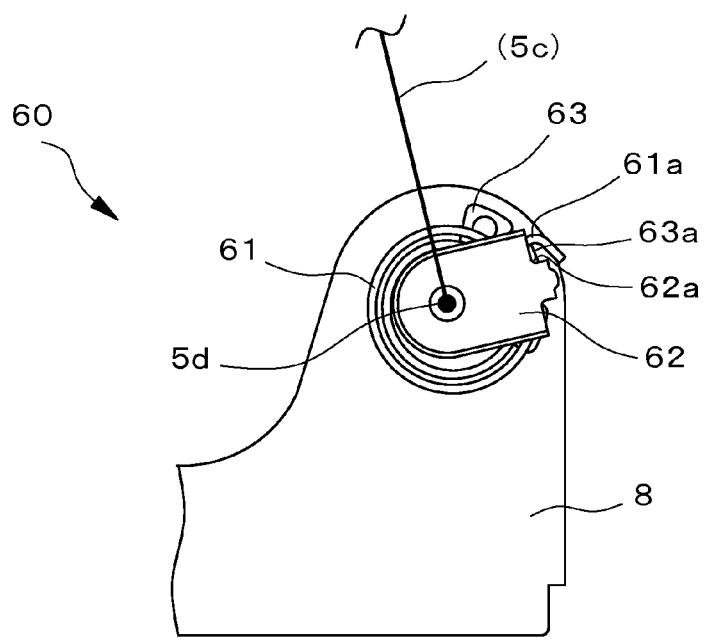
FIG. 5B is an illustrative side-view diagram illustrating the link mechanism in an inclined state according to an embodiment of the invention.

As illustrated in FIG. 5B, in a state where the seat back frame 5 is inclined, the curved portion 61a of the spiral spring 61 as the second biasing member of the link mechanism 60 is maintained to engage with the lock portion 63a of the stopper member 63. Then, the cooperating lever 62 pivots so that the locking concave portion 62a faces the upside with the inclination operation of the seat back frame 5.

At this time, since the curved portion 61a of the spiral spring 61 is locked to the lock portion 63a of the stopper member 63 provided in the seat bottom frame 4 below the locking concave portion 62a of the cooperating lever 62, no biasing force is applied to the seat back frame 5.

Thus, in a state where the lock of the reclining mechanism 10 is canceled (the inclined state), the seat back frame 5 is biased in the first direction to be inclined by the spiral spring 12 of the reclining mechanism 10.

Next, a relation between the reclining mechanism 10 and the link mechanism 60 in a seat slide state of the seat S, that is, a state where the seat back frame 5 pivots in the first direction and reaches a predetermined position (manual operation range) will be described with reference to FIGS. 6A, 6B.

In a state where the seat back frame 5 pivots in the first direction and reaches a predetermined position (manual operation range), the spiral spring 12 as the first biasing member biases the seat back frame 5 in the second direction while the spiral spring 61 as the second biasing member engages with the cooperating lever 62 as the second engagement member with the canceling of the engagement state with respect to the cooperating plate 32 as the first engagement member.

Furthermore, at this time, it is more desirable that the seat back frame 5 be biased in the second direction while the spiral spring 61 as the second biasing member engages with the cooperating lever 62 as the second engagement member before the engagement state between the spiral spring 12 as the first biasing member and the cooperating plate 32 as the first engagement member is canceled.

Immediately after the engagement state between the spiral spring 12 and the cooperating plate 32 is canceled, the seat back frame 5 pivots in the first direction by the inertia. However, when a biasing force is applied in the second direction before the engagement state between the spiral spring 12 and the cooperating plate 32 is canceled, it is possible to prevent the seat back frame 5 from being abruptly inclined toward the seat bottom frame 4 when the seat back frame reaches a predetermined angle.

When the seat back frame 5 is further inclined forward by the biasing force of the spiral spring 12 from the state of FIGS. 5A, 5B, the curved portion 61a of the spiral spring 61 as the second biasing member of the link mechanism 60 engages not only the lock portion 63a of the stopper member 63 but also the locking concave portion 62a of the cooperating lever 62 at the same time. Then, when the seat back frame 5 is further inclined, the curved portion 61a engages with the lock concave portion 62a of the cooperating lever 62 as illustrated in FIG. 6B. That is, since the cooperating lever 62 also pivots in the first direction in cooperation with the inclination of the seat back frame 5 in the first direction, the locking concave portion 62a is biased upward in relation to the lock portion 63a of the stopper member 63, and hence the hanging of the curved portion 61a of the spiral spring 61 changes from the stopper member 63 to the cooperating lever 62.

Then, since the curved portion 61a of the spiral spring 61 is biased upward by the locking concave portion 62a, the seat back frame 5 is biased in the second direction (the rearward inclining direction) by the spiral spring 61. That is, since the curved portion 61a of the spiral spring 61 engages with the locking concave portion 62a of the cooperating lever 62, the seat back frame 5 is biased in the second direction.

At this time, the biasing force of the spiral spring 12 in the first direction and the biasing force of the spiral spring 61 in the second direction act in the opposite directions. However, since the diameter and the number of winding of the spiral spring 12 provided in the reclining mechanism 10 are larger than those of the spiral spring 61 as described above, the biasing force of the spiral spring 12 is larger than the biasing force of the spiral spring 61. As a result, the seat back frame 5 is inclined at an appropriate speed until the seat back frame reaches a predetermined position (manual operation range) in the pivoting direction of the seat back frame 5 without being abruptly inclined in the first direction.

In a state where the seat back frame 5 pivots in the first direction and reaches a predetermined position (manual operation range), the spiral spring 12 as the first biasing member engages with the seat bottom frame 4 (more specifically, the stopper portion 9c of the bridge plate 9 provided in the seat bottom frame 4) so that the biasing in the first direction by the spiral spring 12 is canceled. Then, at this time, the seat back frame 5 receives a biasing force in the second direction by the spiral spring 61.

Figure 6A:
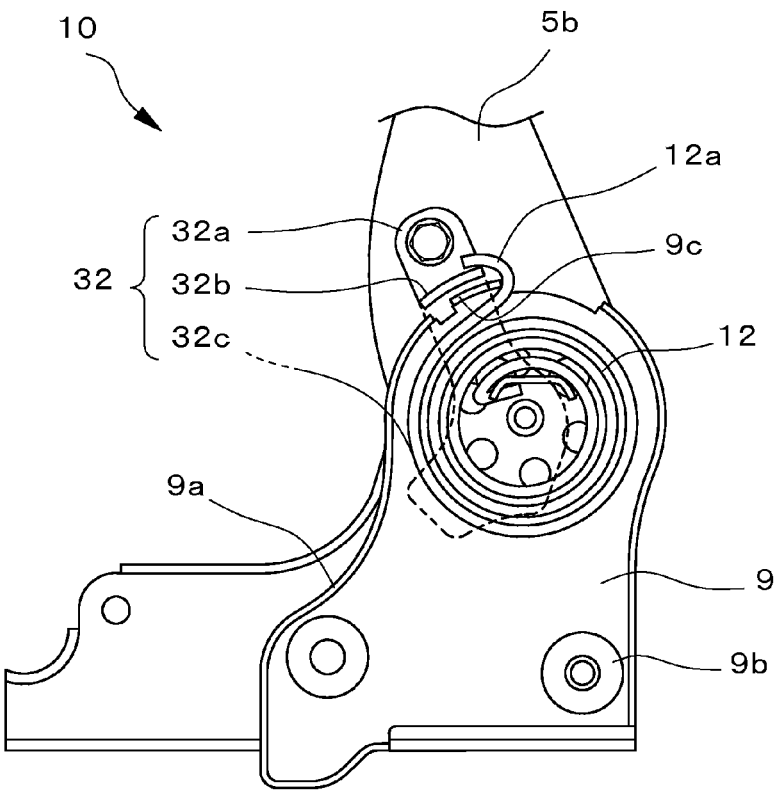
FIG. 6A is an illustrative side-view diagram illustrating the reclining mechanism in a seat slide state according to an embodiment of the invention.

As illustrated in FIG. 6A, when the seat back frame 5 is further inclined in the first direction from the state of FIGS. 5A, 5B, the curved portion 12a of the spiral spring 12 of the reclining mechanism 10 abuts against not only the cooperating plate 32 but also the stopper portion 9c of the bridge plate 9 at the same time. Thus, since the curved portion 12a of the spiral spring 12 is locked to the stopper portion 9c of the bridge plate 9, the biasing force in the first direction is not applied to the seat back frame 5.

At this time, the biasing force of the spiral spring 61 of the link mechanism 60 in the second direction is applied to the seat back frame 5. However, since the biasing force of the spiral spring 12 (the biasing force obtained when the curved portion 12a engages with the cooperating plate 32) is larger, the seat back frame 5 is maintained at a predetermined position (a predetermined angle) without being inclined in the second direction.

Further, when the seat back frame 5 pivots to the state of FIG. 6A, the seat back frame receives a force to be inclined in the first direction by the inertia force. However, since the biasing force of the spiral spring 61 is exerted, the abrupt inclination of the seat back frame 5 in the first direction may be prevented.

Figure 6B:
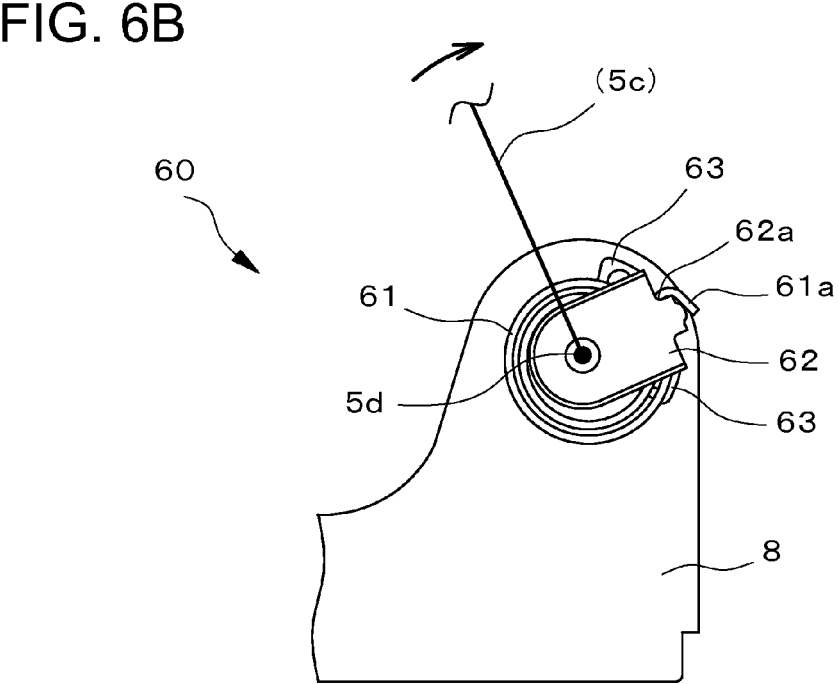
FIG. 6B is an illustrative side-view diagram illustrating the link mechanism in a seat slide state according to an embodiment of the invention.

Then, the cooperating plate 32 moves in cooperation with the slide lock mechanism 30 in the state of FIGS. 6A, 6B, that is, a state where the inclination angle of the seat back frame 5 is maintained at a predetermined angle. That is, in the state of FIGS. 6A, 6B, the lock is canceled by the operation of the slide lock mechanism 30 to be described later so that the seat bottom frame 4 slides rearward by the seat slide mechanism 20. At this time, since the cooperating plate 32 as the first engagement member also operates the slide lock mechanism 30, the number of members may be decreased. Thus, there is no problem related to an increase in the weight of the seat and the complex assembly operation due to the addition member.

Next, a relation between the reclining mechanism 10 and the link mechanism 60 in a folded state of the seat back frame 5 will be described with reference to FIGS. 7A, 7B.

Figure 7B:
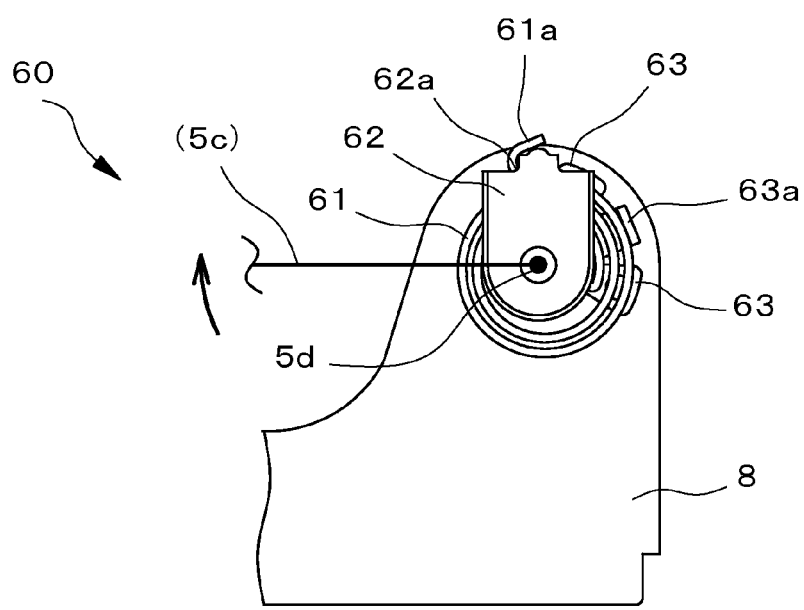
FIG. 7B is an illustrative side-view diagram illustrating the link mechanism in a folded state according to an embodiment of the invention.

FIGS. 7A, 7B illustrate a state where the seat bottom frame 4 slides rearward in the state of FIGS. 6A, 6B and the seat back frame 5 is manually further inclined forward to fold the seat back frame 5. In the reclining mechanism 10 illustrated in FIG. 7A, the curved portion 12a of the spiral spring 12 as the first biasing member engages with the stopper portion 9c. At this time, since the spiral spring 12 does not engage with the cooperating plate 32 mounted to the seat back frame 5, the biasing force is not applied to the seat back frame 5.

As illustrated in FIG. 7B, when the seat back frame 5 is folded, the locking concave portion 62a of the cooperating lever 62 is positioned above the lock portion 63a of the stopper member 63, and the curved portion 61a of the spiral spring 61 engages with the locking concave portion 62a.

At this time, the seat back frame 5 receives the biasing force in the second direction (a direction in which the seat back frame 5 stands up) by the spiral spring 61, but the seat back frame 5 is maintained in a folded state by a lock mechanism (not illustrated) of the reclining mechanism 10.

In this way, when the seat back frame 5 pivots to a predetermined position (manual operation range) and the seat back frame 5 is further pivoted in the first direction, the seat back frame is biased by the spiral spring 61 in the second direction. For this reason, the seat back frame 5 may be stably folded without pivoting swiftly.

Thus, since the seat back frame 5 may be stably folded when performing the operation of stowing the seat S, the stowing operation may be reliably performed, and hence the working efficiency of the stowing operation is improved.

Interlock of Each Mechanism and Folding Angle of Seat S

Figure 16:
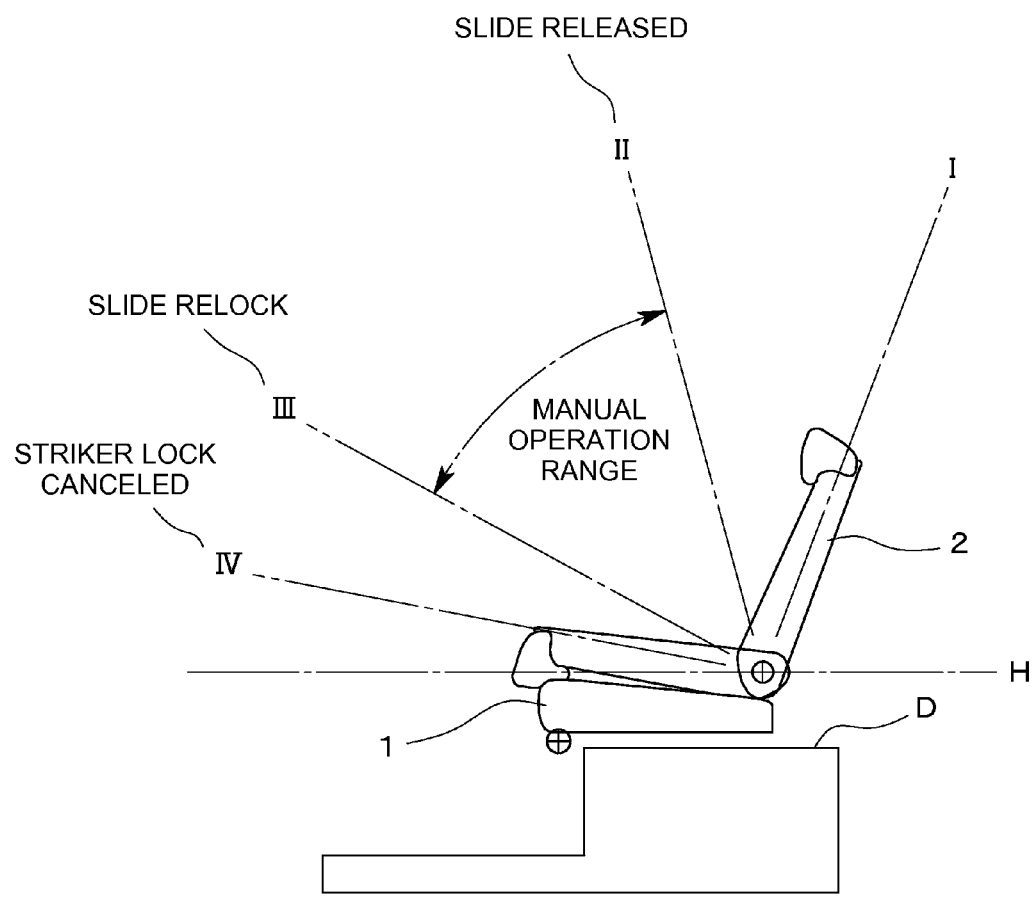
FIG. 16 is a side-view diagram illustrating a relation between an action using each mechanism and a folding angle of the stowable vehicle seat according to an embodiment of the invention.
Figure 17A:
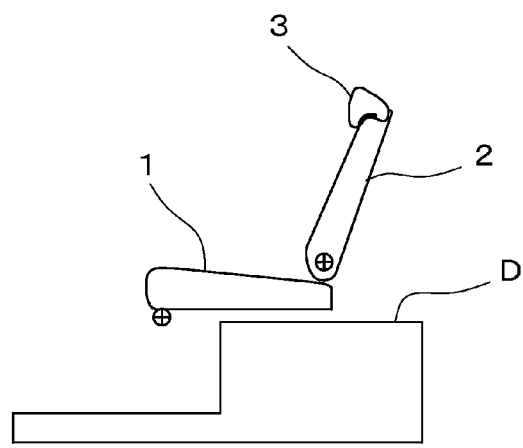
FIGS. 17A-E are operational side-view diagrams illustrating the stowable vehicle seat in a seated to stowing state according to an embodiment of the invention.
Figure 17B:
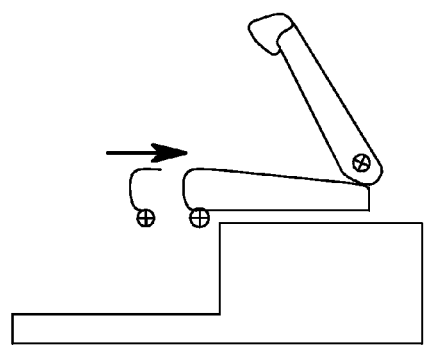
Figure 17C:
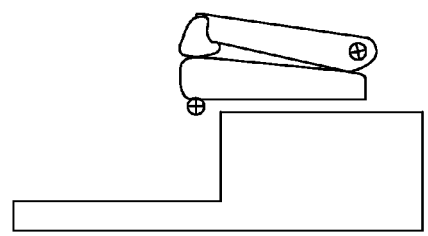
Figure 17D:
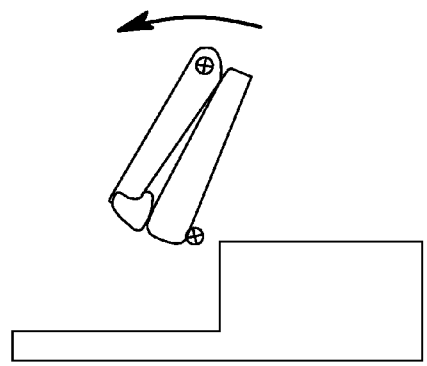
Figure 17E:
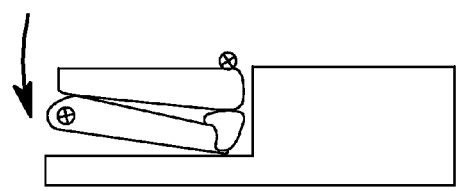
Figure 18A:
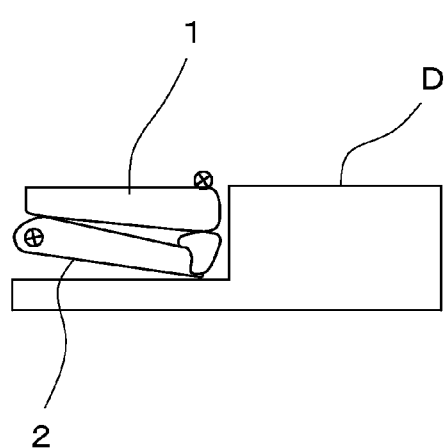
FIGS. 18A-D are operational side-view diagrams illustrating the stowable vehicle seat upon returning operation from a stowing to seated state according to an embodiment of the invention.
Figure 18B:
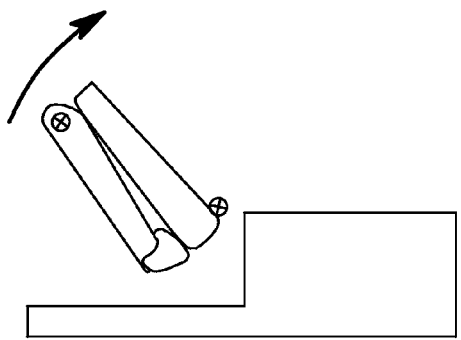
Figure 18C:
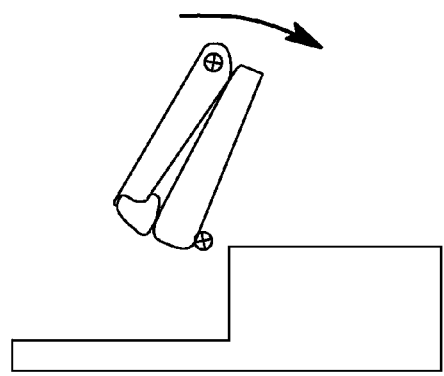
Figure 18D:
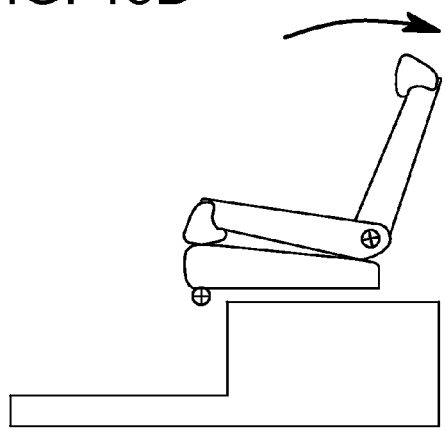

Hereinafter, the interlock of each mechanism and the folding angle of the seat S will be described with reference to FIG. 16.

First, when the reclining canceling lever 11 is operated to the standard state (angle I) of the seat S, the lock of the reclining mechanism 10 is canceled so that the reclining angle may be adjusted within the reclining adjustment range (the angles I to II).

At this time, when only the reclining canceling lever 11 is operated (a force for adjusting the reclining angle is not exerted), the lock of the slide lock mechanism 30 is canceled in cooperation with the movement so that the seat slide mechanism 20 is operated (that is, the seat bottom frame 4 receives the rearward biasing force by the slide biasing member 23 so that the upper rail 22 slides on the lower rail 21).

Further, when only the reclining canceling lever 11 is operated (a force for adjusting the reclining angle is not exerted), the biasing force in the first direction is applied to the seat back frame 5 by the action between the spiral spring 12 and the cooperating plate 32. As a result, the seat back frame 5 is automatically inclined to the angle II (that is, the seat back frame reaches the automatic operation range).

Further, at this time, the lock of the slide lock mechanism 30 is canceled in cooperation with the inclination of the seat back frame 5 and the seat slide mechanism 20 is operated. For this reason, the seat S slides toward the rear side of the vehicle body while maintaining the angle II.

Subsequently, when the seat back 2 is further inclined forward by the operation of the reclining canceling lever 11, the slide is locked again by the operation of the slide lock mechanism 30 at the angle III. Furthermore, at the states of the angles II to III (that is, the manual operation range), the seat back 2 is biased in a direction to stand up by the reaction force of the link mechanism 60 (due to the biasing force of the link mechanism 60 in the second direction).

Then, when the seat back 2 is inclined to the position of the angle IV, in the striker lock mechanism 70 and the interlock mechanism 40, the engagement state between the striker lock (latch 72) and the striker 41 is canceled, and the engagement state between the interlock 42 and the striker 41 is canceled so that the seat S may pivot forward. At this time, the seat S is assisted to face the stowing direction by the assist mechanism 50 of the seat S. When the seat S is further folded while being pivoted forward, the reclining mechanism 10 is relocked when reaching the horizontal direction H, and the pivoting of the seat back 2 with respect to the seat base 1 is locked by an existing locking element.

As described above, in the embodiment, when the operation of operating the reclining canceling lever 11 is performed once, the folding of the seat S, the canceling of the slide lock, the canceling of the striker lock, and the sliding of the seat S to the rearmost position are automatically performed.

Then, the respective operations, that is, the folding of the seat S, the canceling of the slide lock, the sliding of the seat S to the rearmost position, the relock of the slide, the canceling of the engagement state with respect to the striker 41 by the striker lock mechanism 70, and the assisting of the pivoting of the seat S in the stowing direction may be sequentially interlocked in response to the folding angle of the seat S. At this time, the interlock mechanism 40 regulates the tipping-up until the current position reaches the rearmost position, and cancels the engagement state between the interlock 42 and the striker 41 when the current position becomes the rearmost position. Accordingly, it is possible to regulate the tipping-up other than the stowing preparation position (that is, the rearmost position).

Next, the operation of stowing and returning the seat S will be described with reference to FIGS. 17A to 26.

Figure 19:
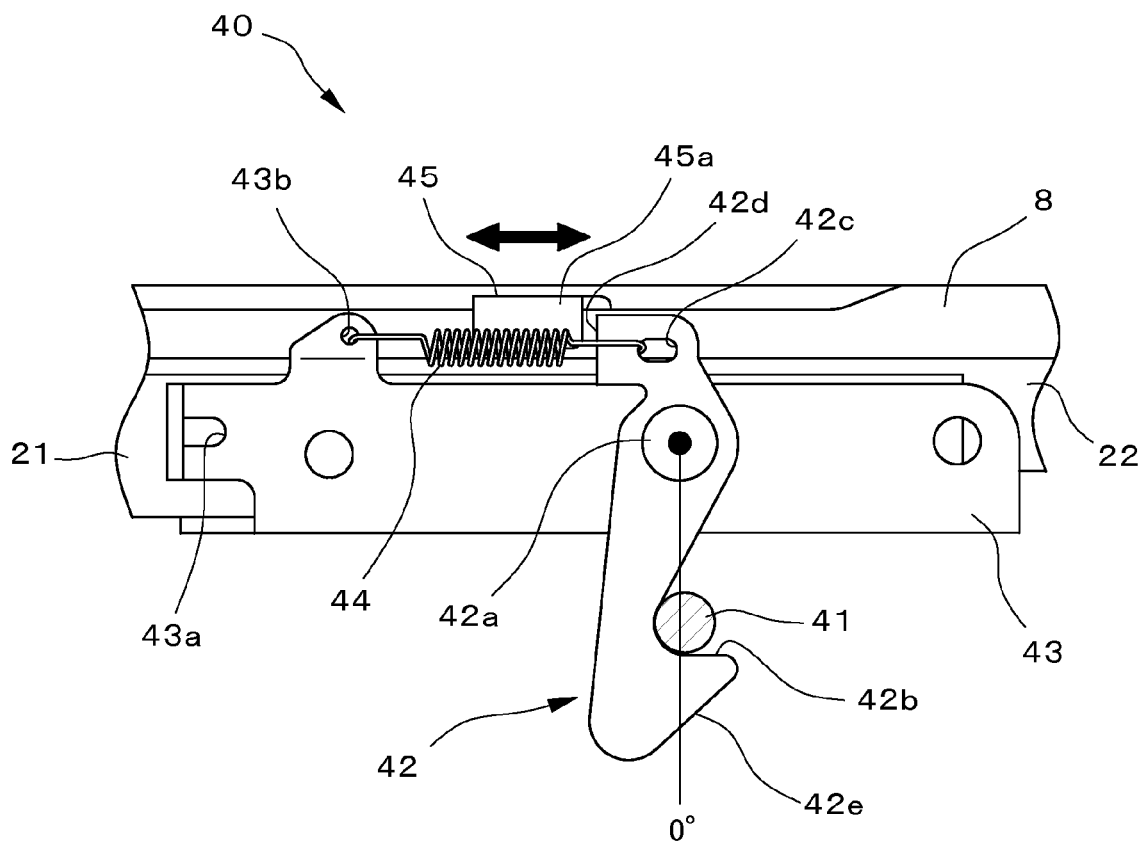
FIG. 19 is a side-view diagram illustrating an operation of an interlock according to an embodiment of the invention.
Figure 20:
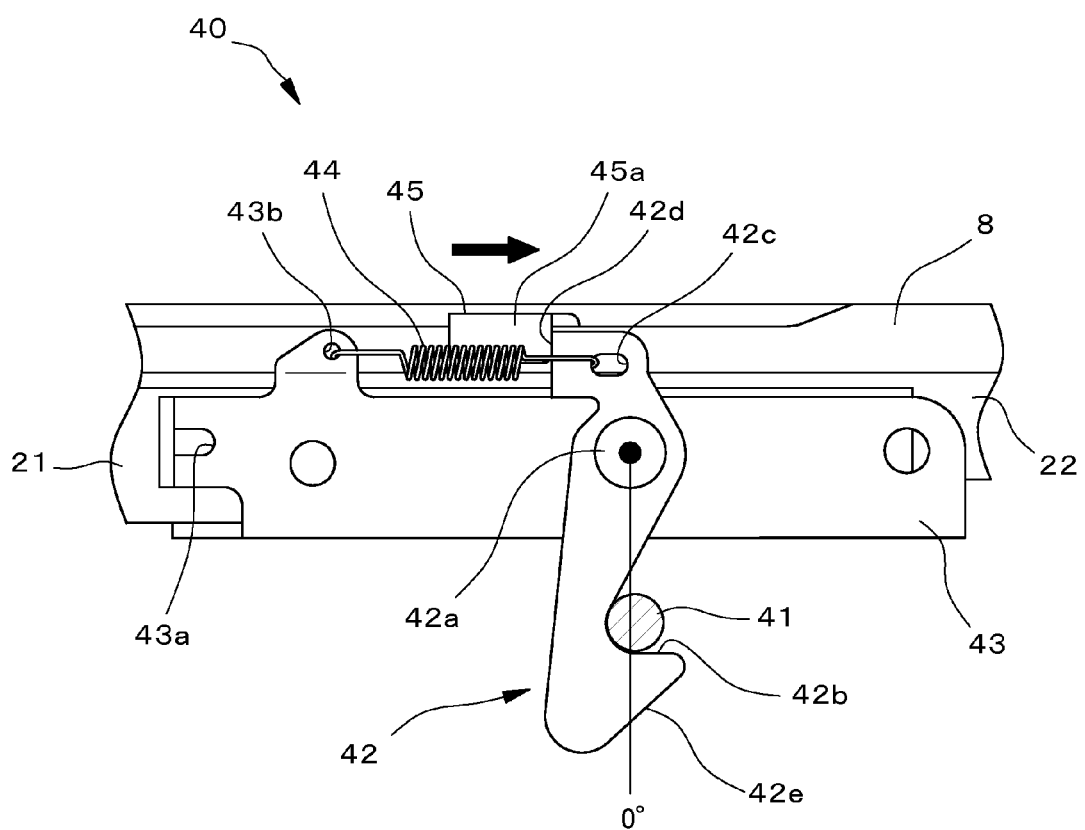
FIG. 20 is a side-view diagram illustrating an operation of the interlock according to an embodiment of the invention.

First, the operation of stowing the seat S will be described. When the seat S is in the installed state (the state illustrated in FIG. 17A), the engagement state with respect to the striker 41 by the striker lock mechanism 70 is maintained, and the interlock 42 of the interlock mechanism 40 engages with the striker 41 as illustrated in FIG. 19 (at this time, the pivot shaft 42*a* and the striker 41 are positioned on the straight line (in the perpendicular direction)). Then, when the reclining canceling lever 11 is operated, the lock of the reclining mechanism is canceled. Accordingly, the seat S changes to a state where the seat is folded and fixed to a predetermined angle (the state illustrated in FIG. 17B) by the action between the reclining mechanism 10 and the link mechanism 60. At this time, the slide lock mechanism 30 is also operated so that the sliding of the seat slide mechanism 20 is enabled. Then, the seat slide mechanism 20 is operated while the seat S is fixed to a predetermined angle so that the seat S slides rearward. As illustrated in FIG. 20, even when the seat S slides, the interlock 42 engages with the striker 41 until the biasing member 45 butts the abutment portion 42*d* of the interlock 42.

Figure 21:
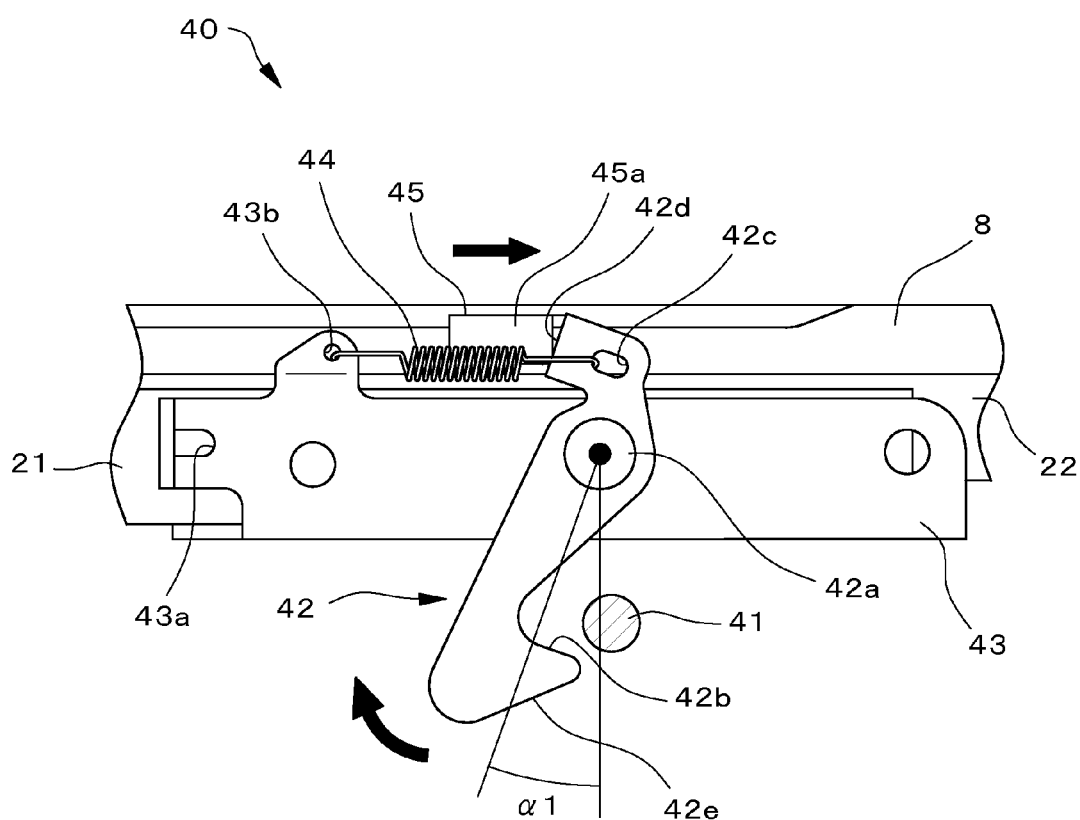
FIG. 21 is a side-view diagram illustrating an operation of the interlock according to an embodiment of the invention.
Figure 22:
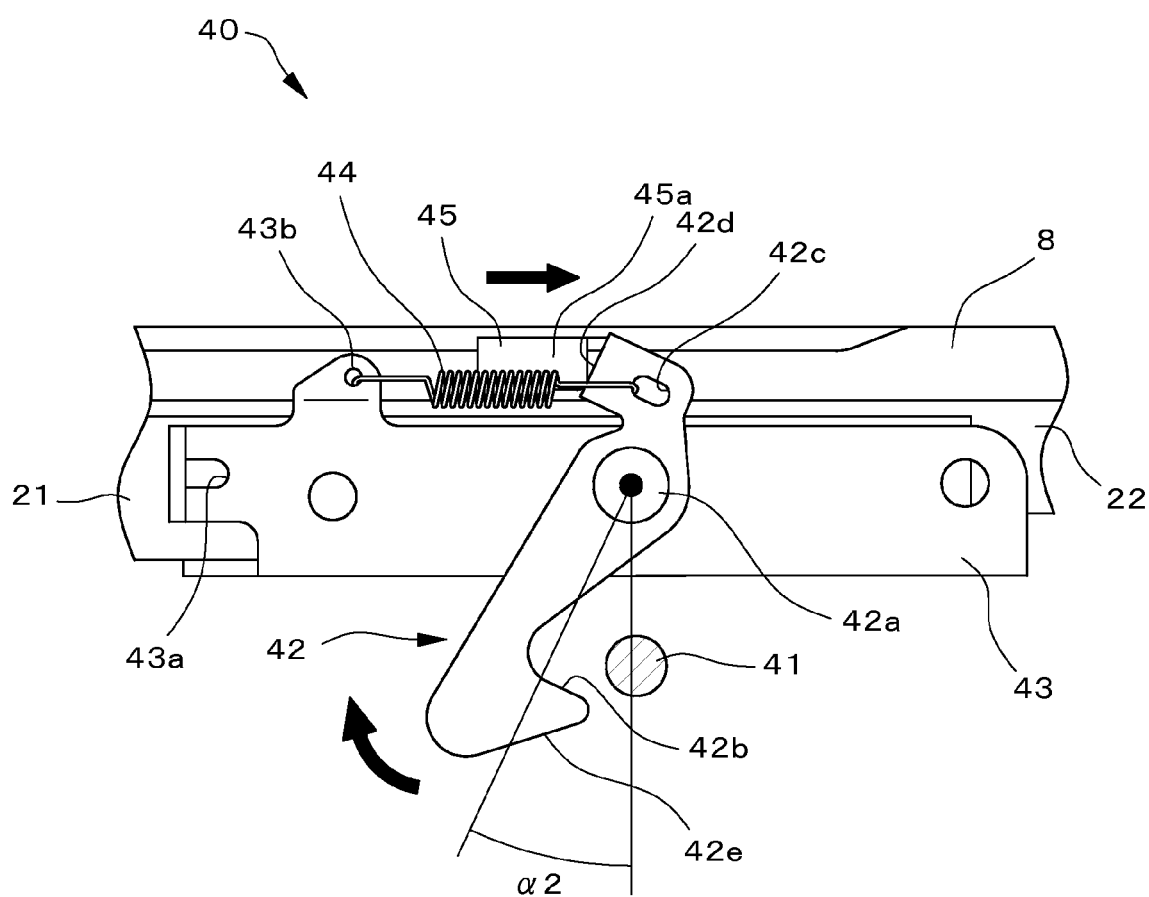
FIG. 22 is a side-view diagram illustrating an operation of the interlock according to an embodiment of the invention.
Figure 23:
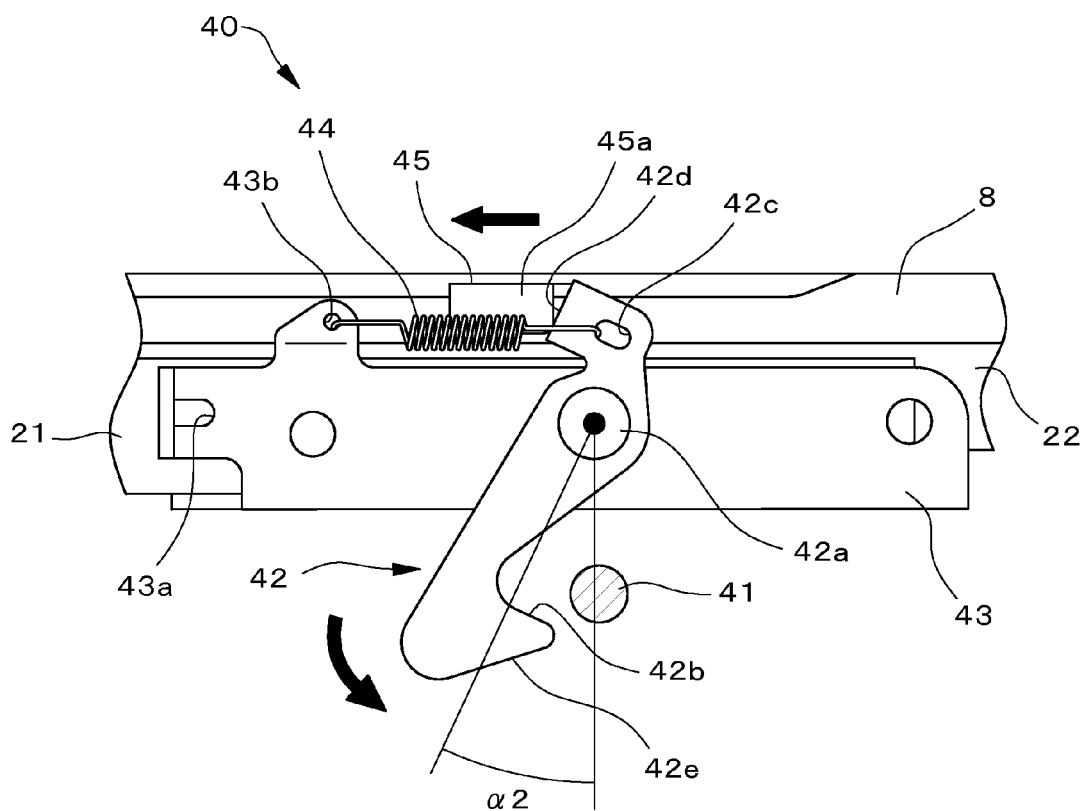
FIG. 23 is a side-view diagram illustrating an operation of the interlock according to an embodiment of the invention.

Subsequently, when the seat S is further folded manually, the seat slide mechanism 20 is locked by the slide lock mechanism 30. When the folding is further performed (see FIG. 17C), the striker lock mechanism 70 is operated, the striker lock (latch 72) is separated from the striker 41 so that the lower rail 21 may be separated from the striker 41 of the vehicle floor D. At this time, the interlock mechanism 40 is operated at the position (the rearmost position) optimal for the stowing operation. That is, the curved portion 45*a* of the biasing member 45 butts the abutment portion 42*d* of the interlock 42 with the sliding of the seat. Then, as illustrated in FIGS. 21 and 22, when the abutment portion 42*d* of the interlock 42 is further biased, the interlock 42 pivots about the pivot shaft 42*a* so that the hook portion 42*b* is separated from the striker 41 at the position of the angle α1. Then, the interlock 42 is completely separated from the striker 41 at the position of the further biased angle α2 so that the regulation of the tipping-up of the seat frame is canceled, and the seat S may pivot forward.

At this time (see FIG. 17D), the assist mechanism 50 assists the pivoting of the seat S. In this way, since the tipping-up is regulated to the rearmost position as the stowing preparation position by the interlock mechanism 40, the seat S may reliably tip up from the rear part side while the seat back is folded without tipping up incompletely even when the striker lock mechanism 70 is operated by mistake.

When the forward pivoting of the seat S ends and the seat S becomes the stowed state (the state illustrated in FIG. 17E), the rear surface of the seat base 1 and the vehicle floor D become an integrated flat surface so that a large luggage room is ensured. Furthermore, an existing locking element may be provided in order to fix the seat S to the vehicle floor D in the stowed state. Since the seat S is fixed, it is possible to prevent the seat S from abruptly moving while the vehicle travels.

Next, the operation of returning the seat S will be described. When the locking element for fixing the seat S to the vehicle floor D is canceled when the seat S is in the stowed state (the state illustrated in FIG. 18A), the seat S may pivot rearward. Then, when performing an operation of pivoting the seat S rearward (see FIG. 18B), the assist mechanism 50 assists the pivoting of the seat S.

At the time point (the state illustrated in FIG. 18C) in which the rearward pivoting is further performed and the rearward pivoting will end soon, the seat base 1 is biased by the assist spring 51 in the stowing direction. For this reason, the seat S is biased downward (in the returning direction) so that the striker lock (latch 72) of the striker lock mechanism 70 is locked to the striker 41 near the vehicle floor D.

Figure 24:
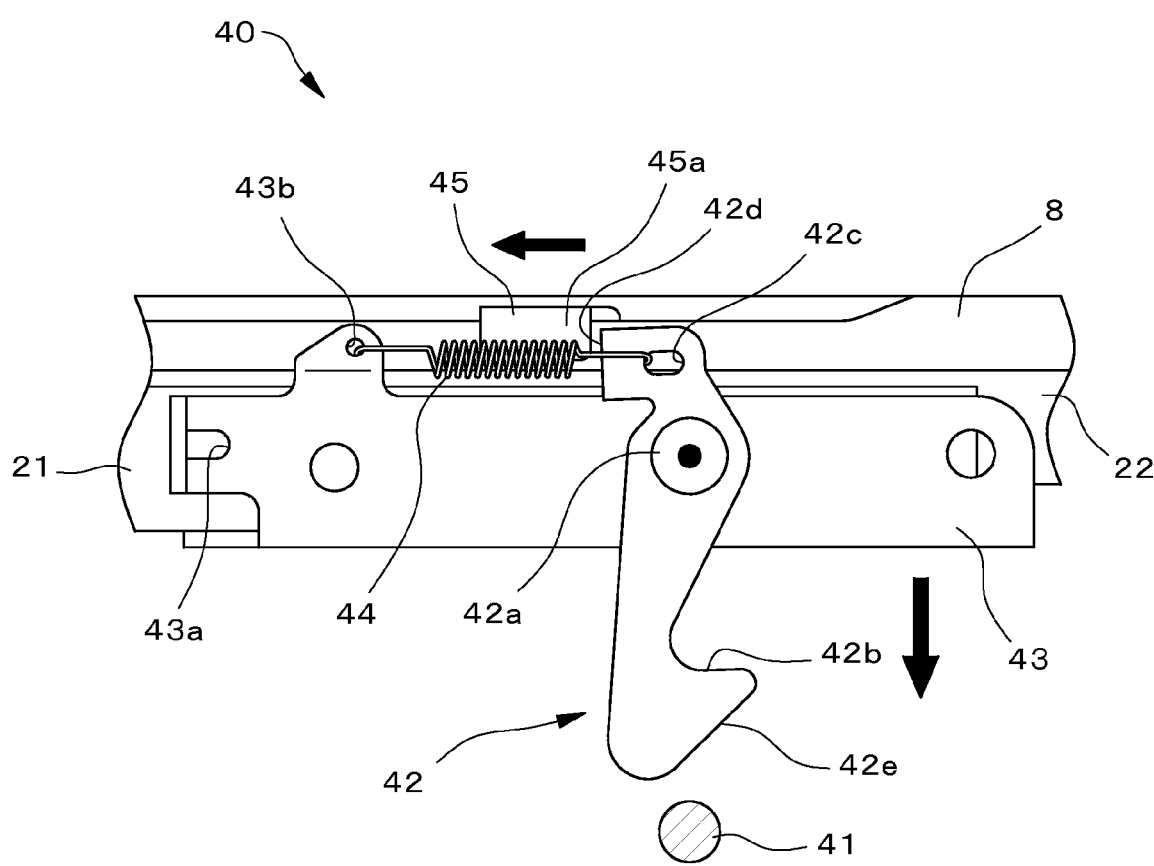
FIG. 24 is a side-view diagram illustrating an operation of the interlock according to an embodiment of the invention.
Figure 25:
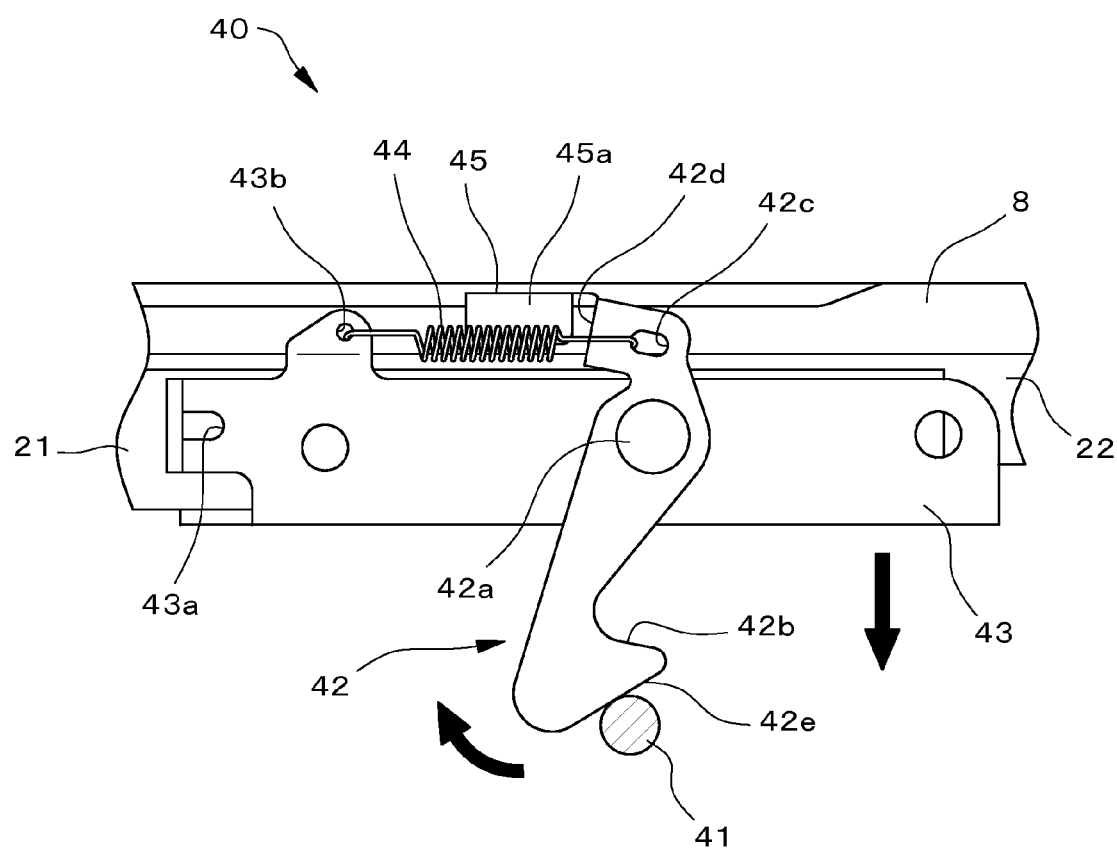
FIG. 25 is a side-view diagram illustrating an operation of the interlock according to an embodiment of the invention.
Figure 26:
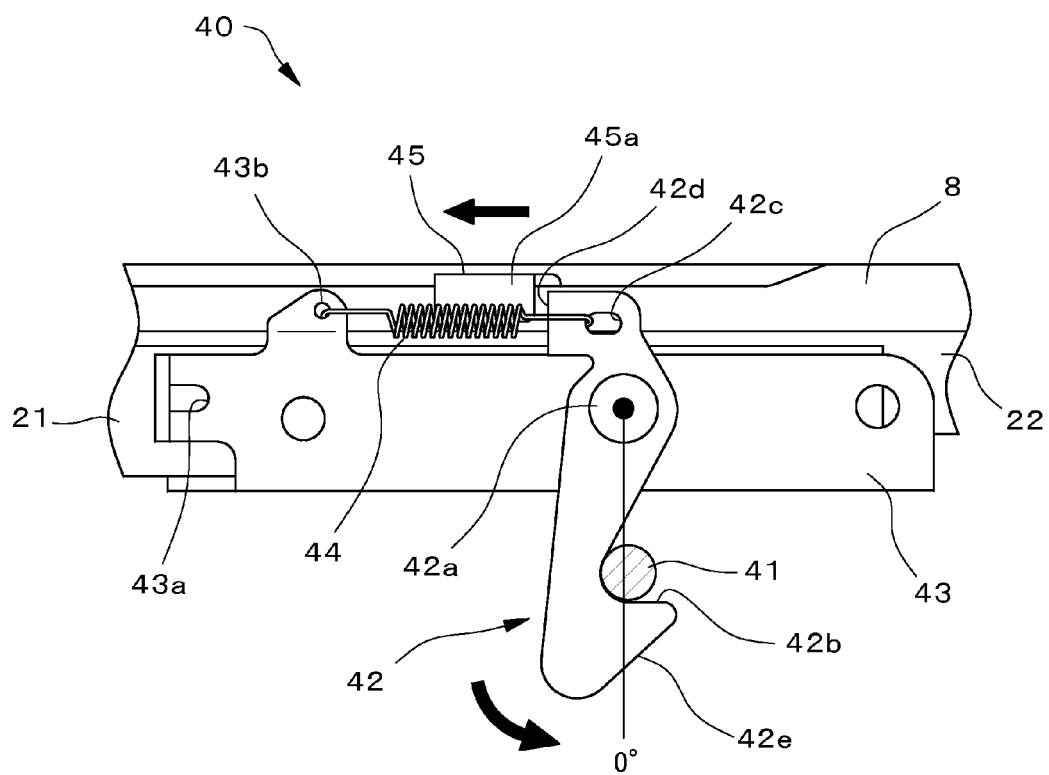
FIG. 26 is a side-view diagram illustrating an operation of the interlock according to an embodiment of the invention.

At this time, as illustrated in FIGS. 24 to 26, the interlock mechanism 40 is positioned above the striker 41 near the rearmost position since the seat frame is biased downward. Then, the inclined surface portion 42*e* of the end of the interlock 42 further moves downward from the position of FIG. 24 to abut against the striker 41, and pivots about the pivot shaft 42*a* along the inclined surface portion 42*e* against the interlock biasing member 44 as illustrated in FIG. 25 so that the seat S is biased downward.

Finally, when the seat S is set to the installation position (the rearmost position) (see FIG. 18D), the striker 41 passes over the end of the hook portion 42*b*, and the interlock 42 returns about the pivot shaft 42*a* by the force of the interlock biasing member 44 as illustrated in FIG. 26 to engage with the striker 41 in a lock state. In this way, when the interlock 42 of the interlock mechanism 40 is locked to the striker 41 and the seat back 2 stands up, the operation of returning the seat S is completed.

Outline of Stowable Vehicle Seat of Another Embodiment

Next, a stowable vehicle seat (hereinafter, referred to as a seat S') according to another embodiment of the invention will be described with reference to FIGS. 27 to 34. Furthermore, the same components as those of the above-described embodiment are denoted by the same letters and numerals, and the description thereof will not be repeated.

Figure 27:
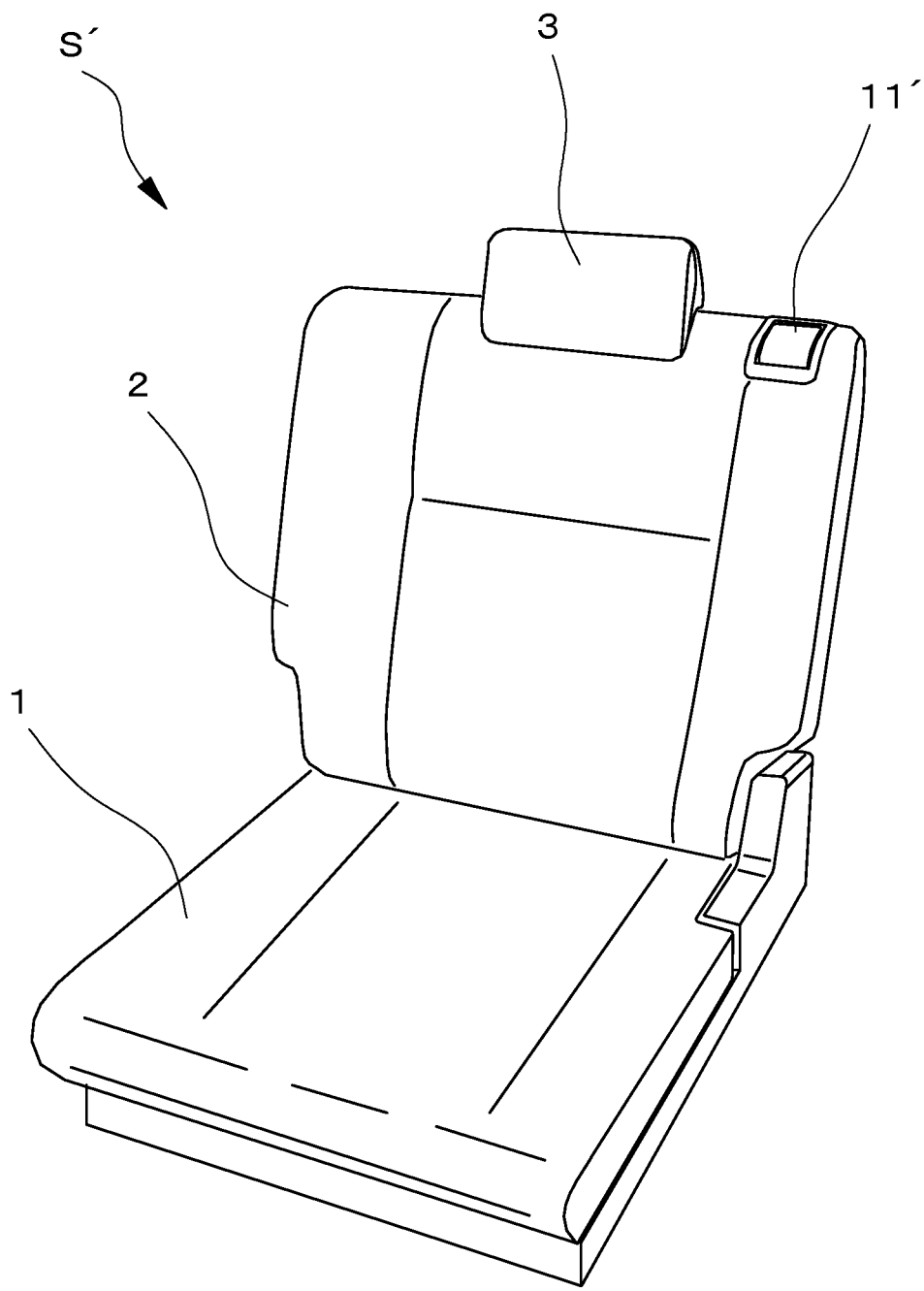
FIG. 27 is a front perspective view of the stowable vehicle seat according to an embodiment of the invention.

The seat S' is disposed on the vehicle floor D, and includes the seat base 1, the seat back 2, and the headrest 3 as illustrated in FIG. 27. Further, this embodiment is different from the above-described embodiment in that a reclining canceling lever 11' is disposed above the seat back 2 to cancel the reclining of the seat S'. Furthermore, as the reclining canceling element, a string or strap shaped element may be provided other than the lever shaped element illustrated in the embodiment.

In the seat bottom frame 4, the bottom portion thereof is provided with the slide rail 24, and the seat bottom frame is movable in the front to back direction in cooperation with the operation of the seat back 2 through a first link mechanism 180 to be described later or an existing seat position adjusting mechanism. Furthermore, the slide rail 24 includes the upper rail 22 which is disposed near the seat base 1 and the lower rail 21 which is mounted to the opposite side of the seat base 1.

Mechanism provided in Seat S'

The seat S' is provided with a reclining mechanism (not illustrated), the seat slide mechanism 120, the slide lock mechanism 130, the interlock mechanism (not illustrated), the assist mechanism 150, and the striker lock mechanism 170.

Hereinafter, the seat slide mechanism 120, the slide lock mechanism 130, the assist mechanism 150, and the striker lock mechanism 170 among the mechanisms provided in the seat S' will be described.

Seat Slide Mechanism 120

The seat slide mechanism 120 slides the seat S' rearward in cooperation with the folding operation of the seat S'. The main member of the seat slide mechanism 120 is divided into two members, that is, the first link mechanism 180 and a converting mechanism (not illustrated). The first link mechanism 180 is provided near the seat back frame 5, and the converting mechanism is provided near the seat bottom frame 4.

One of the members constituting (hereinafter, the link member) the first link mechanism 180 is connected to the slide rail 24 by the wire cable W through the converting mechanism, and pulls the wire cable W in cooperation with the folding operation of the seat S'. The converting mechanism converts the operation of pulling the wire cable W using the link member of the first link mechanism 180 into the operation of sliding the seat S'. That is, when the link member pulls the wire cable W, the converting mechanism changes the direction of pulling the wire cable W o that the slide rail 24 connected to the wire cable W is pulled.

In the seat slide mechanism 120 with the above-described configuration, when the operation of folding the seat S' is performed, the link member of the first link mechanism 180 pulls the wire cable W in cooperation with the operation. The operation of pulling the wire cable W is transmitted to the slide rail 24 through the converting mechanism, and the slide rail 24 is pulled so that the seat S' slides rearward finally.

Slide Lock Mechanism 130

The slide lock mechanism 130 of the embodiment appropriately cancels the slide lock of the seat slide mechanism 120. The member that drives the slide lock mechanism 130 is divided into two members, that is, the above-described first link mechanism 180 and a rail side mechanism 160, and the rail side mechanism 160 is provided near the slide rail 24. Such a mechanism is connected through the wire cable W, and the lock of the slide rail 24 is canceled in accordance with the timing at which the seat S' slides by the seat slide mechanism 120.

Specifically, the member (hereinafter, the other link member) that constitutes the first link mechanism 180 near the seat back frame 5 is connected to an engagement member (not illustrated) provided in the upper rail 22 of the slide rail 24 by the wire cable W, and when the operation of folding the seat S' is performed, the wire cable W is pulled in cooperation with the operation.

The rail side mechanism 160 includes an engagement member that is provided near the upper rail 22 to be connected to the other link member through the wire cable W and an engagement member (not illustrated) that is provided near the lower rail 21. If the wire cable W is pulled toward the first link mechanism 180 when the engagement members engage with each other, the engagement state between the engagement members is canceled.

In the slide lock mechanism 130 with the above-described configuration, when the operation of folding the seat S' is performed, the other link member of the first link mechanism 180 pulls the wire cable W in cooperation with the operation. In accordance with the operation of pulling the wire cable W, the engagement state between the engagement member near the upper rail 22 and the engagement member near the lower rail 21 is canceled so that the sliding of the seat S' is enabled.

Assisting Mechanism 150

The assist mechanism 150 of the embodiment assists the operation of stowing or returning the seat S'. Specifically, the assist mechanism 150 includes a plurality of assist springs 151 which have substantially the same size and spring constant, and the plurality of assist springs 151 include an assist spring which biases the seat S' in the returning direction during the operation of returning the seat S' and an assist spring which biases the seat in the folding direction (the stowing direction) during the operation of stowing the seat S'.

The seat S' is provided with a portion subject to be biased (not illustrated) which is provided at a position contacting the assist spring 151 to receive the biasing force of the assist spring 151. The contact surface of the assist spring 151 with respect to the portion subject to be biased changes in response to the state of the seat S' (the stowed state or the installed state). Accordingly, in the plurality of assist springs 151, the assist spring 151 which biases the portion subject to be biased changes in response to the state of the seat S'.

In the assist mechanism 150 with the above-described configuration, when the seat S' is in the stowed state, the assist spring 151 which biases the seat S' in the returning direction biases the portion subject to be biased. As a result, when the lock state of the pivoting of the seat S' using a lock mechanism (not illustrated) is canceled, the biasing force of the assist spring 151 is applied to the seat S' so that the seat pivots in the returning direction. Accordingly, since the seat S' tips up in the returning direction, the seat S' may be returned by a small force.

When the seat S' is in the installed state, the assist spring 151 which biases the seat S' in the folding direction biases the portion subject to be biased. As a result, when the lock state of the seat S' with respect to the vehicle floor D is canceled by the striker lock mechanism 170 to be described later, the biasing force of the assist spring 151 which pivots the seat S' in the folding direction is exerted. Accordingly, since the seat S' tips up in the folding direction, the seat S' may be stowed by a small force.

Striker Lock Mechanism 170

The striker lock mechanism 170 of the embodiment mainly includes a second link mechanism 190 provided near the seat back frame 5 and the striker lock (latch 72) provided near the seat bottom frame 4, and these are connected to each other by the wire cable W.

The second link mechanism 190 is operated to pull one end of the wire cable W when folding the seat S'. The other end of the wire cable W is mounted to the hook shaped striker lock (latch 72) provided near the seat bottom frame 4. The striker lock (latch 72) is locked to the striker 41 of the vehicle floor D, and the lock state with respect to the striker 41 is canceled when one end of the wire cable W is pulled.

Furthermore, when the lock state between the striker lock (latch 72) and the striker 41 is canceled, the seat base 1 is supported only by the assist mechanism 150, and hence may pivot in the front to back direction.

Interlock of Each Mechanism and Folding Angle of Seat

Figure 29:
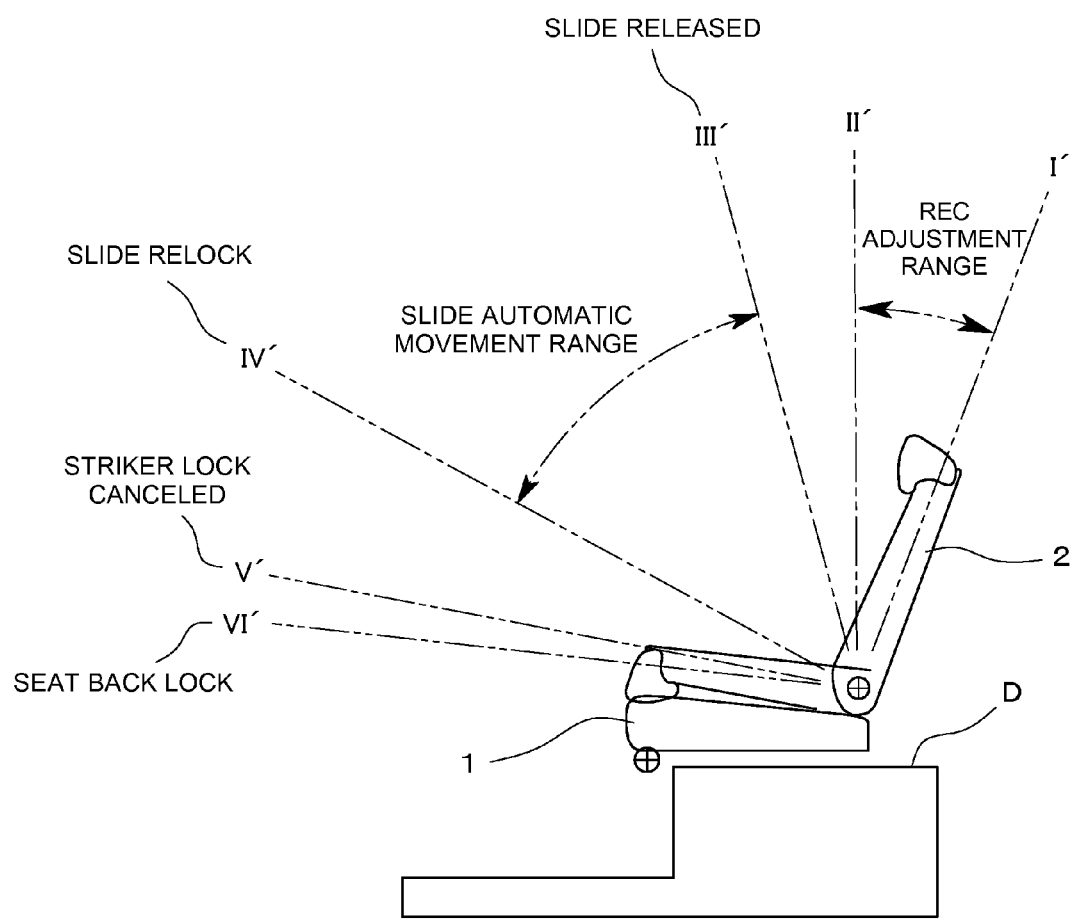
FIG. 29 is a side-view diagram illustrating a relation between an action using each mechanism and a folding angle of the stowable vehicle seat according to an embodiment of the invention.

Hereinafter, the interlock of each mechanism and the folding angle of the seat S' will be described with reference to FIG. 29.

First, when the reclining canceling lever 11' is operated in the standing state (the angle I') of the seat S', the lock of the reclining mechanism is canceled so that the reclining angle may be adjusted within the reclining adjustment range (the angles I' to II'). When the seat back 2 is inclined forward while operating the reclining canceling lever 11', the slide lock mechanism 130 is operated at the angle III' so that the slide lock is canceled and the sliding of the seat S' is enabled.

The seat slide mechanism 120 is operated in the range of the angles III' to IV' to slide the seat S' rearward. Then, when the seat back 2 is inclined to the position of the angle IV', the sliding is locked again by the slide lock mechanism 130. When the seat back 2 is further inclined and reaches the angle V', the engagement state between the striker lock (latch 72) and the striker 41 is canceled so that the seat S' may pivot forward. At this time, the seat S' is assisted by the assist mechanism 150 of the seat S' so that the seat faces the stowing direction. When the seat S' is further folded while pivoting forward, the pivoting of the seat back 2 with respect to the seat base 1 is locked by an existing locking element when the seat back reaches the angle VI'.

As described above, in the embodiment, when the operation of operating the reclining canceling lever 11' is performed once, the respective operations, that is, the folding of the seat S', the canceling of the slide lock, the sliding of the seat S' to the rearmost position, the slide relock, the canceling of the engagement state between the striker lock (latch 72) and the striker 41, and the assisting of the pivoting of the seat S' in the stowing direction may be sequentially interlocked in response to the folding angle of the seat S'.

Schematic Structure of Seat Bottom Frame 4

Next, a schematic structure of the seat bottom frame 4 as the characteristic component of the embodiment will be described with reference to FIGS. 28, 30, 31, 33A, and 33B.

Figure 28:
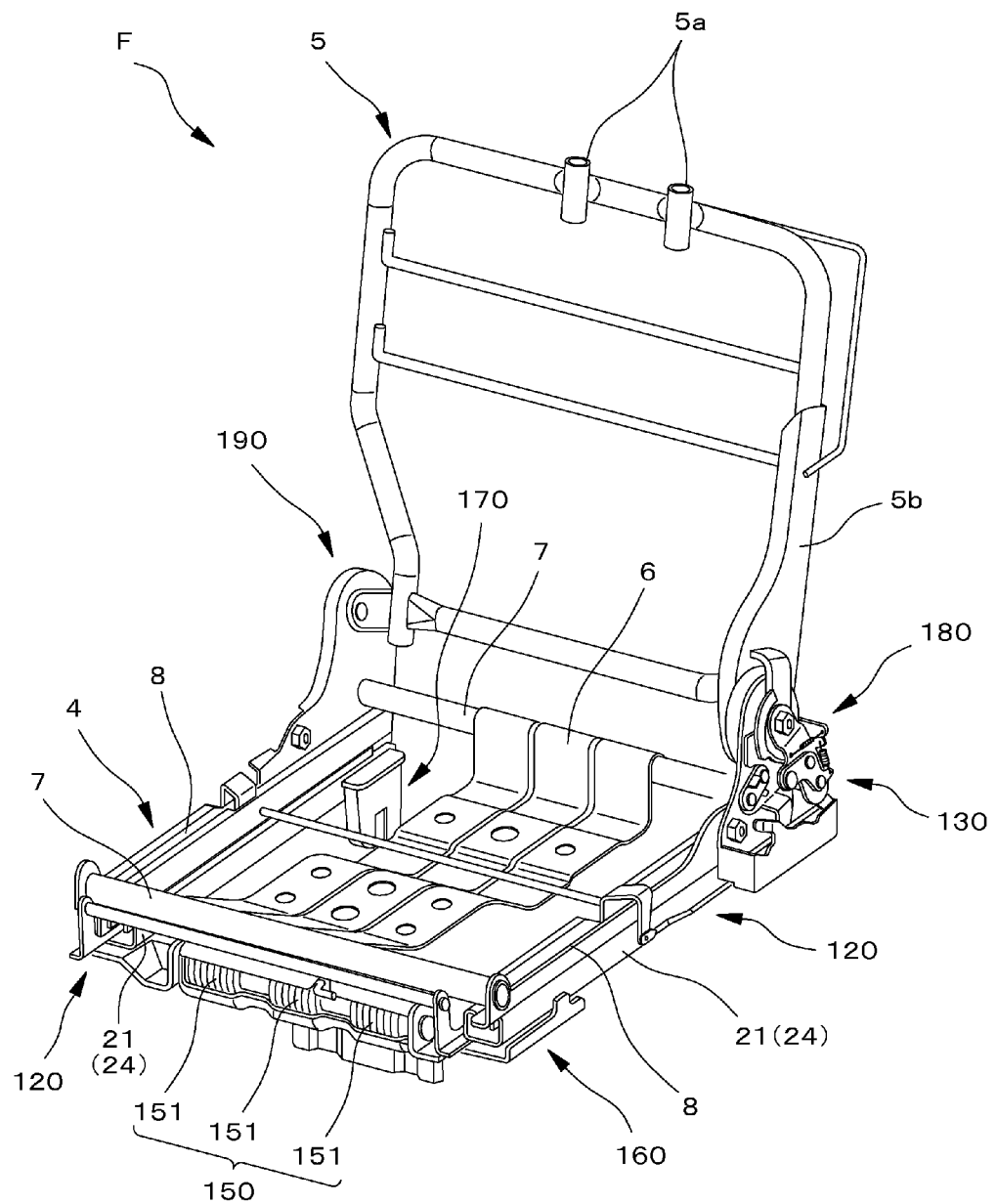
FIG. 28 is a schematic perspective view of the seat frame according to an embodiment of the invention.
Figure 30:
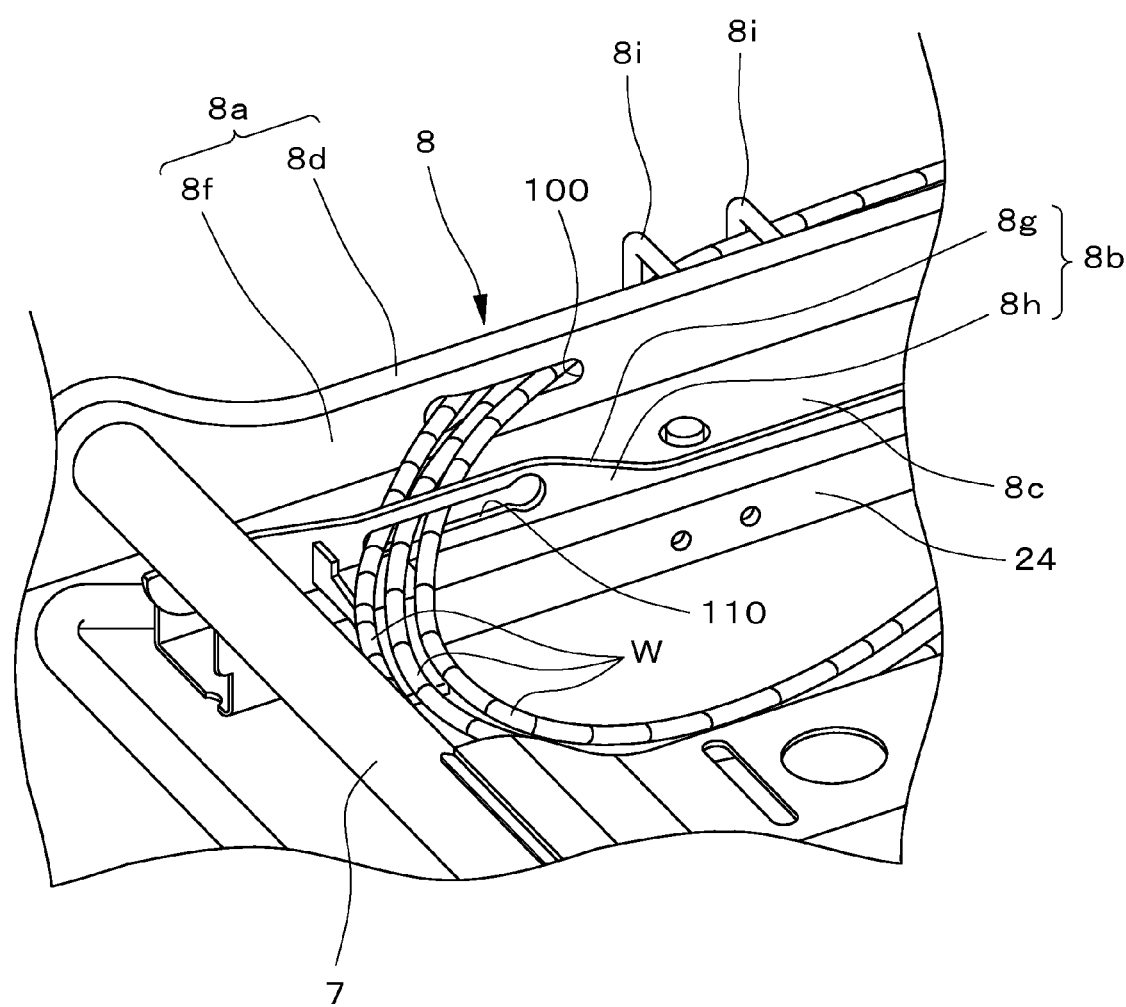
FIG. 30 is a schematic perspective view illustrating the periphery of a hole through which a cable is inserted according to an embodiment of the invention.

As illustrated in FIGS. 28 and 30, the seat bottom frame 4 includes the side bracket 8 which is provided at each of both side portions in the width direction, a connection member 7 which connects the side brackets 8 to each other, and the bottom plate 6 which defines the bottom portion of the seat bottom frame 4.

Figure 31:
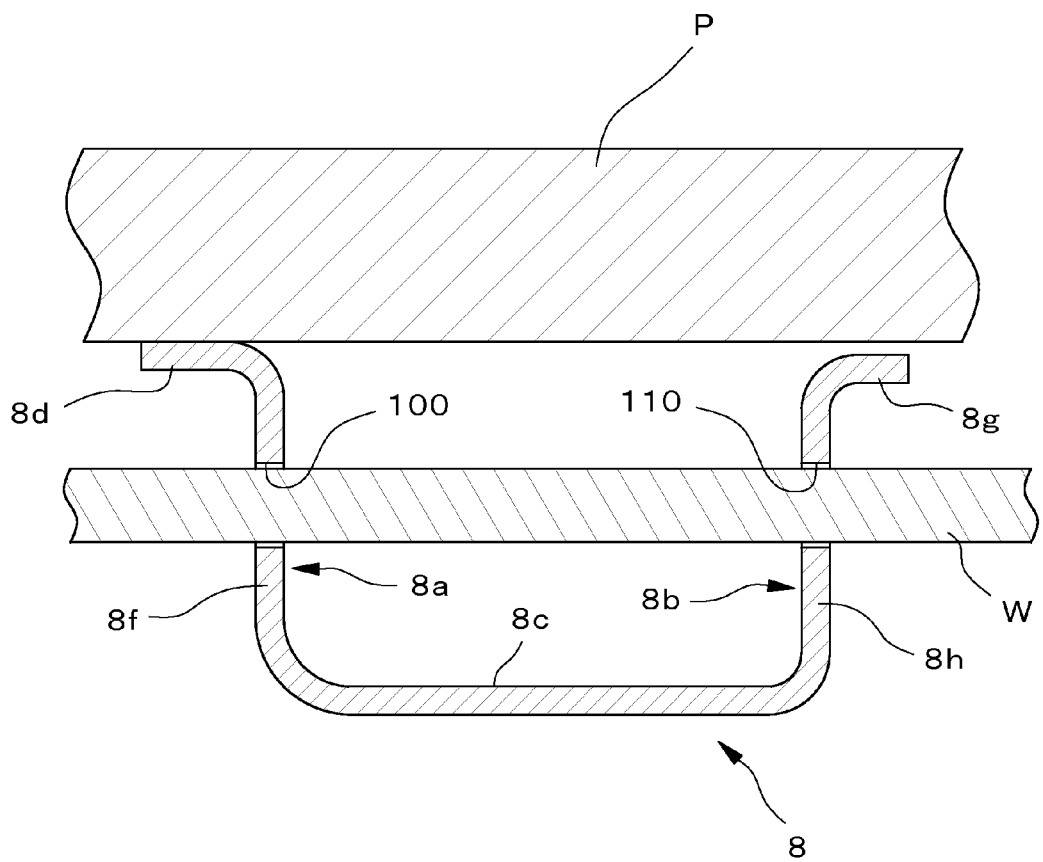
FIG. 31 is a schematic cross-sectional view of the seat bottom frame according to an embodiment of the invention.

As illustrated in FIG. 31, each side bracket 8 is formed in a substantially U-shape in the front view, and includes an outer wall 8a, an inner wall 8b, and a bottom wall 8c as components.

As illustrated in FIG. 30, the outer wall 8a includes a flange portion 8d as a cushion material placement portion and an intersection portion 8f which intersects the flange portion 8d.

The flange portion 8d is positioned at the uppermost side in the side bracket 8, and extends in a horizontal shape along the vehicle advancing direction. Furthermore, the cushion pad P is placed on the upper surface of the flange portion 8d. The intersection portion 8f is adjacent to the flange portion 8d at the lower side of the flange portion 8d, and extends along the vehicle advancing direction while being substantially perpendicular to the flange portion 8d.

The bottom wall 8c is a portion which corresponds to the bottom portion in the side bracket 8, is adjacent to the lower portion of the intersection portion 8f of the outer wall 8a, and extends along the vehicle advancing direction while being substantially perpendicular to the intersection portion 8f (that is, in a substantially horizontal shape).

The inner wall 8b is a portion which is provided in the front end of the side bracket 8 to face the outer wall 8a, and includes a second flange portion 8g and a second intersection portion 8h which intersects the second flange portion 8g.

As in the flange portion 8d of the outer wall 8a, the second flange portion 8g is positioned at the uppermost side of the side bracket 8, and extends in a substantially horizontal shape along the vehicle advancing direction, where the cushion pad P is placed on the upper surface thereof. The second intersection portion 8h intersects the second flange portion 8g (that is, the flange portion 8d of the outer wall 8a), and is adjacent to the bottom wall 8c at a position opposite to the position where the intersection portion 8f of the outer wall 8a is positioned. Furthermore, the second intersection portion 8h also extends along the vehicle advancing direction as in the intersection portion 8f.

Wiring of Wire Cable W

In the respective mechanisms (for example, the slide lock mechanism 130 or the striker lock mechanism 170) provided in the seat S', the wire cable W is used as the power transmission component. The wire cable W is wired to connect the components of the respective mechanisms as described above. The wiring of the wire cable W needs to be performed in an appropriate wiring path not to prevent the wire cable W from being entangled when the seat S' is folded or slides.

In the embodiment, a structure for appropriately wiring the wire cable W is employed, and hereinafter, a structure for wiring the wire cable W and a wiring pattern of the wire cable W by the structure will be described with reference to FIGS. 30 to 34.

The shape or the like of the wire cable W used in the embodiment will be described when describing the wiring of the wire cable W. The wire cable W includes an inner wire and a tubular resinous cable through which the inner wire is guided, and a locking bracket is mounted to the end of the resinous cable. Further, in the embodiment, the outer diameter of the resinous cable (equal to the outer diameter of the wire cable W) is about 5 mm.

The wire cable W with the above-described structure is drawn to the outside of the seat frame F and is pulled around the outer edge of the seat frame F while one end thereof is mounted to a predetermined mounting position. Particularly, in the embodiment, the wire cable is pulled around the front end of the outer wall 8a along the outer wall 8a of the side bracket 8 provided in the seat bottom frame 4.

Further, in the embodiment, since there are a plurality of mechanisms using the wire cable W, a plurality of wire cables W also exist, and the plurality of wire cables W are pulled around the outer wall 8a in a well arranged state (see FIGS. 33A and 33B).

Furthermore, a rod member 8i is mounted to the other surface of the outer wall 8a. The rod member 8i includes bent portions 8j which are formed in an L-shape at the front and rear sides and a connection portion 8k which connects the bent portions 8j. The rod member 8i with such a structure is provided in the outer surface of the outer wall 8a. For this reason, the wire cables W pulled around the outer wall 8a pass through inside the bent portions 8j, the plurality of wire cables W are bound, and a portion which is pulled around the outer wall 8a of the wire cable W may be arranged.

The plurality of wire cables W which are pulled around the outer wall 8a of the side bracket 8 are respectively pulled into the seat bottom frame 4 (a space interposed between two side brackets 8) from the side portion of the seat bottom frame 4. Then, in the embodiment, each wire cable W passes through a hole (hereinafter, a cable hole 100) in the intersection portion 8f of the outer wall 8a to be pulled into the seat bottom frame 4. Further, each wire cable W passing through the cable hole 100 passes through a second hole (hereinafter, a second cable hole 110) formed in the second intersection portion 8h of the inner wall 8b.

As described above, in the embodiment, when each wire cable W is pulled from the side portion of the seat bottom frame 4, the cable passes through the cable hole 100 and the second cable hole 110. Accordingly, the respective wire cables W may be wired in an arranged state.

Furthermore, in the embodiment, since the seat S' is folded and slid, the wire cable W also moves in cooperation with the operation. At this time, since the wire cables W are arranged, it is possible to prevent the wire cables W from being entangled when the wire cables move.

Further, the cable hole 100 or the second cable hole 110 through which the wire cable W passes is not formed in the flange portion 8d or the second flange portion 8g of the side bracket 8, but is formed in the intersection portion 8f or the second intersection portion 8h positioned therebelow. Accordingly, it is possible to wire the wire cables W without applying a load to the wire cable W.

That is, as described above, if the wire cable W is loaded on the flange portion 8d or the second flange portion 8g when the wire cable is pulled from the side portion of the seat bottom frame 4, the wire cable W is nipped between the flange portion 8*d* or the second flange portion 8*g* and the cushion pad P. In this case, when the occupant sits on the seat S' or is loaded on the seat, a load is directly applied to the wire cable W so that there is a concern that the wire cable W may be damaged or deformed.

On the contrary, in the embodiment, the intersection portion 8*f* or the second intersection portion 8*h* positioned at the lower portion of the flange portion 8*d* or the second flange portion 8*g* is provided with the hole (the cable hole 100 and the second cable hole 110) through which the wire cable W passes. Then, when the wire cable W is pulled from the side portion of the seat bottom frame 4, the wire cable W passes through the hole. Thus, there is no need to nip the wire cable W between the flange portion 8*d* or the second flange portion 8*g* and the cushion pad P, and no load is directly applied to the wire cable W.

The above-described effect is particularly present in the seat S' which may be folded by the pivoting of the seat back 2. That is, in the seat in which a person or a luggage may be loaded on the rear surface of the folded seat back 2, when the wire cable W is nipped between the flange portion 8*d* or the second flange portion 8*g* and the cushion pad P, a load is more frequently applied to the wire cable W. Thus, in the foldable seat, it is possible to further effectively prevent a problem in which the second cable hole 110 and the wire cable W is nipped between the flange portion 8*d* or the second flange portion 8*g* and the cushion pad P by passing the wire cable W through the cable hole 100.

Figure 32:
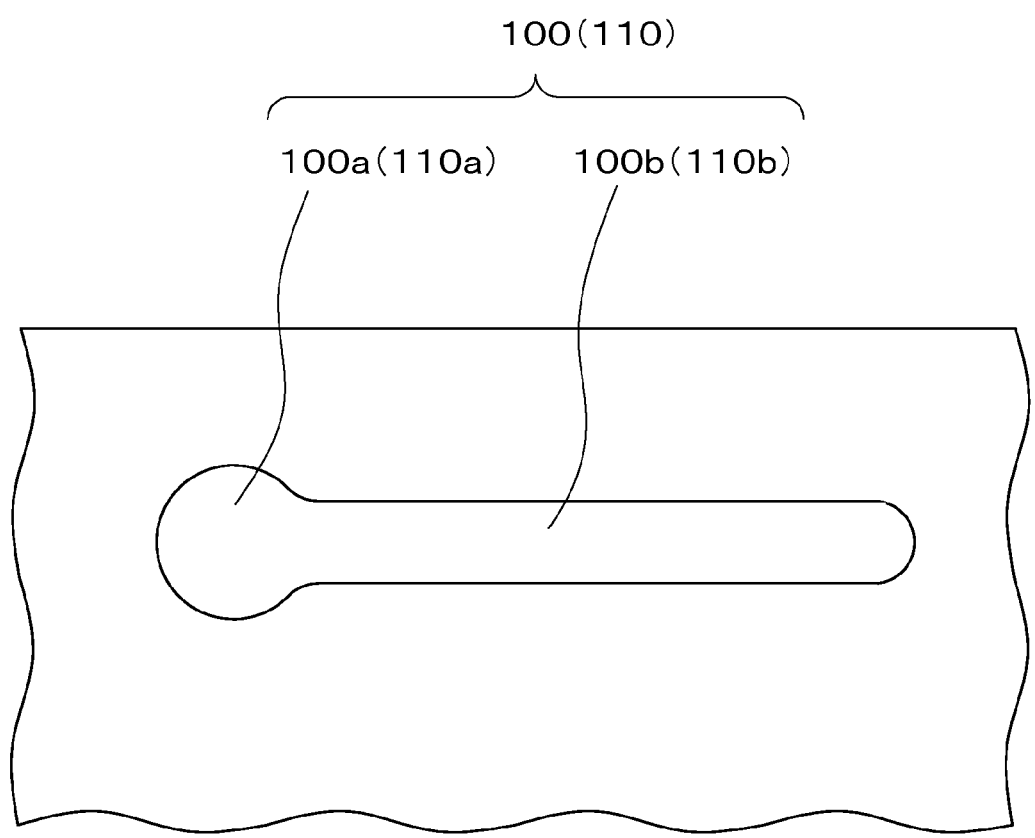
FIG. 32 is a plan-view diagram illustrating a shape of the hole through which a cable is inserted according to an embodiment of the invention.
Figure 34:
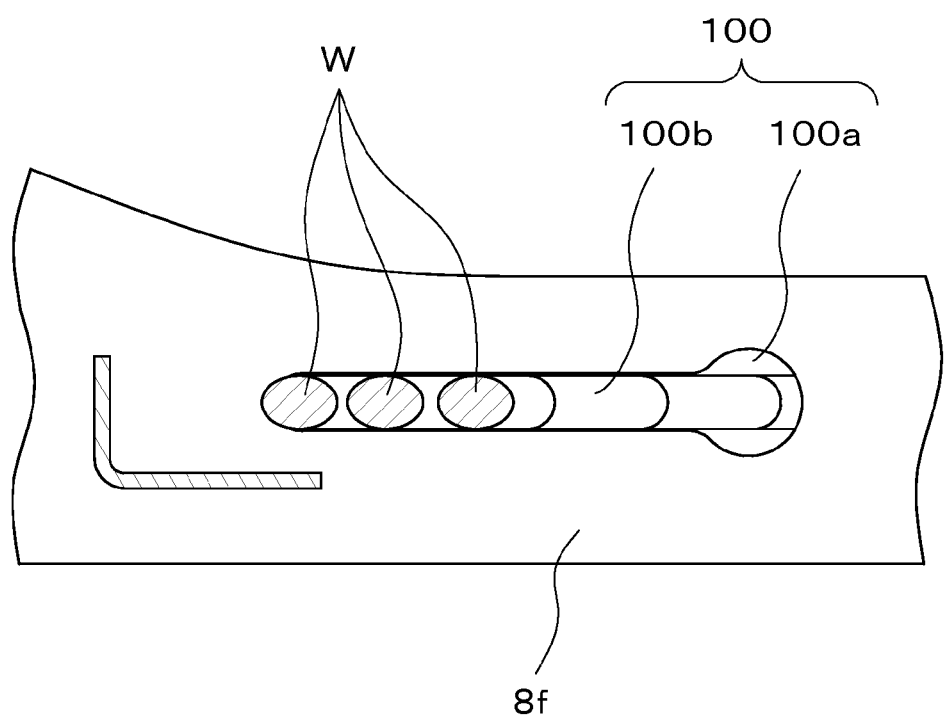
FIG. 34 is a plan-view diagram illustrating a state where a cable passes through the hole according to an embodiment of the invention.

Next, the cable hole 100 and the second cable hole 110 according to the embodiment will be described with reference to FIGS. 32 to 34. Furthermore, since the cable hole 100 and the second cable hole 110 respectively have substantially the same shape, the shape of the cable hole 100 will be mainly described.

The cable hole 100 and the second cable hole 110 are all formed as an elongated hole. That is, since the cable hole 100 and the second cable hole 110 both have a sufficient width, the plurality of wire cables W may pass through the cable hole 100 and the second cable hole 110. Furthermore, the longitudinal direction of the cable hole 100 as the elongated hole follows the extension direction of the intersection portion 8*f*, and the longitudinal direction of the second cable hole 110 as the elongated hole follows the extension direction of the second intersection portion 8*h*.

The cable hole 100 as the elongated hole includes a circular hole portion 100*a* and a slit portion 100*b* which is adjacent to the circular hole portion 100*a*. The circular hole portion 100*a* is positioned at the end of the elongated hole in the longitudinal direction, and has an inner diameter larger than the outer diameter of the wire cable W. Each wire cable W is inserted through the cable hole 100 through the circular hole portion 100*a*. That is, the circular hole portion 100*a* is a cable guiding hole, and since the circular hole portion 100*a* is provided, each wire cable W may easily pass through the cable hole 100.

The slit portion 100*b* is adjacent to the circular hole portion 100*a*, and extends in the longitudinal direction of the elongated hole. With regard to the slit 100*b*, the width (hereinafter, the slit width) in a direction intersecting with the longitudinal direction is smaller than the inner diameter of the circular hole portion 100*a*, is slightly larger than the outer diameter (in the embodiment, about 5 mm) of the wire cable W, and is about 6 mm in the embodiment.

The respective wire cables W passing through the circular hole portion 100*a* are shifted from each other to pass through the slit portion 100*b*, and are nipped at the upper and lower portions of the slit portion 100*b*. As a result, the respective wire cables W are movable in a direction along the slit portion 100*b*, and the movement in the width direction (the up to down direction) of the slit portion 100*b* is regulated. For this reason, when the wire cable W moves in cooperation with the folding or the sliding of the seat S', the wire cable W is moved along the slit portion 100*b* not to disturb the operation of the seat S' and the fluttering of the wire cable W in the up to down direction is restricted.

The above-described configuration is also the same even in the second cable hole 110 (a circular hole portion 110*a* and a slit portion 110*b*). Furthermore, in the embodiment, the circular hole portion 100*a* near the cable hole 100 is positioned at the front end of the elongated hole in the longitudinal direction, the circular hole portion 110*a* near the second cable hole 110 is positioned at the rear end of the elongated hole in the longitudinal direction, and two circular hole portions 100*a* and 110*a* are positioned at the facing positions (see FIG. 30). By such a configuration, each wire cable W may more easily pass through the cable hole 100 and the second cable hole 110.

Further, in the embodiment, the formation position of the cable hole 100 in the extension direction of the intersection portion 8*f* and the formation position of the second cable hole 110 in the extension direction of the second intersection portion 8*h* are at different positions in the vehicle advancing direction. That is, the formation position of the cable hole 100 and the formation position of the second cable hole 110 are shifted from each other in the vehicle advancing direction. Accordingly, it is possible to sufficiently ensure the movable range of the wire cable W when sliding the seat S'.

Specifically, the wire cable W moves in accordance with the folding or the sliding of the seat S', but moves within the formation ranges of the cable hole 100 and the second cable hole 110 at this time. That is, the lengths of the cable hole 100 and the second cable hole 110 in the longitudinal direction become the movable range of the wire cable W. Here, since the entire movable range of the wire cable W becomes a range in which the formation ranges of the respective cable holes 100 and 110 overlap each other, the movable range becomes further widened when the formation position of the cable hole 100 is shifted from the formation position of the second cable hole 110. When the movable range of the wire cable W is ensured in this way, the wire cable W may be smoothly moved without disturbing the operation of the seat S'.

| TABLE OF REFERENCE CHARACTERS | |
|---|---|
| 1 | seat base |
| 2 | seat back |
| 3 | headrest |
| 4 | seat bottom frame |
| 5 | seat back frame |
| 5a | pillar support portion |
| 5b | side plate |
| 5c | tubular member |
| 5d | pivot shaft |
| 6 | bottom plate |
| 7 | connection member |
| 8 | side bracket |
| 8a | outer wall |
| 8b | inner wall |
| 8c | bottom wall |
| 8d | flange portion (cushion material placement portion) |
| 8e | canceling plate through hole |
| 8f | intersection portion |

TABLE OF REFERENCE CHARACTERS

| | | |
|---|---|---|
| | 8g | second flange portion |
| | 8h | second intersection portion |
| | 8i | rod member |
| | 8j | bent portion |
| | 8k | connection portion |
| 9 | | bridge plate |
| | 9a | flange portion |
| | 9b | projection portion |
| | 9c | stopper portion |
| 10 | | reclining mechanism |
| 11, 11' | | reclining canceling lever |
| 12 | | spiral spring (first biasing member) |
| | 12a | curved portion |
| 20, 120 | | seat slide mechanism |
| 21 | | lower rail (slide rail) |
| | 21a | protrusion |
| 22 | | upper rail (slide rail) |
| | 22a | upper surface |
| | 22b | canceling plate through hole |
| | 22c | side surface |
| 23 | | slide biasing member |
| 24 | | slide rail |
| 25 | | frame-side bracket |
| 30, 130 | | slide lock mechanism |
| 31 | | rod member |
| | 31a | shaft member |
| | 31b | connection plate |
| | 31c | connection shaft |
| 32 | | cooperating plate (first engagement member) |
| | 32a | first surface |
| | 32b | second surface |
| | 32c | third surface |
| | 32d | concave portion |
| 33 | | cancel lever |
| | 33a | collar |
| | 33b, 33c | protrusion |
| 34 | | rail canceling lever |
| | 34a | protrusion |
| | 34b | biasing member |
| 35 | | bracket |
| 36 | | lock canceling plate |
| | 36a | hole |
| 37 | | canceling plate biasing member |
| 38 | | lock member |
| | 38a, 38b | lock hole |
| 39 | | mounting bracket |
| | 39a | claw portion |
| 40 | | interlock mechanism |
| 41 | | striker |
| 42 | | interlock |
| | 42a | pivot shaft |
| | 42b | hook portion |
| | 42c | lock hole |
| | 42d | abutment portion |
| | 42e | inclined surface portion |
| 43 | | lock bracket |
| | 43a, 43b | lock hole |
| 44 | | interlock biasing member |
| 45 | | biasing member |
| | 45a | curved portion |
| 50, 150 | | assist mechanism |
| 51, 52, 151 | | assist spring |
| 60 | | link mechanism |
| 61 | | spiral spring (second biasing member) |
| | 61a | curved portion |
| 62 | | cooperating lever (second engagement member) |
| | 62a | locking concave portion |
| 63 | | stopper member |
| | 63a | lock portion |
| 70, 170 | | striker lock mechanism |
| 71 | | side plate |
| 72 | | latch |
| | 72b | spindle |
| 73 | | ratchet |
| | 73a | spindle |
| 74 | | coil spring |
| 75 | | shock absorbing pad |
| 100 | | cable hole (hole) |
| | 100a | circular hole portion |
| | 100b | slit portion |
| 110 | | second cable hole (second hole) |
| | 110a | circular hole portion |
| | 110b | slit portion |
| 160 | | rail side mechanism |
| 180 | | first link mechanism |
| 190 | | second link mechanism |
| S | | seat |
| D | | vehicle floor |
| F | | seat frame |
| P | | cushion pad (cushion material) |
| H | | horizontal direction |
| W | | wire cable |

The invention claimed is:

1. A seat frame provided in a stowable vehicle seat which is tipped up to be stowed in a vehicle floor in a state where a seat bottom frame and a seat back frame are folded, the seat frame comprising:
a reclining mechanism which supports the seat back frame tiltably with respect to the seat bottom frame;

a seat slide mechanism which slides the seat bottom frame in a front to back direction;

a slide lock mechanism which prohibits or allows an operation of the seat slide mechanism in cooperation with the reclining mechanism;

a striker lock mechanism which locks a rear portion of the seat bottom frame to the vehicle floor and regulates a pivoting of the stowable vehicle seat;

an assist mechanism which assists an operation of stowing and returning the stowable vehicle seat; and an interlock mechanism which is provided separately from the striker lock mechanism to regulate a tipping-up of the seat frame, wherein:

the seat slide mechanism includes:
   a lower rail which extends in a front to back direction of a vehicle body,
   an upper rail which slidably engages with the lower rail, and
   a slide biasing member which automatically slides the upper rail in cooperation with a movement in which the seat back frame is inclined to a predetermined angle by the reclining mechanism when stowing the stowable vehicle seat, the seat slide mechanism and the slide lock mechanism are mounted to the seat bottom frame;

the slide lock mechanism sets or cancels a slide lock for locking a movement of the upper rail movably provided in the lower rail by the seat slide mechanism, the striker lock mechanism locks a rear portion of the lower rail of the seat slide mechanism to the vehicle floor and regulates pivoting of the seat frame, and the interlock mechanism includes a mechanism which fixes the seat frame to the vehicle body and is operated when the seat frame is positioned at a stowing preparation position to release the seat frame from the vehicle body.

2. The seat frame according to claim 1, further comprising:
a link mechanism which adjusts angles of the seat bottom frame and the seat back frame,
wherein
the link mechanism maintains an inclination angle of the seat back frame while the upper rail slides.

3. The seat frame according to claim 1, wherein:
the seat back frame is pivotably mounted to the seat bottom frame;
when a folding direction toward the seat bottom frame in a pivoting direction of the seat back frame is assumed to be a first direction and a direction opposite to the first direction is assumed to be a second direction, the seat back frame includes:
   a first biasing member that biases the seat back frame in the first direction,
   a first engagement member that is mounted to the seat back frame through an engagement when the first biasing member biases the seat back frame,
   a second biasing member that biases the seat back frame in the second direction, and
   a second engagement member that is mounted to the seat back frame through an engagement when the second biasing member biases the seat back frame;
the first biasing member biases the seat back frame in the first direction while engaging with the first engagement member until the seat back frame pivots in the first direction and reaches a manual operation range; and
when the seat back frame reaches the manual operation range, an engagement state between the first biasing member and the first engagement member is canceled.

4. The seat frame according to claim 3, wherein in a state where the seat back frame is in the manual operation range, the second biasing member biases the seat back frame in the second direction while engaging with the second engagement member.

5. The seat frame according to claim 3, wherein the second biasing member engages with the second engagement member before the engagement state between the first biasing member and the first engagement member is canceled.

6. The seat frame according to claim 3, wherein:
the second biasing member engages with a lock portion provided in the seat bottom frame until the seat back frame reaches the manual operation range so that a state where the seat back frame is biased in the second direction is released, and
the first biasing member engages with a stopper portion provided in the seat bottom frame while the seat back frame is in the manual operation range so that a state where the seat back frame is biased in the first direction is released.

7. The seat frame according to claim 3, wherein:
the first biasing member and the second biasing member are each formed by a spring wound in a spiral shape,
a winding direction of the spring forming the first biasing member is made opposite to a winding direction of the spring forming the second biasing member,
a diameter of the spring forming the first biasing member is larger than a diameter of the spring forming the second biasing member, and
a number of winding of the spring forming the first biasing member is greater than a number of winding of the spring forming the second biasing member.

8. The seat frame according to claim 3, wherein the first engagement member moves in cooperation with the slide lock mechanism.

9. The seat frame according to claim 3,
wherein the second biasing member is disposed inside the seat bottom frame.

10. The seat frame according to claim 1, wherein
the interlock mechanism which fixes the seat frame to the vehicle body and is operated when the seat frame is positioned at the stowing preparation position to release the seat frame from the vehicle body includes:
   an interlock which is pivotably provided in the seat frame,
   an interlock biasing member that biases the interlock toward a striker provided in the vehicle body, and
   a biasing member that biases the interlock; and
the interlock is configured to be capable of engaging with or separating from the striker provided in the vehicle body at the stowing preparation position.

11. The seat frame according to claim 10, wherein the interlock is biased by the biasing member against the interlock biasing member to be separated from the striker at the stowing preparation position of the seat frame.

12. The seat frame according to claim 1, wherein the interlock mechanism is provided between the seat frame and the striker lock mechanism.

13. The seat frame according to claim 1, wherein:
the seat bottom frame comprises, on the side portion thereof:
   a cushion material placement portion for placing a cushion material on an upper surface of the cushion material support portion; and an intersection portion which is provided in a lower portion of the cushion material placement portion to intersect with the cushion material placement portion; and on the intersection portion, a hole is formed through which a cable pulled thereinto from the side portion of the seat bottom frame passes.

14. The seat frame according to claim 13, wherein:
a bottom portion is provided adjacent to the lower portion of the intersection portion to intersect with the intersection portion,
a second intersection portion is provided to be adjacent to the bottom portion, opposite to a position of the intersection portion,
on the second intersection portion, a second hole is formed through which the cable pulled thereinto from the side portion of the seat bottom frame passes, and
the hole and the second hole are both elongated holes.

15. The seat frame according to claim 14, wherein:
when the stowable vehicle seat is movable in a movement direction:
the intersection portion and the second intersection portion extend in the movement direction, and
a formation position of the hole in an extension direction of the intersection portion and a formation position of the second hole in an extension direction of the second intersection portion are different from each other in the movement direction.

16. The seat frame according to claim 15, wherein:
on the hole and the second hole, a circular hole portion which is positioned at an end of the elongated hole in a longitudinal direction and has an inner diameter larger than an outer diameter of the cable and a slit portion which is adjacent to the circular hole portion and extends in the longitudinal direction are formed respectively, and
a width of the slit portion in an intersection direction intersecting with the longitudinal direction is smaller than the inner diameter of the circular hole portion and is larger than the outer diameter of the cable.

17. The seat frame according to claim 13, wherein a plurality of the cables pulled from the side portion of the seat bottom frame pass through the hole.

18. The seat frame according to claim 13, wherein:
the seat back frame is pivotable with respect to the seat bottom frame when the stowable vehicle seat is folded, the stowable vehicle seat is foldable by pivoting of the seat back frame, and
the seat bottom frame supports the cushion material.

19. A stowable vehicle seat comprising at least:
a seat frame;
a cushion material which is placed on the seat frame; and
a surface material which covers the seat frame and the cushion material,
wherein:
the frame according to claim 1 is used as the seat frame.

20. A seat frame provided in a stowable vehicle seat which is tipped up to be stowed in a vehicle floor in a state where a seat bottom frame and a seat back frame are folded, the seat frame comprising:
a reclining mechanism which supports the seat back frame tiltably with respect to the seat bottom frame;
a seat slide mechanism which slides the seat bottom frame in a front to back direction;
a slide lock mechanism which prohibits or allows an operation of the seat slide mechanism in cooperation with the reclining mechanism;
a striker lock mechanism which locks a rear portion of the seat bottom frame to the vehicle floor and regulates a pivoting of the stowable vehicle seat;
an assist mechanism which assists an operation of stowing and returning the stowable vehicle seat; and
an interlock mechanism which is provided separately from the striker lock mechanism to regulate a tipping-up of the seat frame,
wherein:
the seat slide mechanism includes:
a lower rail which extends in a front to back direction of a vehicle body,
an upper rail which slidably engages with the lower rail; and
a slide biasing member which automatically slides the upper rail in cooperation with a movement in which the seat back frame is inclined to a predetermined angle by the reclining mechanism when stowing the stowable vehicle seat;
the seat slide mechanism and the slide lock mechanism are mounted to the seat bottom frame; and
one end of the slide biasing member is locked to the interlock mechanism.

* * * * *